(12) United States Patent
Fukutome

(10) Patent No.: US 9,360,704 B2
(45) Date of Patent: Jun. 7, 2016

(54) LIQUID CRYSTAL DISPLAY DEVICE, ELECTRONIC DEVICE, AND DRIVING METHODS THEREOF

(71) Applicant: Semiconductor Energy Laboratory Co., Ltd., Atsugi-shi, Kanagawa-ken (JP)

(72) Inventor: Takahiro Fukutome, Tochigi (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 0 days.

(21) Appl. No.: 14/286,246

(22) Filed: May 23, 2014

(65) Prior Publication Data

US 2014/0253841 A1   Sep. 11, 2014

Related U.S. Application Data

(62) Division of application No. 12/149,978, filed on May 12, 2008, now abandoned.

(30) Foreign Application Priority Data

May 18, 2007   (JP) .................................. 2007-132607

(51) Int. Cl.
*G09G 3/34*   (2006.01)
*G02F 1/1335*   (2006.01)
(Continued)

(52) U.S. Cl.
CPC ...... *G02F 1/133603* (2013.01); *G02F 1/13454* (2013.01); *G09G 3/3406* (2013.01); *G02F 1/133351* (2013.01); *G02F 1/136227* (2013.01); *G02F 2201/58* (2013.01);
(Continued)

(58) Field of Classification Search
CPC .............. G09G 3/3413; G09G 3/3406; G09G 2360/14–2360/147; G09G 2320/029; G09G 2320/0653
See application file for complete search history.

(56) References Cited

U.S. PATENT DOCUMENTS 4,561,044 A * 12/1985 Ogura et al. .................... 362/84
4,888,599 A   12/1989 Harwood et al.
(Continued)

FOREIGN PATENT DOCUMENTS

CN   001573444 A   2/2005
CN   001573450 A   2/2005
(Continued)

OTHER PUBLICATIONS

Chinese Office Action (Application No. 200810099497.1) Dated Aug. 11, 2011.
(Continued)

*Primary Examiner* — Dorothy Harris
(74) *Attorney, Agent, or Firm* — Robinson Intellectual Property Law Office; Eric J. Robinson

(57) ABSTRACT

An object of the present invention is to provide a driving method by which excellent image quality and high video performance can be obtained as well as liquid crystal display devices and electronic devices with excellent image quality and high video performance. A pixel for monitor use is provided in a liquid crystal display device, and luminance of the pixel is detected using a light sensor. Herewith, because changes in luminance of a backlight with changes in the environment and the amount of time it takes for response of the liquid crystal become able to be calculated, control of the backlight in real time using the calculated information can be performed.

24 Claims, 30 Drawing Sheets

(51) Int. Cl.
*G02F 1/1345* (2006.01)
*G02F 1/1333* (2006.01)
*G02F 1/1362* (2006.01)

(52) U.S. Cl.
CPC ... *G09G 2310/08* (2013.01); *G09G 2320/0633* (2013.01); *G09G 2360/144* (2013.01); *G09G 2360/145* (2013.01)

(56) References Cited

U.S. PATENT DOCUMENTS

| | | | |
|---|---|---|---|
| 5,157,525 A | 10/1992 | Eaton et al. | |
| 5,850,205 A | 12/1998 | Blouin | |
| 6,188,380 B1 | 2/2001 | Kawashima et al. | |
| 6,320,325 B1 | 11/2001 | Cok et al. | |
| 6,521,879 B1 | 2/2003 | Rand et al. | |
| 6,995,753 B2 | 2/2006 | Yamazaki et al. | |
| 7,002,546 B1 | 2/2006 | Stuppi et al. | |
| 7,106,294 B2 | 9/2006 | Kumamoto et al. | |
| 7,256,763 B2 | 8/2007 | Kaneki et al. | |
| 7,301,523 B2 | 11/2007 | Kamei | |
| 7,324,123 B2 | 1/2008 | Yamazaki et al. | |
| 7,595,784 B2 | 9/2009 | Yamamoto et al. | |
| 7,705,986 B2 | 4/2010 | Yamanaka et al. | |
| 7,855,708 B2 | 12/2010 | Ruby et al. | |
| 7,855,709 B2 | 12/2010 | Kamei | |
| 8,040,341 B2 | 10/2011 | Lin | |
| 2001/0020922 A1 | 9/2001 | Yamazaki et al. | |
| 2002/0030660 A1* | 3/2002 | Arakawa | 345/102 |
| 2002/0190972 A1 | 12/2002 | Ven de Van | |
| 2003/0189543 A1 | 10/2003 | Nakayoshi et al. | |
| 2004/0012556 A1* | 1/2004 | Yong et al. | 345/102 |
| 2004/0246435 A1* | 12/2004 | Kamei | 349/199 |
| 2004/0252097 A1* | 12/2004 | Kaneki | G09G 3/342 345/102 |
| 2005/0151716 A1* | 7/2005 | Lin | 345/102 |
| 2005/0167573 A1 | 8/2005 | Maruyama et al. | |
| 2005/0231457 A1* | 10/2005 | Yamamoto | G09G 3/3413 345/102 |
| 2005/0264549 A1 | 12/2005 | Mizumaki | |
| 2005/0280766 A1 | 12/2005 | Johnson et al. | |
| 2006/0044300 A1 | 3/2006 | Koyama et al. | |
| 2006/0082568 A1 | 4/2006 | Yamazaki et al. | |
| 2006/0092186 A1* | 5/2006 | Yoshihara | G09G 3/3406 345/690 |
| 2006/0146005 A1 | 7/2006 | Baba et al. | |
| 2006/0261253 A1 | 11/2006 | Arao et al. | |
| 2006/0262076 A1 | 11/2006 | Kawasaki et al. | |
| 2006/0273999 A1 | 12/2006 | Yamazaki et al. | |
| 2007/0024772 A1 | 2/2007 | Childers et al. | |
| 2007/0097045 A1 | 5/2007 | Lee et al. | |
| 2007/0216440 A1* | 9/2007 | Yamanaka et al. | 324/770 |
| 2007/0222474 A1 | 9/2007 | De Lauzun | |
| 2008/0074382 A1 | 3/2008 | Lee et al. | |
| 2008/0284716 A1* | 11/2008 | Edwards et al. | 345/102 |
| 2010/0085338 A1 | 4/2010 | Miguchi | |

FOREIGN PATENT DOCUMENTS

| | | |
|---|---|---|
| JP | 05-017408 A | 1/1993 |
| JP | 07-064057 A | 3/1995 |
| JP | 07-084254 A | 3/1995 |
| JP | 07-104715 A | 4/1995 |
| JP | 08-054859 A | 2/1996 |
| JP | 2000-056738 A | 2/2000 |
| JP | 2003-241165 A | 8/2003 |
| JP | 2004-361618 A | 12/2004 |
| JP | 2005-503006 | 1/2005 |
| JP | 2005-196165 A | 7/2005 |
| JP | 2005-208486 A | 8/2005 |
| JP | 2005-258404 A | 9/2005 |
| JP | 2006-171683 A | 6/2006 |
| JP | 2007-052105 A | 3/2007 |
| JP | 2007-108383 A | 4/2007 |
| KR | 10-0694819 | 3/2007 |
| WO | WO-03/021565 | 3/2003 |
| WO | WO-2005/096261 | 10/2005 |

OTHER PUBLICATIONS

Korean Office Action (Application No. 2008-0040349) Dated Mar. 31, 2014.
Korean Office Action (Application No. 2008-0040349) Dated Dec. 29, 2014.
Korean Office Action (Application No. 2008-0040349) Dated Jun. 29, 2015.

* cited by examiner

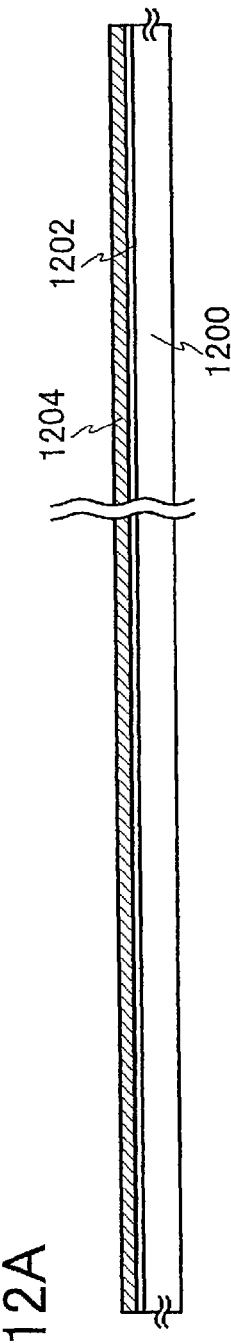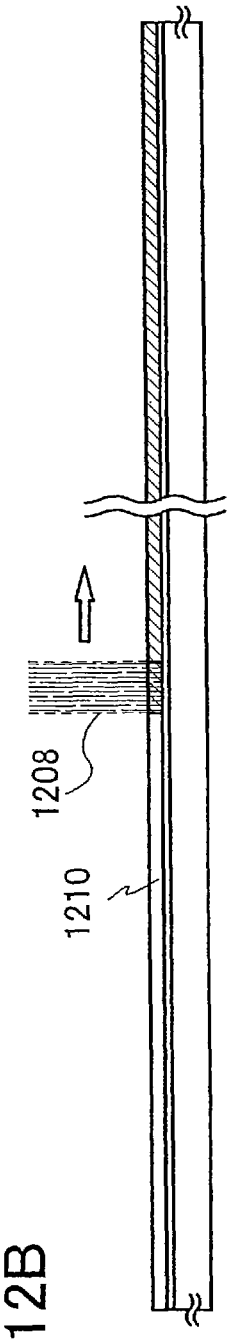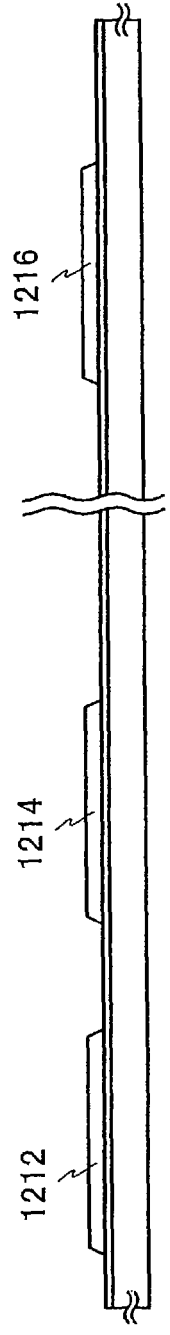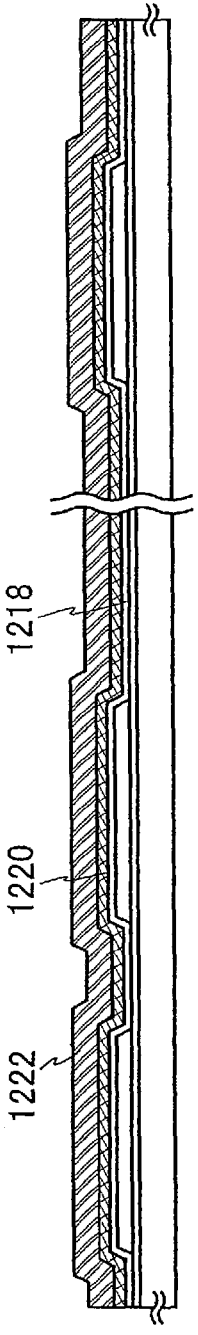
FIG. 12A
FIG. 12B
FIG. 12C
FIG. 12D

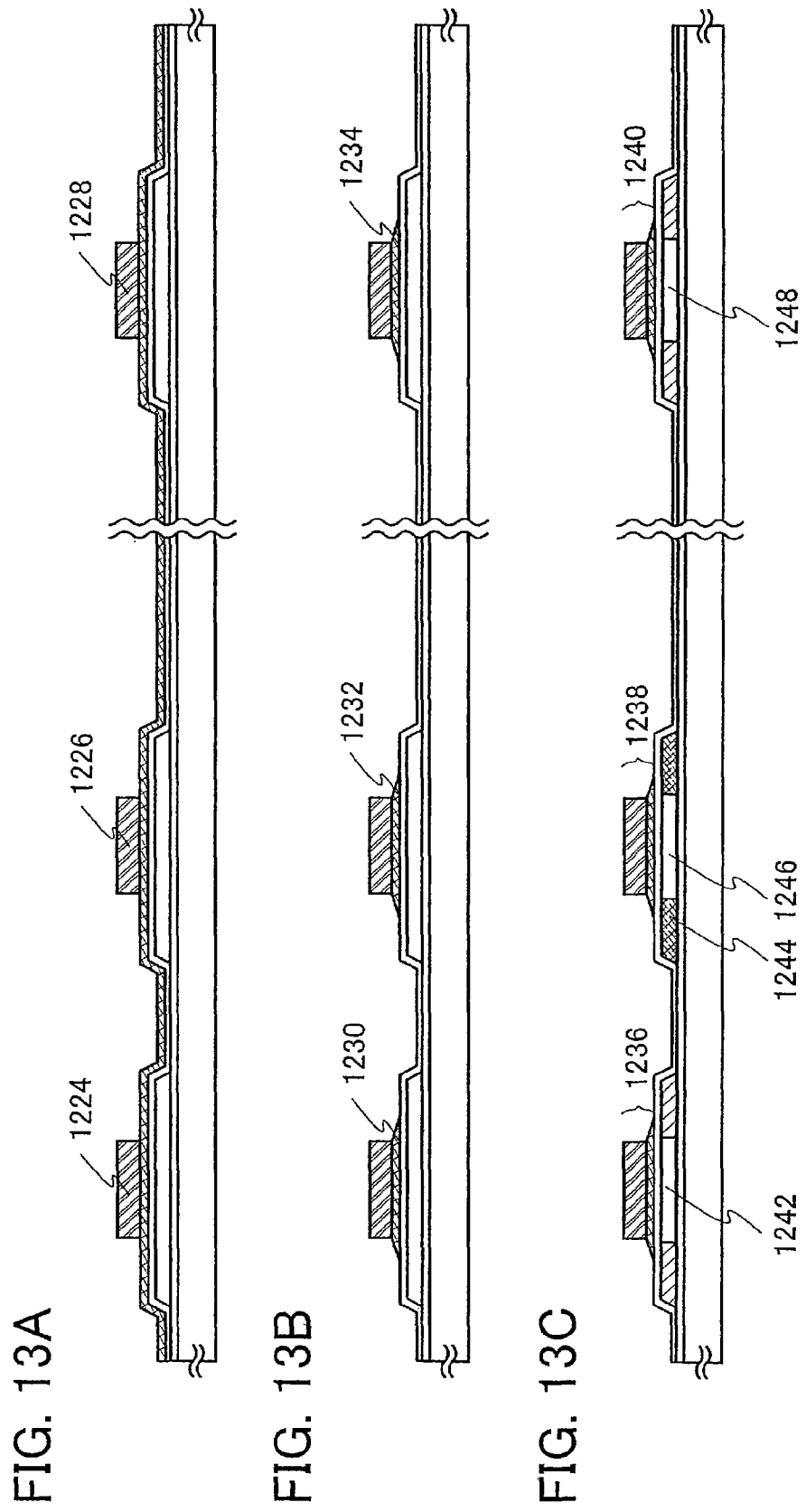

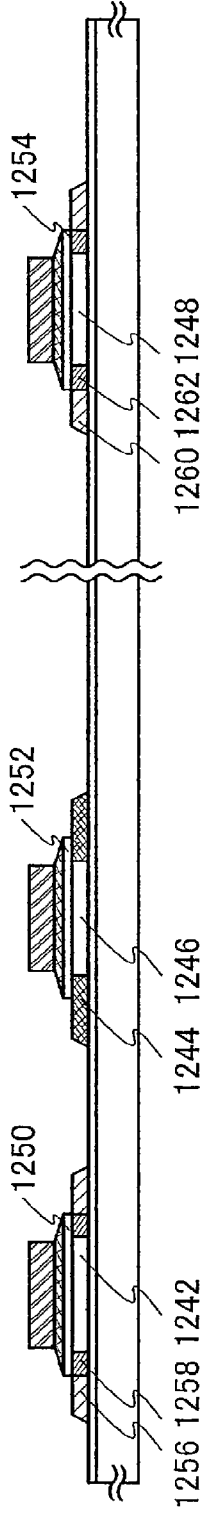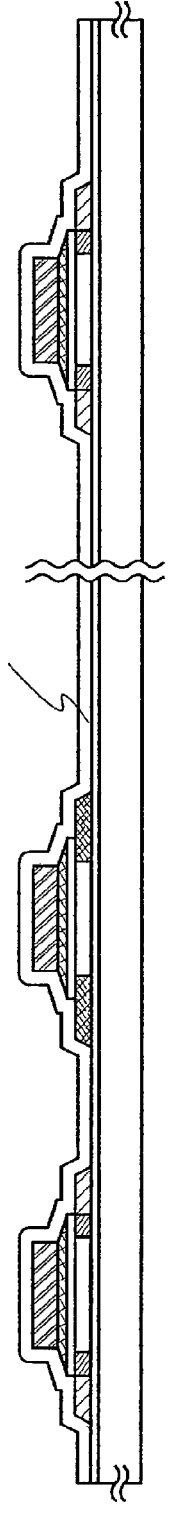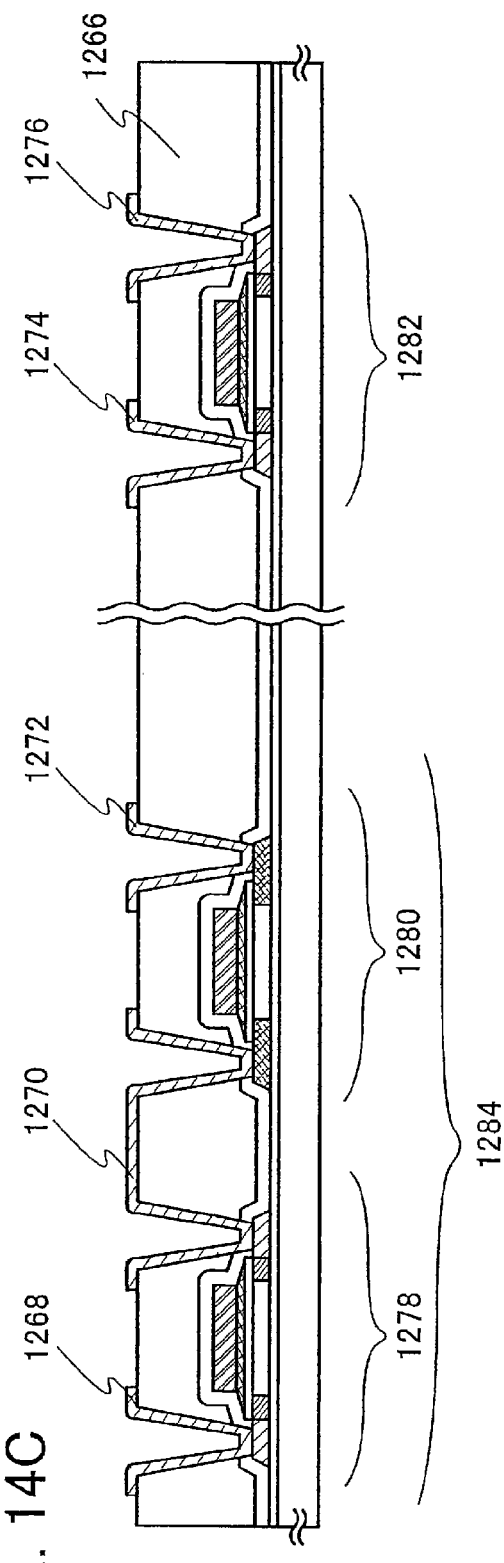
FIG. 14A
FIG. 14B
FIG. 14C

LIQUID CRYSTAL DISPLAY DEVICE, ELECTRONIC DEVICE, AND DRIVING METHODS THEREOF

BACKGROUND OF THE INVENTION

1. Field of the Invention

The present invention relates to liquid crystal display devices, electronic devices, and driving methods for liquid crystal display devices and electronic devices.

2. Description of the Related Art

In recent years, replacement of display devices in which conventional cathode-ray tubes are used with liquid crystal display devices as well as employment of liquid crystal display devices in miniature electronic devices has been progressing rapidly. Here, a liquid crystal display device refers to a display device in which the alignment orientation of liquid crystal molecules is changed by application of a voltage to the liquid crystal molecules which are interposed between substrates and changes in optical characteristics produced thereby are used.

For a typical liquid crystal display device, for example, twisted nematic (TN) liquid crystal display devices can be given. TN display elements have as a basis a structure in which a nematic liquid crystal is interposed between two substrates and the major axis of each of the liquid crystal molecules is twisted continuously along 90° between the two substrates. Consequently, the direction of polarization of light incident on the liquid crystal molecules of the display elements in this state comes to be changed 90° along the twist of the liquid crystal molecules.

Here, when a voltage is applied to the liquid crystal molecules, the major axis of each of the liquid crystal molecules can be tilted in the direction of the electric field by application of a voltage greater than or equal to a certain threshold voltage $V_{th}$. That is, the condition of the twist of the liquid crystal molecules can be changed from 90°. At this time, the direction of polarization of light incident on the liquid crystal molecules also comes to be changed according to this twist. A TN system is a system in which this principle is used as a light shutter.

By active matrix driving of the aforementioned TN system, a display device with better video display performance than that with passive matrix driving can be realized. Here, active matrix driving refers to driving of a pixel by use of transistors that are built into each pixel.

By combination of a TN system and active matrix driving in this way, a certain level of performance for the display device is secured. However, if compared to a display device in which a conventional cathode-ray tube is used, this display device is far from being in a state in which an acceptable level of performance (in particular, image quality and video performance) is obtained. In order to improve this performance, development of liquid crystal materials with fast response has been progressing (for an example of this, refer to Patent Document 1). Furthermore, systems such as OCB (bend orientation) systems and IPS systems changing to TN systems are being employed more and more (for an example of this, refer to Patent Document 2).

Moreover, an approach differing from that described above is also being considered. For example, overdriving (for an example of this, refer to Patent Document 3) and impulse driving (for an example of this, refer to Patent Document 4) are each such an approach. Overdriving is a driving method in which a high voltage is applied briefly in order to improve the response speed of the liquid crystal molecules. The length of time until the desired luminance is reached can be shortened, whereby the video performance is improved. In impulse driving, due to a backlight being turned off during a period (a transition period) in which target gradation is not displayed, pulse-like (impulse-like) display is realized so that video performance is improved and the amount of variation in gradation is reduced by the display being set to be black display during the transition period so that image quality is improved.

Patent Document 1: Japanese Published Patent Application No. H5-17408
Patent Document 2: Japanese Published Patent Application No. H7-84254
Patent Document 3: Japanese Published Patent Application No. H7-104715
Patent Document 3: Japanese Published Patent Application No. 2000-56738

SUMMARY OF THE INVENTION

In recent years, use of an LED as a backlight is being investigated. If an LED is used as a backlight, switching between the backlight being turned on and the backlight being turned off at high speed becomes possible. Furthermore, use of an LED as a backlight has the advantages of luminance characteristics at low temperature being about equal to luminance characteristics in a steady state, luminance being able to be secured instantaneously by input of source voltage, and high voltage not being needed.

However, even if an LED is used as a backlight, it does not necessarily mean that problems related to display will be solved completely. For example, the response speed of the liquid crystal changes significantly with changes in the environment (for example, changes in temperature, air pressure, and the like). For this reason, when impulse driving is used, a mismatch between timing of the response of the liquid crystal and timing of when the backlight is turned on may occur. For example, in cases in which control of the backlight being turned on and off is performed at timing fixed by design, a state arises in which the backlight is turned on even if response of the liquid crystal has not been completed. Consequently, display defects such as blurring of moving images and the like come to be generated. Moreover, full advantage cannot be taken of the superior response characteristics of an LED.

In the same way, luminance of the backlight is also significantly affected by the environment. Consequently, it is difficult to say that desired luminance can be obtained no matter what the conditions are.

In view of the aforementioned problems, it is an object of the present invention to provide a driving method by which excellent image quality and high video performance can be obtained as well as liquid crystal display devices and electronic devices with excellent image quality and high video performance.

In the present invention, a pixel for monitor use is provided in a liquid crystal display device, and luminance of the pixel is detected using a light sensor. Herewith, because changes in luminance of a backlight with changes in the environment and the amount of time it takes for response of the liquid crystal become able to be calculated, control of the backlight in real time using the calculated information can be performed. It is to be noted that the "real time" referred to here does not mean "simultaneous" in the strict sense of the word but allows for slight differences in time that are imperceptible to human beings.

One aspect of a liquid crystal display device of the present invention has a backlight, a light source for monitor use, and a liquid crystal layer as well as a light sensor used to detect the intensity of light passing through the liquid crystal layer from the light source for monitor use. It is to be noted that the light source for monitor use refers to a light source which is used for monitoring the luminance.

Another aspect of a liquid crystal display device of the present invention is a liquid crystal display device that has a backlight, and the liquid crystal display device also has a first polarizing plate over a light source for monitor use, a second polarizing plate over the first polarizing plate, a liquid crystal layer of a region wedged between the first polarizing plate and the second polarizing plate, and a light sensor over the second polarizing plate where the light sensor is arranged so as to detect the intensity of light from the light source for monitor use.

Furthermore, yet another aspect of a liquid crystal display device of the present invention is a liquid crystal display device that also has, in addition to what is given above, a unit for calculating an amount of correction for luminance of the backlight based on the intensity of light from the light source for monitor use that is detected by the light sensor and a unit for controlling the luminance of the backlight based on the amount of correction for the luminance of the backlight that is calculated.

Moreover, another aspect of a liquid crystal display device of the present invention is a liquid crystal display device that also has, in addition to what is given above, a unit for calculating timing of the backlight being turned on and timing of the backlight being turned off based on the luminance of light from the light source for monitor use that is detected by the light sensor and a unit for controlling the backlight being turned on and the backlight being turned off based on the timing of the backlight being turned on and the timing of the backlight being turned off that are calculated.

The light source for monitor use and the backlight described above may each be provided on one side of the liquid crystal layer. In addition, the light source for monitor use may be one part of the backlight.

Furthermore, for the light source for monitor use and the backlight described above, the light source for monitor use may be provided on one side of the liquid crystal layer and the backlight may be provided on a side of the liquid crystal layer opposite from the side on which the light source for monitor use is provided.

Moreover, the liquid crystal display device that is described above may also have a light sensor that is used to detect the intensity of external light. It is to be noted that a variety of electronic devices in which the liquid crystal display device that is described above is used can be provided.

One aspect of a driving method for a liquid crystal display device of the present invention is a driving method of a liquid crystal display device that has a backlight, a light source for monitor use, and a liquid crystal layer, and in the driving method for the liquid crystal display device, the intensity of light passing through the liquid crystal layer from the light source for monitor use is detected.

Furthermore, another aspect of a driving method for a liquid crystal display device of the present invention is a driving method of a liquid crystal display device in which, in addition to what is given above, an amount of correction for luminance of the backlight is calculated based on the intensity of light from the light source for monitor use that is detected by the light sensor, and the luminance of the backlight is corrected based on the amount of correction for the luminance of the backlight that is calculated.

Yet another aspect of a driving method for a liquid crystal display device of the present invention is a driving method of a liquid crystal display device in which, in addition to what is given above, timing of the backlight being turned on and timing of the backlight being turned off are calculated based on the intensity of light from the light source for monitor use that is detected by the light sensor, and the backlight being turned on and the backlight being turned off is controlled based on the timing of the backlight being turned on and the timing of the backlight being turned off that are calculated.

The liquid crystal display device described above also has a light sensor used to detect the intensity of light from external, and the driving method for the liquid crystal display device may be one in which an amount of correction for luminance of the backlight is calculated based on the brightness of surroundings detected by the light sensor that is used to detect the intensity of light from external and the luminance of the backlight is controlled based on the amount of correction for the luminance of the backlight that is calculated. It is to be noted that, in the present specification, "luminance" refers to instantaneous brightness (instantaneous luminance) integrated over a constant period of time.

By the present invention, because control corresponding to changes in the environment (for example, temperature, air pressure, and the like) can be performed, display devices that have excellent image quality and high video performance can be provided. Furthermore, by the present invention, liquid crystal display devices and electronic devices in which excellent image quality and high video performance are exhibited even with major changes in the environment can be provided. That is, excellent image quality and high video performance can be obtained even in display panels on streets that are subject to hostile environments, cellular phones, car electronics, and the like.

BRIEF DESCRIPTION OF THE DRAWINGS

FIGS. 12A to 12D are diagrams illustrating a fabrication process of a semiconductor substrate of the present invention.

FIGS. 13A to 13C are diagrams illustrating a fabrication process of a semiconductor substrate of the present invention.

FIGS. 14A to 14C are diagrams illustrating a fabrication process of a semiconductor substrate of the present invention.

DETAILED DESCRIPTION OF THE INVENTION

Figure 1A:
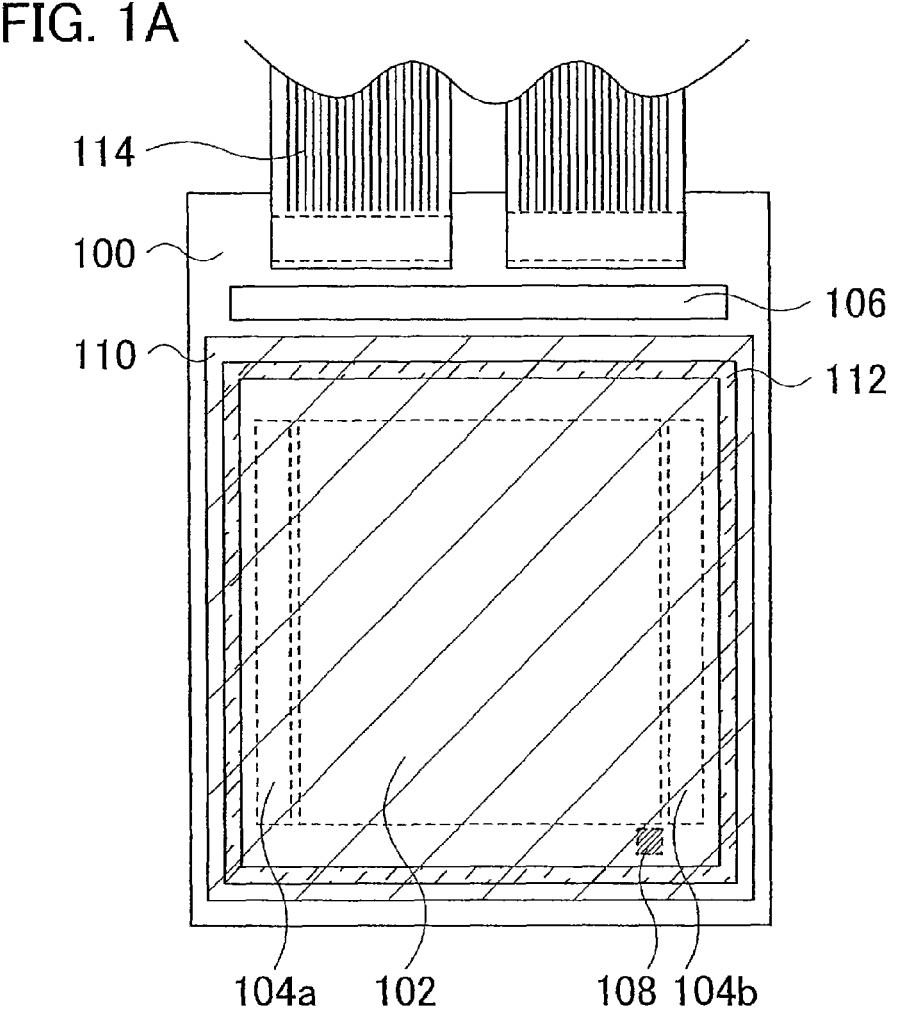
FIGS. 1A and 1B are diagrams showing an example of a structure of a panel of the present invention.

Embodiment Modes of the present invention will be described hereinafter with reference to the accompanying drawings. However, the present invention is not limited to the description given hereinafter, and it is to be easily understood to those skilled in the art that various changes and modifications can be made without any departure from the spirit and scope of the present invention. Therefore, the present invention is not to be construed as being limited to the description of the embodiment modes given hereinafter. It is to be noted that, in structures of the present invention described below, the same reference numerals are used in common to denote the same components in different drawings.

(Embodiment Mode 1)

In the present embodiment mode, an example of a liquid crystal display device and a driving method thereof of the present invention will be described using FIGS. 1A and 1B and FIGS. 2A and 2B.

In FIG. 1A, a planar-view diagram of a panel in which the liquid crystal display device of the present invention can be used is shown. A substrate 100 and a counter substrate 110 are bonded together by a sealant 112. Furthermore, a pixel section 102, a scanning line driver circuit 104a, a scanning line driver circuit 104b, and a monitor section 108 are provided between the substrate 100 and the counter substrate 110 and a signal line driver circuit 106 is provided over the substrate 100. Here, the monitor section 108 is a region in which a light sensor used to obtain luminance information of the panel is provided. The area of the monitor section 108 may be approximately equal to the area of one pixel or may be larger than the area of one pixel. By the area of the monitor section 108 being increased, the level of accuracy in detection of luminance can be increased. Signals from external are input via a flexible printed circuit (an FPC) 114. It is to be noted that, in FIGS. 1A and 1B, the structure is one in which the scanning line driver circuit 104a and the scanning line driver circuit 104b are formed integrally; however, the present invention is not limited to having this structure. Furthermore, the placement of the monitor section is not limited to being that of the structure of FIG. 1A. In addition, panel size can be selected and used as appropriate.

Figure 1B:
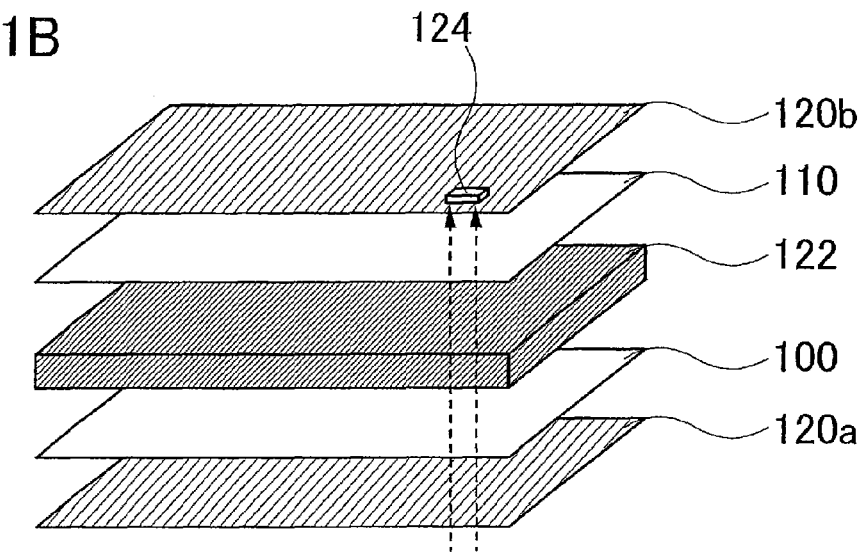

FIG. 1B is a diagram in which a simplified stacked-layer structure of the panel shown in FIG. 1A is shown. A liquid crystal layer 122 is provided between a substrate 100 and a counter substrate 110. Furthermore, a polarizing plate 120a and a polarizing plate 120b are provided on an outer side of the substrate 100 and an outer side of the counter substrate 110 (the lower side of the substrate 100 and the upper side of the counter substrate 110 in the diagram), respectively. A light sensor 124 is provided on an outer side of the polarizing plate 120b (on the upper side of the polarizing plate 120b).

The light sensor 124 detects light that passes through the polarizing plate 120a, the substrate 100, the liquid crystal layer 122, the counter substrate 110, and the polarizing plate 120b in the order given. Specifically, the light sensor 124 detects light from a backlight (or a light source for monitor use) that is provided on an outer side of the polarizing plate 120a (the lower side of the polarizing plate 120a in the diagram). Herewith, changes in the luminance of the backlight occurring with changes in the environment (for example, changes in temperature, pressure, and the like) and the length of time for response of the liquid crystal are calculated, whereby control of the backlight (for example, control of the luminance, control of the timing of switching, and the like of the backlight) can be performed. In the present embodiment mode, the structure was set to be one in which the light sensor 124 was provided on an external part of the polarizing plate 120a; however, the present invention is not limited to having this structure. Because an important point in implementation of the present invention is in detection of the intensity of light from a backlight (or a light source for monitor use) by the light sensor 124 in calculation of the amount of change in luminance and the length of time needed for response of the liquid crystal, if the light sensor 124 is placed in a location at which the intensity of light from a backlight (or a light source for monitor use) can be detected, the present invention can be implemented in the same way without being limited to having the structure of the present embodiment mode. Of course, the structure may be set to be one in which a plurality of light sensors are provided, and the arrangement thereof can be set as appropriate. It is to be noted that in order that accurate control of the present invention be performed, it is important that the structure be set to be one in which the light incident on the light sensor 124 is not any light other than the light that is the object of detection.

It is to be noted that, although the light incident on the light sensor may be light from the backlight, it is even more preferable that a light source for monitor use be provided in addition to the backlight. Cases in which light from a backlight is used are preferable because the structure can be simplified in such cases. In cases in which a light source for monitor use is provided in addition to the backlight, different control methods in which the light source for monitor use is used can be combined together as appropriate. For the light source for monitor use, it is preferable that a light source that has the same characteristics as those of the backlight be used; however, if the luminance of the light source for monitor use and the luminance of the backlight are to have a correspondence relationship, then the present invention is not to be taken as being limited to use of a light source with the same characteristics as those of the backlight. In the present embodiment mode, cases in which a light source is provided in addition to a backlight are to be described.

It is to be noted that, in FIG. 1B, a structure in which light is extracted from a counter substrate side is shown; however, the present invention can be used in a structure in which light is extracted from a substrate (active matrix substrate) side in the same way. In this case, the light sensor is to detect light that passes through a polarizing plate, a counter substrate, a liquid crystal layer, a substrate (an active matrix substrate), and a polarizing plate in the order given.

Next, an example of a circuit that controls output (luminance) of a backlight of a liquid crystal display device of the present invention and an example of a control method for control of the output (luminance) of the backlight will be described using FIGS. 2A and 2B. It is to be noted that control of output of the backlight in the present embodiment mode is performed in order that the intended, proper brightness be displayed for cases right after power is turned on, cases in which the environment changes, and the like when the brightness of the backlight is not the intended brightness.

Figure 2A:
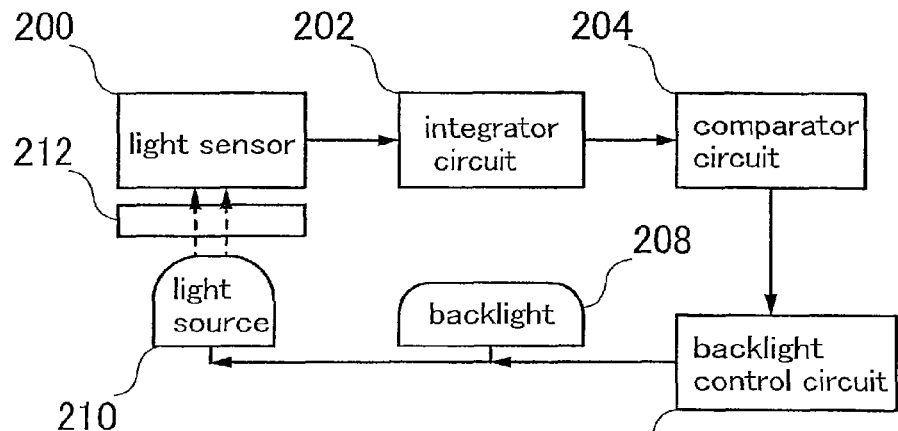
FIGS. 2A and 2B are diagrams showing examples of a circuit and a control method of the present invention.

FIG. 2A is a diagram illustrating an example of a circuit that controls the output (luminance) of the backlight. A light sensor 200 is electrically connected to an integrator circuit 202, and the integrator circuit 202 is electrically connected to a comparator circuit 204. The comparator circuit 204 is electrically connected to a backlight control circuit 206, and the backlight control circuit 206 is electrically connected to a backlight 208 and a light source 210 for monitor use. Light from the light source 210 for monitor use passes through a liquid crystal panel 212 to be incident on the light sensor 200. It is to be noted that, in FIG. 2A, the connection relationship between the backlight control circuit 206 and the backlight 208 and light source 210 for monitor use is shown; however, for cases in which the light source for monitor use is used in common with the backlight so that the light source for monitor use is omitted, the structure may be set to be one in which the backlight control circuit 206 is electrically connected to the backlight 208 only. Arrows in the diagram indicate the direction of transmission of principal signals.

The integrator circuit 202 has a role of time integration of light intensity (instantaneous luminance) detected by the light sensor. Human beings have a trait by which light intensity over a given period of time is integrated and perceived. For this reason, by use of the integrator circuit 202, the amount of luminance that is received by a human eye can be calculated.

The comparator circuit 204 has a role of comparison of the amount of luminance obtained by the integrator circuit 202 with a value determined in advance. The backlight control circuit 206 controls the backlight 208 and the light source 210 for monitor use based on the results of the comparison made by the comparator circuit 204.

Here, using FIG. 2B, an example of a control method of output (luminance) of a backlight will be described. At first, target luminance A is specified (Step S250). In the present embodiment mode, for an example, a case in which the output of the backlight can be adjusted 256 levels "from 0 to 255" and in which the mode can be switched between any of a plurality of modes (for example, sunlight mode, interior light mode, darkroom mode, and the like) depending on the brightness of the surroundings will be considered. For example, the output of the backlight in sunlight mode is set to be 200, the output of the backlight in interior light mode is set to be 150, and the output of the backlight in darkroom mode is set to be 100. If the display mode being employed is sunlight mode, intended original brightness for output of 200, voltage applied to a pixel electrode of the monitor section, and the like are used as a reference by which the target luminance A can be set. More specifically, for example, the brightness of the backlight is set to be the original brightness in cases in which the output is 200, whereby luminance for cases in which a voltage by which luminance is maximized is applied to the pixel electrode of the monitor section can be set to be the target luminance A. It is to be noted that, because the present embodiment mode is related to control of output of the backlight, there are no particular limitations on the voltage applied to the pixel electrode of the monitor section; however, in order that control of the output of the backlight be performed with a high level of accuracy, having a greater amount of light be incident on the light sensor is preferable. It is to be noted that the structure may be set to be one in which information about the target luminance A is stored in memory in advance and read out from the memory and used as appropriate.

Next, luminance B of a monitor section during one frame period is detected (Step S252). It is to be noted that the luminance detection for control of the output of the backlight is to be referred to as "luminance detection for output control" for descriptive purposes.

Then, the target luminance A and the aforementioned luminance B are compared, and a request is made for parameters used for correction (Step S254). Here, for a calculation method of the parameters used for correction, a method in which the difference between the target luminance A and the detected luminance B is used, a method in which the ratio of the target luminance A to the detected luminance B is used, and the like can be given. For example, the calculation method of calculation by ratio can be used in cases in which the output (luminance) of the backlight changes linearly with respect to input. In this case, because the relationship between an input current $I_1$ used to obtain the target luminance and an input current $I_2$ of actual conditions is represented as $A:B=I_1:I_2$, the amount of the input current $I_1$ needed to obtain the target luminance is $I_1=I_2\cdot(A/B)$. In the present embodiment mode, because the output of the backlight can be controlled at 256 steps, in adjustment of the luminance of the backlight, a step during which an amount of electric current the value of which is fairly close to the value of the electric current described above comes to be selected. It is to be noted that, in cases in which the luminance of the backlight is to change linearly with respect to input voltage, the output of the backlight can be controlled in the same way using voltage.

In cases in which the output (luminance) of the backlight does not respond linearly with respect to the input parameters, use of the method in which the amount of difference is used is preferable. That is, a request is made for a difference C (=A−B) between the target luminance A and the detected luminance B, and the electric current, voltage, and the like input to the backlight are specified using a reference table (a so-called lookup table).

Next, the luminance of the backlight is adjusted using the parameters that are used for correction calculated using any of the aforementioned methods or the like (Step S256). It is to be noted that, even in cases in which control is performed using the difference C, the electric current, voltage, and the like input to the backlight are not limited to being specified with reference to a lookup table. For example, a method in which the amount of the input current (or input voltage) input to the backlight is changed for each given step can be employed. In this case, if the amount of electric current (or voltage) for maximum luminance is set to be represented by $I_{MAX}$ (or $V_{MAX}$), then the amount of input current (or input voltage) is changed by $I_{MAX}/N$ (or $V_{MAX}/N$), which is one step, for cases in which luminance control is performed in N steps. By the structure being set to be like this structure, although the length of time needed for reaching target luminance is increased somewhat, there is an advantage with this method in that lookup tables need not be provided. Furthermore, for cases in which a light source for monitor use is provided in addition to a backlight, as in the present embodiment mode, for feedback performed during a subsequent step, there is a need for adjustment of the luminance of the light source for monitor use to be performed at the same time.

Next, the target luminance A and a luminance B' after correction are compared (Step S258). In cases in which the target luminance A and the luminance B' after correction come to be equal (cases in which A=B'), correction is finished for the time being. In cases in which the target luminance A and the luminance B' after correction do not come to be equal due to changes in the environment and a margin of error and the like in the correction, once again, a request is made for the parameters for correction use, and correction is performed (Step S252 and Step S254). By repetition of this kind of feedback, eventually, the target luminance A comes to be displayed. It is to be noted that, in the present embodiment mode, the structure is set to be one in which feedback is repeated until the target luminance A and the luminance B' after correction come to be equal to each other; however, the present invention is not to be taken as being limited to this structure only. For example, in cases in which a certain amount of margin with respect to the target luminance A is provided and the luminance B' after correction falls within that range, the structure can be set to be one in which correction is then finished.

Figure 2B:
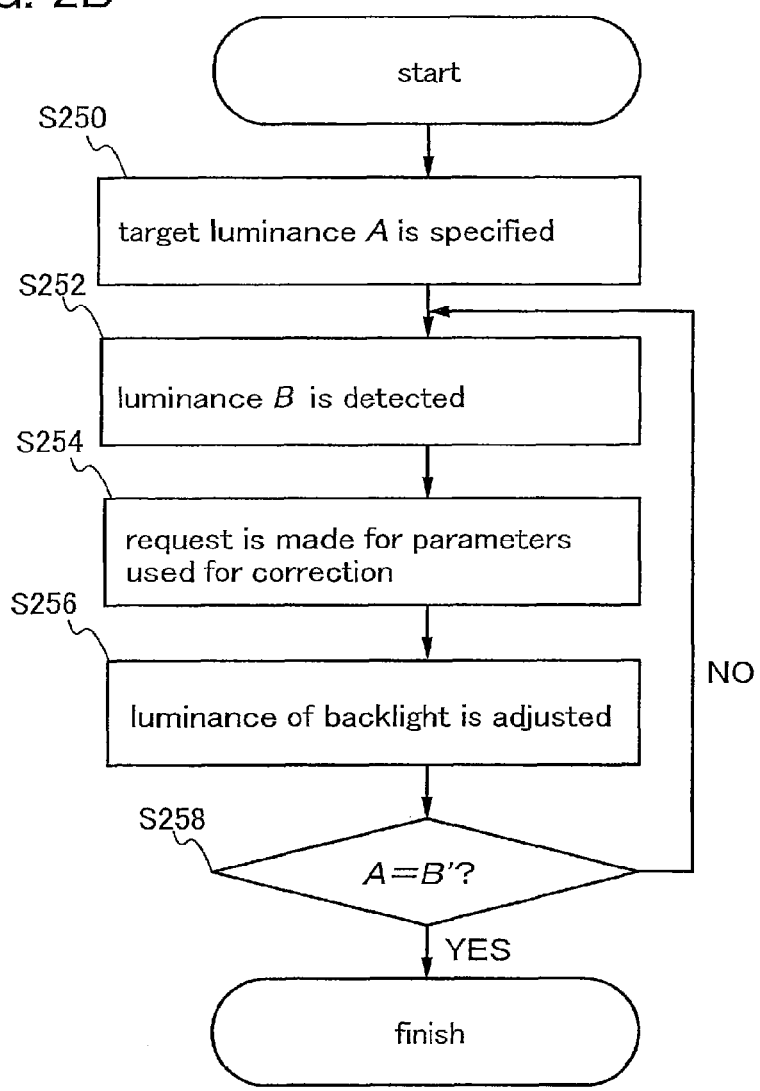

It is to be noted that in the flow shown in FIG. 2B, when correction is completed, correction is finished; however, the present invention is not limited to this configuration. For example, the structure may be set to be one in which correction is performed for each constant period, or the structure may be set to be one in which feedback is constantly given. In addition, the structure can be set to be one in which correction is performed whenever the display mode is switched from one display mode to another (for example, when the display mode is switched from sunlight mode to interior light mode). Furthermore, the present invention can be applied both to cases in which the detected luminance B is lower than the target luminance A and to cases in which the detected luminance B is higher than the target luminance A. Of course, the state of the present invention may also be one in which the detected luminance B is equal to the target luminance A.

As described above, by performance of control of the output (luminance) of a backlight using a light sensor, desired luminance can be displayed correctly. Furthermore, even in cases in which the output of the backlight changes with changes in the environment (temperature, pressure, and the like), desired luminance can be maintained. In addition, because temperature sensors and the like used to detect changes in the environment become unnecessary and there is no need to use a lookup table for reference of the relationship between temperature and the like and luminance, structures of sensors, memory, and the like can be simplified.

In addition, even in states in which no time passes from input of electricity and in states in which a constant period of time passes from input of electricity, excellent image quality that does not change can be provided. Furthermore, excellent image quality can be obtained even in display panels on streets that are subjected to hostile environments, cellular phones, car electronics, and the like.

It is to be noted that, in the present embodiment mode, an example is given in which processing is performed using hardware; however, the present invention is not to be taken as being limited to this configuration. Because a technical idea of the present embodiment mode is that control of output (optimization of output) of a backlight is performed based on information obtained from a light sensor, any type of structure can be employed as long as it is a structure in which this technical idea can be implemented. For example, processing performed using hardware in the present embodiment mode can also be performed using software.

It is to be noted that in the present embodiment mode, cases in which the present invention is applied to a liquid crystal display device are described; however, the present invention can be used in display devices other than liquid crystal display devices. For example, the present invention can be used for compensation of a drop in luminance that occurs with deterioration of light-emitting elements in an electroluminescent display device in which the light-emitting elements are used. In particular, if the structure is set to be one in which compensation is made for luminance in each RGB, provision of extremely high-level image quality becomes possible. In the same way, the present invention can be used in a display device such as a plasma display panel (a PDP), a field emission display (an FED), and the like, as well.

(Embodiment Mode 2)

In the present embodiment mode, another example of a liquid crystal display device and a driving method thereof of the present invention will be described using FIGS. 3A and 3B and FIG. 4.

Because the structure of a panel that can be used in a liquid crystal display device of the present embodiment mode is the same as that of Embodiment Mode 1, a detailed description thereof will be omitted. In the present embodiment mode, an example of a switching, control circuit that controls switching of a backlight and an example of switching control method for control of switching of a backlight will be described. It is to be noted that control of switching of a backlight is performed so that timing of on and off of the backlight is controlled so that correct grayscale is displayed in cases in which correct grayscale is not displayed due to lag in the response of the liquid crystal, timing of writing, and the like.

Figure 3A:
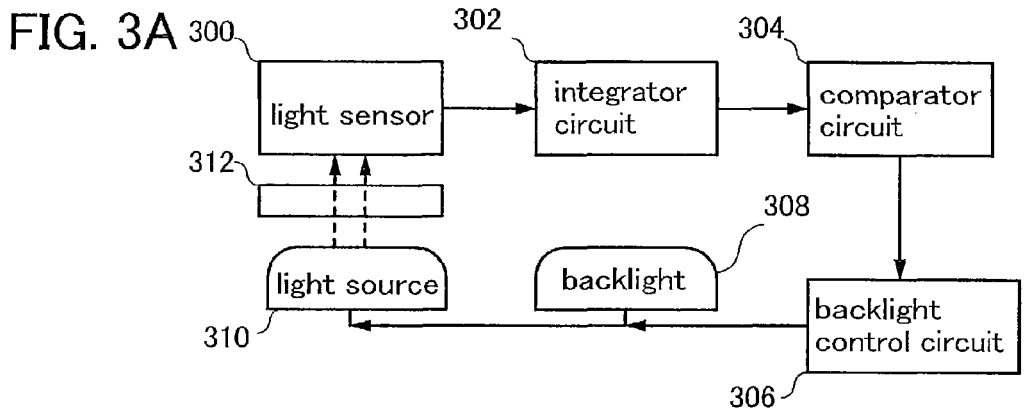
FIGS. 3A and 3B are diagrams showing examples of a circuit and a control method of the present invention.

FIG. 3A is a diagram illustrating an example of a switching control circuit that controls switching of the backlight. A light sensor 300 is electrically connected to an integrator circuit 302, and the integrator circuit 302 is electrically connected to a comparator circuit 304. The comparator circuit 304 is electrically connected to a backlight control circuit 306, and the backlight control circuit 306 is electrically connected to a backlight 308 and a light source 310 for monitor use. Light from the light source 310 for monitor use passes through a liquid crystal panel 312 to be incident on the light sensor 300. It is to be noted that, in FIG. 3A, the connection relationship between the backlight control circuit 306 and the backlight 308 and light source 310 for monitor use is shown; however, for cases in which the light source for monitor use is used in common with the backlight so that the light source for monitor use is omitted, the structure may be set to be one in which the backlight control circuit 306 is electrically connected to the backlight 308 only. Arrows in the diagram indicate the direction of transmission of principal signals.

The integrator circuit 302 has a role of time integration of light intensity (instantaneous luminance) detected by the light sensor. Human beings have a trait by which light intensity over a given period of time is integrated and perceived. For this reason, by use of the integrator circuit 302, the amount of luminance that is received by a human eye can be calculated.

It is to be noted that, in the present embodiment mode, a structure is shown in which the integrator circuit 302 is provided; however, the present invention is not limited to having this structure only. Because control in the present embodiment mode is control performed using instantaneous luminance, the structure may be set to be one in which the integrator circuit 302 need not be provided. By provision of the integrator circuit 302, more accurate control can be performed by reduction of the effects of noise. With cases in which the integrator circuit 302 is not provided, there is an advantage in that the structure can be simplified even more.

The comparator circuit 304 has a role of comparison of the amount of luminance obtained by the integrator circuit 302 with a value determined in advance. The backlight control circuit 306 controls the backlight 308 and the light source 310 for monitor use based on the results of the comparison made by the comparator circuit 304. It is to be noted that, in the present embodiment mode, the structure may be set to be one in which the light source 310 for monitor use is constantly turned on, or the structure may be set to be one in which the light source 310 for monitor use is turned off during periods in which the light source 310 for monitor use is not needed. For example, the structure can also be set to be one in which the light source 310 for monitor use is turned off during subsequent frame periods in cases in which timing of the backlight 308 being turned off is fixed. Herewith, compared to cases in which the light source 310 for monitor use is made to emit light constantly, power consumption can be reduced.

Here, using FIG. 3B, an example of a switching control method for control of switching of the backlight will be described. At first, a target luminance D is specified (Step S350). It is preferable that the target luminance D be specified assuming a state in which the response speed is slowest, that is, a state in which the greatest amount of time is needed for completion of response, in this liquid crystal display device. For example, because the response to intermediate grayscale is slowest in a VA (Vertical Alignment) liquid crystal display device, the luminance for the aforementioned intermediate grayscale may be set to be the target luminance D. Herewith, the maximum amount of time needed for this response to be completed from input of a signal to one pixel is obtained. That is, timing of the backlight being turned on can be made to match the state in which the response becomes slowest. Hence, the backlight can be made to turn on after the response of all pixels that form one screen is completed, which leads to an improvement in video performance. It is to be noted that, in order that this kind of display be realized, for example, after a signal is input to the last pixel of the screen, the backlight may be turned on according to the requested timing for the backlight being turned on.

Next, a threshold value E is specified (Step S352). The threshold value E is a value that becomes a reference for switching of the backlight. Specifically, the threshold value E is a reference value used to determine if the target luminance has been reached or not; for example, in cases in which the response of the luminance is determined to have gone from a state of low luminance to a state of high luminance, the target luminance is considered as having been reached if the luminance is greater than or equal to the threshold value E. The threshold value E can be specified as appropriate so as to match targets for image characteristics and video performance. In addition, the threshold value E may be set using the target luminance D as a reference. In the present embodiment mode, for an example is given a case in which the response of the luminance is determined to have gone from a state of low luminance to a state of high luminance, and a case in which the threshold value E is set to be 95% of the target luminance D will be described. It is to be noted that, in cases in which the response of the luminance is determined to have gone from a state of high luminance to a state of low luminance, the target luminance may be considered as having been reached if the luminance is less than or equal to the threshold value E.

It is to be noted that in the case of use in an application in which only still images are displayed, control of switching of the backlight shown in the present embodiment mode may be set so as not to be performed, in practice. Herewith, because "instantaneous luminance" of the backlight in cases in which display is performed at a constant luminance can be kept low, there is an advantage with this case in that the length of the life of the backlight is improved.

Next, one frame period is divided up into an F number of periods (hereinafter referred to as luminance detection periods) of equal length (Step S354). It is to be noted that, in the present embodiment mode, for an example, a case in which one frame period is divided up into 30 luminance detection periods will be described. Here, for cases in which the response of the liquid crystal is not completed during one frame period, there is no need for one frame period to be set to be a test period during which control of switching of the backlight is performed. For example, in some liquid crystal display devices and the like in which a liquid crystal material with a slow response is used, there are cases in which the response of the liquid crystal is not completed during one frame period. In these kinds of cases, control can be performed with two or more frame periods being set to be test periods. Meanwhile, when the response speed of liquid crystal display devices of recent years is considered, in many liquid crystal display devices, the response of the liquid crystal is generally completed within one frame period. Consequently, in the present embodiment mode, an example will be described in which control of switching of the backlight is performed with one frame period being set to be a test period. Of course, the present invention can be implemented even in cases in which the driving frequency is increased (double speed (120 Hz) driving, triple speed (180 Hz) driving, and the like). For example, in cases in which one frame period is divided up into an n number of subframe periods and n-speed driving is performed, the structure may be set to be one in which writing of a signal to all pixels is made to be completed during a first subframe period, and the length of time needed for response of the liquid crystal is calculated using one or a plurality of subframe periods including the first subframe period.

It is to be noted that, as in the present embodiment mode, during a period different from a frame period that is a reference, in order that some kind of operation (in the present embodiment mode, this operation corresponds to that of the above-described "detection of luminance during a luminance detection period"), a new timing signal corresponding to the target timing becomes needed. Here, for generation of a new timing signal in a simple structure, a clock signal input to a driver circuit may be used. For example, by performance of logic operations (for example, AND operations) performed based on outputs of an $(N-1)^{th}$ shift register and an $N^{th}$ shift register in the driver circuit, a new timing signal can be generated in an extremely simple structure. Furthermore, by the number of the stage of a selected shift register being changed as appropriate, a great variety of timing signals can be generated in a fairly simple structure. Alternatively, timing signals may be generated by frequency divider circuits and the like being combined together as appropriate.

Next, a luminance G in one luminance detection period is detected (Step S356). Here, the luminance detection for control of switching of the backlight is to be referred to as "luminance detection for switching control" for descriptive purposes. Next, the luminance G detected during the luminance detection period is compared to the threshold value E per luminance detection period, E/F (Step S358). When the detected luminance G exceeds the threshold value E per luminance detection period, E/F (or is greater than or equal to E/F), the backlight is turned on at that timing (Step S360); when such is not the case, a luminance G' is detected during the next luminance detection period, and the same type of comparison is made (Step S356, Step S358). Here, the structure may be set to be one in which the backlight is turned off for states in which the detected luminance is less than the threshold value. It is to be noted that E/F is used as the object of comparison because E is a threshold value that is set based on the target luminance D and E/F is represented as the integral value of one frame period. Meanwhile, an integration period in detection of the luminance G is 1/F of one frame period.

It is to be noted that, in the present embodiment mode, operations of pixels in a monitor section may be performed separately from operations of pixels in a display section, or the operations of pixels in the display section may be performed simultaneous with the operations of pixels in a monitor section. In cases in which the operations of pixels in the monitor section are performed simultaneous with the operations of pixels in the display section, it is preferable that operations be made to be performed simultaneously with respect to the last pixel in the display section to which a signal is written. By operations being made to be performed simultaneously with respect to the last pixel in the display section to which a signal is written, the timing at which the response of the liquid crystal in all pixels on the screen is completed becomes easy to calculate. In cases in which the operations of the pixels in the monitor section are performed separately from the operations of the pixels in the display section, the timing for the backlight being switched on and off may be corrected as appropriate.

Figure 3B:
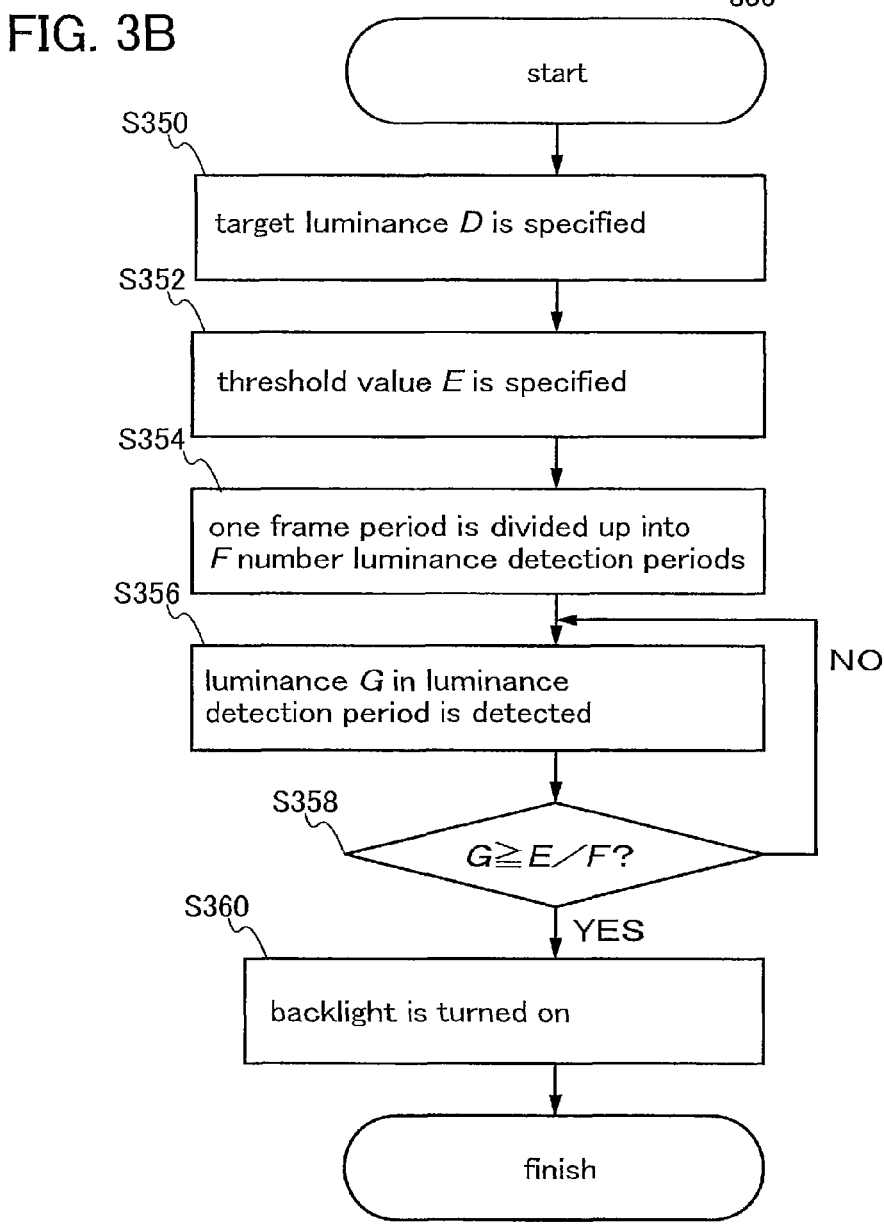

As described above, timing for the backlight being switched on and off can be set according to the flow shown in FIG. 3B. The set timing is stored in memory and can be used for a given continuous period of time. Of course, the structure may also be set to be one in which the timing of the backlight being switched on and off is changed for each frame period.

Figure 4:
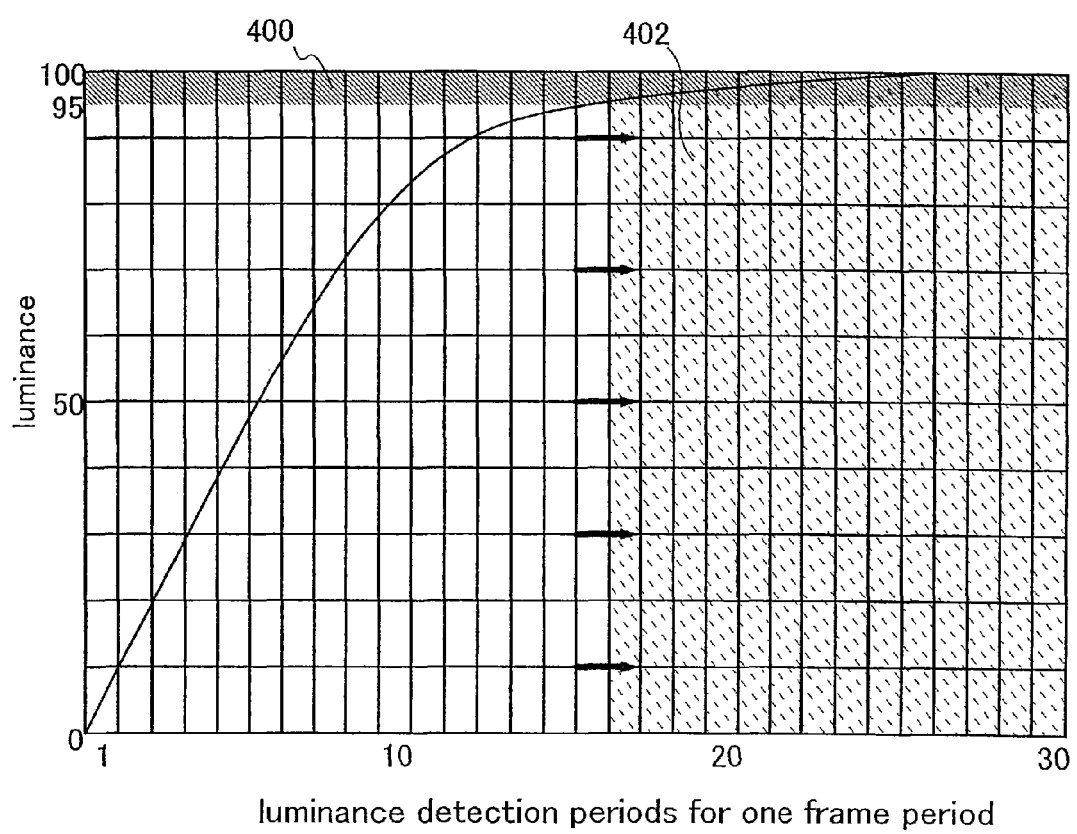
FIG. 4 is a diagram showing timing of when a backlight is turned on in the present invention.

FIG. 4 is a graph showing a relationship between luminance (instantaneous luminance) and timing for the backlight being turned on for cases in which the switching timing control method for control of the timing of the backlight being switched on and off shown in the present embodiment mode is used. The vertical axis in the graph represents luminance when the target luminance is set to be 100. The horizontal axis represents luminance detection periods for one frame period (from a first luminance detection period to a thirtieth luminance detection period). Furthermore, luminance greater than or equal to the threshold value is represented in a region 400, and a period during which the backlight is turned on is represented in a region 402. Arrows in the graph indicate that it has been determined that the luminance has exceeded the threshold value for periods from the arrows onward (for periods from a sixteenth luminance detection period). In the present embodiment mode, a case is described in which the threshold value of the luminance is set to be 95% of the target luminance and one frame period is divided up into 30 luminance detection periods; however, the present invention is not to be taken as being limited to this configuration. Various parameters can be changed as appropriate.

In the case of FIG. 4, the luminance does not exceed the threshold value until after the fifteenth luminance detection period. For this reason, from the seventeenth luminance detection period, which is the luminance detection period subsequent to the sixteenth luminance detection period during which the threshold value is exceeded, the backlight is turned on. It is to be noted that the luminance represented by the curved line in FIG. 4 is "instantaneous luminance" and does not strictly correspond to the "luminance" found by time integration. In addition, in the present embodiment mode, there is time lag between the timing at which luminance greater than or equal to the threshold value is detected and the timing at which the backlight is turned on. For example, as shown in FIG. 4, even though the luminance detection period during which the threshold value is exceeded is the sixteenth luminance detection period, the backlight being turned on starts from the seventeenth luminance detection period. This is because the luminance is determined by time integration during one luminance detection period. However, this problem can be solved by the length of a luminance detection period, which is an integration period, being shortened enough (that is, by one frame period being divided up into a number of luminance detection periods).

Moreover, to solve this kind of problem, the structure is set to be one in which luminance determined by time integration is not used, but rather, determination is performed using instantaneous luminance. The use of instantaneous luminance has the same meaning as the length of the integration period being shortened enough (that is, the same meaning as one frame period being divided up into an almost infinite number of luminance detection periods). By the structure being set to be this kind of structure, timing of the backlight being turned on can be controlled even more finely. In cases in which luminance determined by time integration is used, even if the length of a luminance detection period, which is an integration period, cannot be shortened enough, for example, when the timing of control of the backlight is retained in memory and constant control is performed for a given period at the same timing, a correction is added as appropriate (in the case of FIG. 4, the timing for the backlight being turned on is switched from being during the seventeenth luminance detection period to being during the sixteenth luminance detection period), and the timing for the backlight being turned on can be optimized even more.

It is to be noted that when the display device becomes able to operate at high speed, problems caused by noise or the like may arise. For example, in cases such as that shown in FIG. 4 where the effects of noise are small and luminance increases (or decreases) by one step, there are no problems, in particular; however, when there is a large amount of noise, a state may occur in which the threshold value is exceeded temporarily. In this kind of state, accurate control of the backlight is difficult. To solve this problem, for example, a new condition, which is that "the backlight is to be turned on when the detected luminance exceeds the threshold value at least two times (or more than two times) in a row," may be added. Because the same kind of problem may occur when overdriving is used, it is preferable that the same kind of measures be performed in that case, as well.

It is to be noted that, in the present embodiment mode, a case in which the case of the luminance being changed from a state of low luminance to a state of high luminance is set to be a test pattern is described; however, the present invention is not to be taken as being limited to this case only. The present invention can also be used in a structure in which the case of the luminance being changed from a state of high luminance to a state of low luminance is set to be a test pattern. In this case, different parameters may be changed as appropriate.

As described above, by performance of control of the switching of the backlight using a light sensor, the realization of impulse driving by optimal timing becomes possible.

Herewith, video performance is improved dramatically. Furthermore, even in cases in which the response speed of the liquid crystal changes with changes in the environment (temperature, pressure, and the like), because optimal impulse driving can be realized, the video performance can be maintained at a high level constantly. In addition, because temperature sensors and the like used to detect changes in the environment become unnecessary and there is no need to use a reference table (a so-called lookup table) for control of the switching of the backlight, structures of sensors, memory, and the like can be simplified.

It is to be noted that impulse driving for cases in which the present invention is used is different from impulse driving in the conventional meaning. That is, while conventional impulse driving refers to luminance of one pixel changing in a pulse-like manner, impulse driving realized by use of the present invention refers to luminance of pixels of one screen changing simultaneously and in a pulse-like manner. To further reiterate, while conventional impulse driving is impulse driving by point-sequential driving or line-sequential driving, impulse driving realized by use of the present invention has a kind of aspect of pixels for one screen being turned on simultaneously, a "frame-sequential driving" kind of aspect. Because all pixels for one screen can be turned on simultaneously, video performance can be dramatically improved. It is to be noted that, to realize the above-described impulse driving, the length of an intended period (one frame period in the present embodiment mode) needs to be longer than the sum of the length of time needed for writing of a signal to all pixels and the length of time needed for completion of the response of the liquid crystal of all pixels. This is attributed to the fact that turning on of the backlight starts from a state in which the response of the liquid crystal of all pixels is completed. However, in view of improvements in processing capability of driver circuits, improvements in the response speed of a liquid crystal, and the like in recent years, this point does not cause any problems in particular.

In addition, even in states in which no time passes from input of electricity and in states in which a constant period of time passes from input of electricity, a liquid crystal display device exhibiting high video performance can be provided. Furthermore, high video performance can be obtained even in display panels on streets that are subject to hostile environments, cellular phones, car electronics, and the like.

It is to be noted that, in the present embodiment mode, a description is given for cases in which control of switching of a backlight is performed; however, the present invention can be used in cases other than in cases in which control of switching of a backlight is performed. For example, the present invention can also be used to determine optimal voltage in overdriving. In this case, by overdrive voltage being controlled so that display is performed at a given luminance by a desired period, video performance can be improved dramatically. Of course, control of overdrive voltage and control of switching of the backlight may be used in combination with each other.

Furthermore, in the present embodiment mode, an example is given in which processing is performed using hardware; however, the present invention is not to be taken as being limited to this configuration. Because a technical idea of the present embodiment mode is that control of switching of a backlight is performed based on information obtained from a light sensor, any type of structure can be employed as long as it is a structure in which this technical idea can be implemented. For example, processing performed using hardware in the present embodiment mode can also be performed using software.

The present embodiment mode can be used in combination with Embodiment Mode 1, as appropriate. It is to be noted that the output control of the output of a backlight shown in Embodiment Mode 1 and control of switching of a backlight in the present embodiment mode can be used in combination with each other. By the structures being used in combination with each other, a liquid crystal display device with excellent image quality and high video performance is realized.

(Embodiment Mode 3)

In the present embodiment mode, another example of a liquid crystal display device and a driving method thereof of the present invention will be described using FIG. 5, FIG. 6, and FIG. 7.

Because the structure of a panel that can be used in a liquid crystal display device of the present embodiment mode is the same as that of Embodiment Mode 1, a detailed description thereof will be omitted. In the present embodiment mode, an example of a switching control circuit that controls switching of a backlight and an example of switching control method for control of switching of a backlight different from those of Embodiment Mode 2 will be described.

Figure 5:
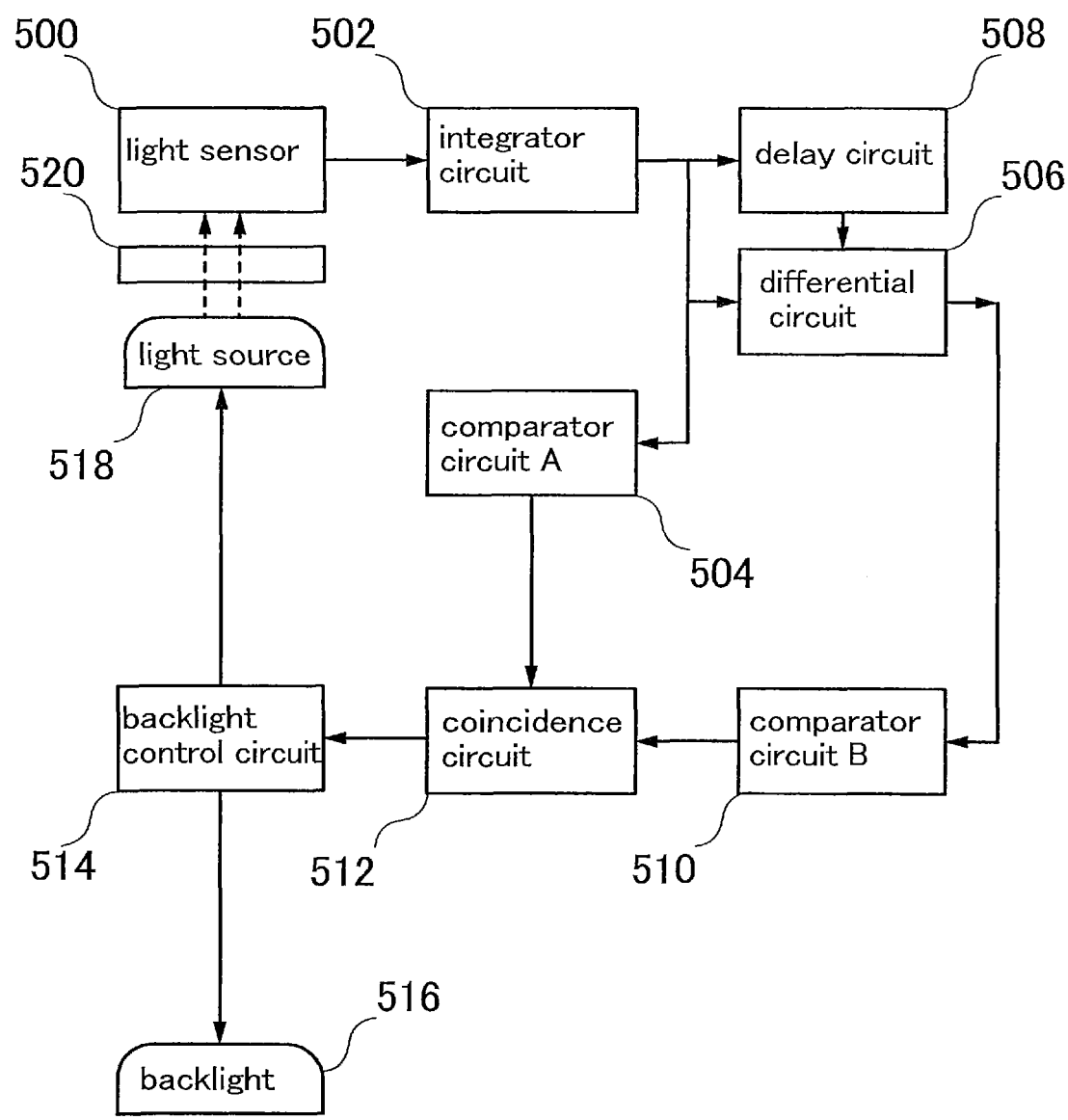
FIG. 5 is a diagram showing an example of a circuit of the present invention.

FIG. 5 is a diagram illustrating an example of a switching control circuit that controls switching of the backlight. A light sensor 500 is electrically connected to an integrator circuit 502, and the integrator circuit 502 is electrically connected to a comparator circuit A 504, a differential circuit 506, and a delay circuit 508. The delay circuit 508 is electrically connected to the differential circuit 506, and the differential circuit 506 is electrically connected to a comparator circuit B 510. The comparator circuit A 504 and the comparator circuit B 510 are electrically connected to a coincidence circuit 512, the coincidence circuit 512 is electrically connected to a backlight control circuit 514, and the backlight control circuit 514 is electrically connected to a backlight 516 and a light source 518 for monitor use. Light from the light source 518 for monitor use passes through a liquid crystal panel 520 to be incident on the light sensor 500. It is to be noted that, in FIG. 5, the connection relationship between the backlight control circuit 514 and the backlight 516 and the light source 518 for monitor use is shown; however, for cases in which the light source for monitor use is used in common with the backlight so that the light source for monitor use is omitted, the structure may be set to be one in which the backlight control circuit 514 is electrically connected to the backlight 516 only. Arrows in the diagram indicate the direction of transmission of principal signals.

The integrator circuit 502 has a role of time integration of light intensity (instantaneous luminance) detected by the light sensor. Human beings have a trait by which light intensity over a given period of time is integrated and perceived. For this reason, by use of the integrator circuit 502, the amount of luminance that is received by a human eye can be calculated.

It is to be noted that, in the present embodiment mode, a structure is shown in which the integrator circuit 502 is provided; however, the present invention is not limited to having this structure only. Because control in the present embodiment mode is control performed using instantaneous luminance, the structure may be set to be one in which the integrator circuit 502 need not be provided. By provision of the integrator circuit 502, more accurate control can be performed by reduction of the effects of noise. With cases in which the integrator circuit 502 is not provided, there is an advantage in that the structure can be simplified even more.

The comparator circuit A 504 has a role of comparison of the amount of luminance obtained by the integrator circuit 502 with a value determined in advance. The differential circuit 506 calculates the amount of difference between luminance obtained by the integrator circuit 502 and luminance during the previous luminance detection period obtained by the delay circuit 508. The comparator circuit B 510 has a role of comparison of the amount of difference obtained by the differential circuit 506 with a value determined in advance. The coincidence circuit 512 determines whether the comparison results of the comparator circuit A 504 and the comparison results of the comparator circuit B 510 both fulfill the conditions or not. The backlight control circuit 514 controls the backlight 516 and the light source 518 for monitor use based on signals from the coincidence circuit 512. It is to be noted that, in the present embodiment mode, it is preferable that the structure be set to be one in which the light source 518 for monitor use is constantly turned on; however, the present invention is not to be taken as being limited to this kind of structure only.

Here, using FIG. 6, an example of a switching control method for control of switching of the backlight will be described. At first, a target luminance H is specified (Step S600). It is preferable that the target luminance H be specified assuming a state in which the response speed is slowest, that is, a state in which the greatest amount of time is needed for completion of response, in this liquid crystal display device. For example, because the response to intermediate grayscale is slowest in a VA liquid crystal display device, the luminance for the aforementioned intermediate grayscale may be set to be the target luminance H. By the target luminance H being set in consideration of the state in which the response becomes slowest, the backlight can be made to turn on after the response of all pixels that form one screen is completed. This leads to an improvement in video performance.

Next, a threshold value I and a threshold value J are specified (Step S602). The threshold value I and the threshold value J are values that are used as a reference for switching of the backlight. Specifically, the threshold value I is a reference value used to determine if the target luminance has been reached or not; for example, in cases in which the response of the luminance is determined to have gone from a state of low luminance to a state of high luminance, the target luminance is considered as having been reached if the luminance is greater than or equal to the threshold value I. The threshold value J is a reference value used to determine if the luminance is stable or not; if the amount of change in the luminance is less than or equal to the threshold value J, the luminance is considered to be stable. The threshold value I and the threshold value J can be specified as appropriate so as to match targets for image characteristics and video performance. In addition, the threshold value I and the threshold value J may be set using the target luminance H as a reference. In the present embodiment mode, for an example is given a case in which the response of the luminance is determined to have gone from a state of low luminance to a state of high luminance, and a case in which the threshold value I is set to be 95% of the target luminance H will be described.

It is to be noted that in the case of use in an application in which only still images are displayed, control of switching of the backlight shown in the present embodiment mode may be set so as not to be performed, in practice. By the configuration being set in this way, because "instantaneous luminance" of the backlight in cases in which the same luminance is displayed can be kept low, there is an advantage with this case in that the length of the life of the backlight is improved.

It is to be noted that in cases in which the backlight is controlled for each display region, the structure may be set to be one in which a threshold value is set for each display region. That is, by control of switching of the backlight shown in the present embodiment mode being set so as not to be performed in practice in regions in which only still images are displayed, in regions in which moving images are displayed, the threshold value I may be set as appropriate according to requested image performance. By the configuration being set in this way, optimization of the screen in cases with still image regions and moving image regions comes to be possible.

It is preferable that the threshold value J be specified in consideration of the amount of noise and the like. For example, if the average noise level is about 1% of the target luminance H, then the threshold value J needs to be set so as to be greater than or equal to 1% of the target luminance H. However, because the threshold value J becomes unable to be used to determine whether the luminance is stable or not if increased too much, the threshold value J may be set to be of an approximate value by which the luminance can be determined to be stable or not while the noise level is being considered. As an example in the present embodiment mode, a case in which the threshold value J is set to be 1% of the target luminance H will be described.

Next, one frame period is divided up into a K number of periods (hereinafter referred to as luminance detection periods) of equal length (Step S604). It is to be noted that, in the present embodiment mode, for an example, a case in which one frame period is divided up into 30 luminance detection periods will be described. Here, for cases in which the response of the liquid crystal is not completed during one frame period, there is no need for one frame period to be set to be a test period during which control of switching of the backlight is performed. For example, in a liquid crystal display device and the like in which a liquid crystal material with a slow response is used in one part of the liquid crystal display device, there are cases in which the response of the liquid crystal is not completed during one frame period. In these kinds of cases, control can be performed with two or more frame periods being set to be test periods. Meanwhile, when the response speed of liquid crystal display devices of recent years is considered, in many liquid crystal display devices, the response of the liquid crystal is generally completed within one frame period. Consequently, in the present embodiment mode, an example will be described in which control is performed with one frame period being set to be a test period. Of course, the present invention can be implemented even in cases in which the driving frequency is increased (for example, double speed (120 Hz) driving, triple speed (180 Hz) driving, and the like). For example, in cases in which one frame period is divided up into an n number of subframe periods and n-speed driving is performed, the structure may be set to be one in which writing of a signal to all pixels is made to be completed during a first subframe period, and the length of time needed for response of the liquid crystal is calculated using one or a plurality of subframe periods including the first subframe period.

It is to be noted that, as in the present embodiment mode, during a period different from a frame period that is a reference, in order that some kind of operation (in the present embodiment mode, this operation is related to the above-described "detection of luminance during a luminance detection period"), a new timing signal corresponding to the target timing becomes needed. Here, for generation of a new timing signal in a simple structure, a clock signal input to a driver circuit may be used. For example, by performance of logic operations (for example, AND operations) performed based on outputs of an $(N-1)^{th}$ shift register and an $N^{th}$ shift register in the driver circuit, a new timing signal can be generated in an extremely simple structure. Furthermore, by the number of the stage of a selected shift register being changed as appropriate, a great variety of timing signals can be generated in a fairly simple structure. Alternatively, timing signals may be generated by frequency divider circuits and the like being combined together as appropriate.

Next, a luminance L in one luminance detection period is detected (Step S606). Then, the luminance L detected during one luminance detection period is compared to a threshold value I per luminance detection period, I/K (Step S608). When the detected luminance L exceeds the threshold value I per luminance detection period, I/K (or is greater than or equal to I/K), the process proceeds to the next step. When such is not the case, a luminance L' is detected during the next luminance detection period, and the same type of comparison is made (Step S606, Step S608). Here, is used as the object of comparison because I is a threshold value that is set based on the target luminance H and I/K is represented as the integral value of one frame period. Meanwhile, an integration period in detection of the luminance L is 1/K of one frame period.

Next, a difference in luminance δL is detected from the luminance L during one luminance detection period and a luminance L" during a previous luminance detection period (Step S610). Then, the difference in luminance δL is compared to the threshold value J per luminance detection period, J/K (Step S612). When the difference in luminance δL is smaller than the threshold value J per luminance detection period, J/K (or is less than or equal to J/K), the backlight is turned on at that timing (Step S614). When such is not the case, the process returns to Step S606, and the same steps are repeated one more time. Here, J/K is used as the object of comparison because J is a threshold value that is set based on the target luminance H and J/K is represented as the integral value of one frame period. Meanwhile, because the difference in luminance δL is a difference in luminance during one luminance detection period, an integration period is 1/K of one frame period.

Figure 6:
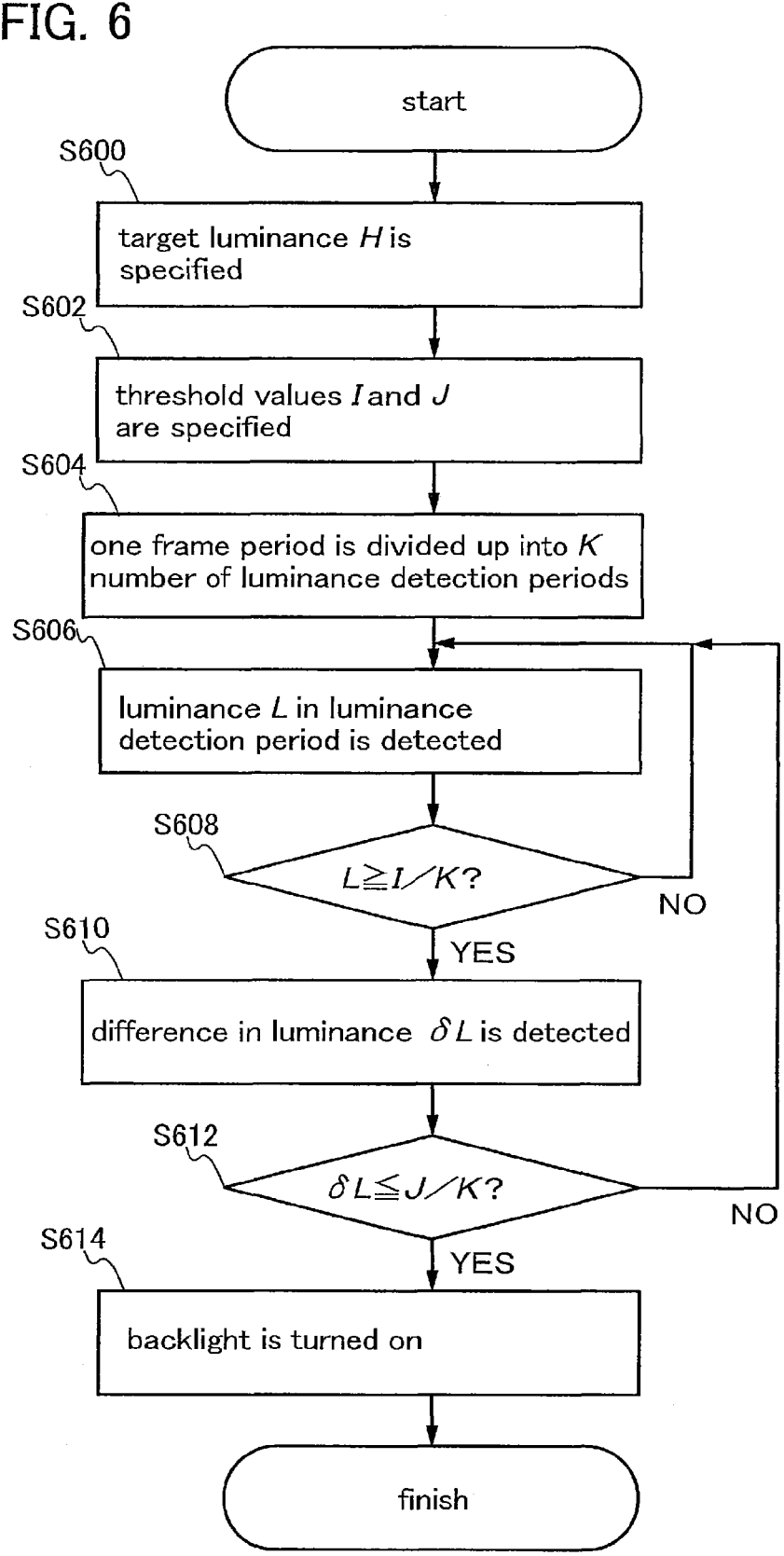
FIG. 6 is a diagram showing an example of a control method of the present invention.

It is to be noted that in the block diagram of a control circuit shown in FIG. 5, the configuration is set to be one in which the comparison for the threshold value I and the comparison for the threshold value J are performed in parallel, and then, results thereof are judged; however, in actual performance, the process is just like that show by the flow in FIG. 6. In the flow in FIG. 6, for sake of simplicity, a configuration is shown in which the comparison for the threshold value I is performed and then the comparison for the threshold value J is performed; however, the configuration may be set to be one in which the comparison for the threshold value J is performed first and then the comparison for the threshold value I is performed, or the configuration may be set to be that of the parallel type of flow illustrated in FIG. 5.

It is to be noted that, in the present embodiment mode, operations of pixels in a monitor section may be performed separately from operations of pixels in a display section, or the operations of pixels in the display section may be performed simultaneous with the operations of pixels in a monitor section. In cases in which the operations of pixels in the monitor section are performed simultaneous with the operations of pixels in the display section, it is preferable that operations be made to be performed simultaneously with respect to the last pixel in the monitor section to which a signal is written. By operations being made to be performed simultaneously with respect to the last pixel in the monitor section to which a signal is written, the timing at which the response of the liquid crystal in all pixels on the screen is completed becomes easy to calculate. In cases in which the operations of the pixels in the monitor section are performed separately from the operations of the pixels in the display section, the timing for the backlight being switched on and off may be corrected as appropriate.

As described above, timing for the backlight being switched on and off can be set according to the flow shown in FIG. 6. The set timing is stored in memory and can be used for a given continuous period of time. Of course, the structure may also be set to be one in which the timing of the backlight being switched on and off is changed for each frame period.

Figure 7:
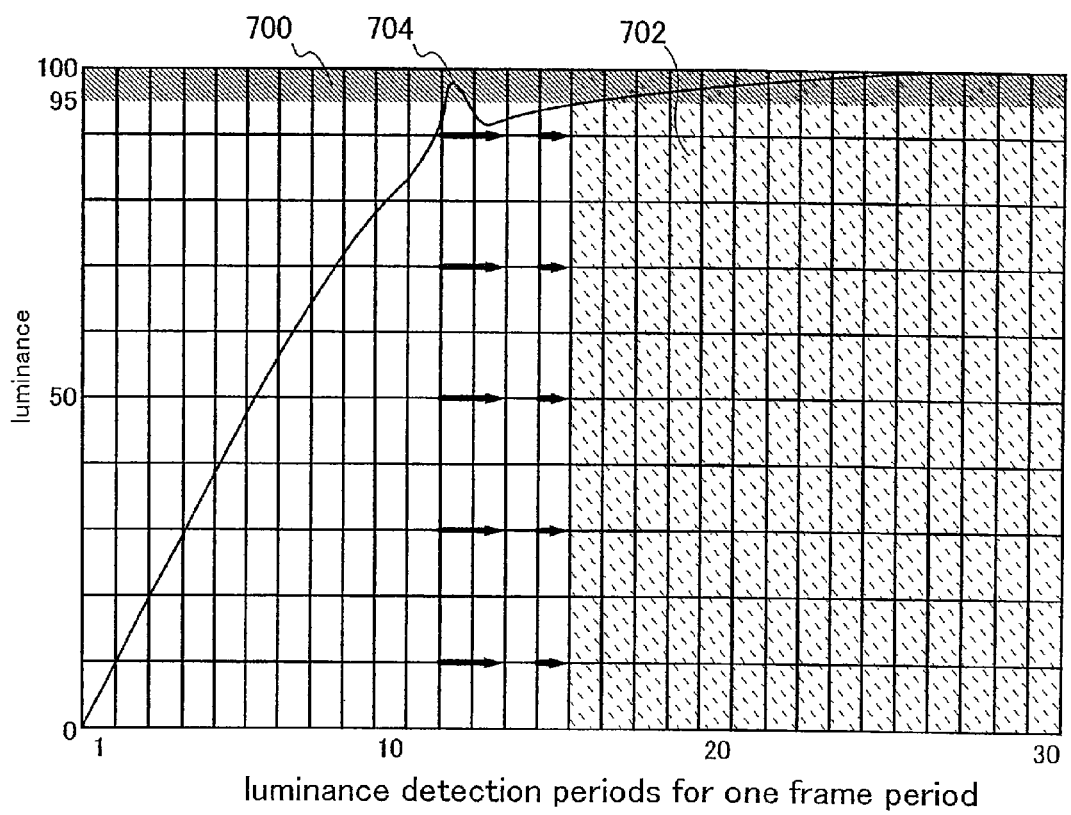
FIG. 7 is a diagram showing timing of when a backlight is turned on in the present invention.

FIG. 7 is a graph showing a relationship between luminance (instantaneous luminance) and timing for the backlight being turned on for cases in which the switching timing control method for control of the timing of the backlight being switched on and off shown in the present embodiment mode is used. The vertical axis in the graph represents luminance when the target luminance is set to be 100. The horizontal axis represents luminance detection periods for one frame period (from a first luminance detection period to a thirtieth luminance detection period). In FIG. 7, luminance greater than or equal to the threshold value is represented in a region 700, and a period during which the backlight is turned on is represented in a region 702. Long arrows in the graph indicate that it has been determined that the luminance has exceeded the threshold value for periods from the arrows onward (for periods from a fourteenth luminance detection period); short arrows in the graph indicate that, for periods prior to that (that is, for periods prior to the sixteenth luminance detection period), the amount of difference in luminance has dropped below the threshold value. In the present embodiment mode, a case in which the threshold value of the luminance is set to be 95% of the target luminance and one frame period is divided up into 30 luminance detection periods is shown; however, the present invention is not to be taken as being limited to this configuration. Various parameters can be changed as appropriate.

In the case of FIG. 7, an extremely large noise component 704 is present in a transient response period of the liquid crystal. However, this does not cause major problems with backlight control in the liquid crystal display device of the present embodiment mode. Even though the state is one in which the luminance exceeds the threshold value, the reason why problems do not occur with backlight control is because comparison of the difference in luminance with a threshold value is performed in addition to comparison of the luminance with a threshold value. For comparison of the luminance with a threshold value and comparison of the difference in the luminance with a threshold value, so to speak, two different kinds of filters are used to detect optimal timing. As described in the present embodiment mode, by combination of different methods to remove the noise component, backlight control of an even higher level of accuracy comes to be possible. Of course, a method that can be used as a filter is not to be taken as being limited to the method described in the present embodiment mode. For example, as described in Embodiment Mode 2, noise may be eliminated by addition of a new condition, which is that "the backlight is to be turned on when the detected luminance exceeds the threshold value at least two times (or more than two times) in a row." Furthermore, three or more different methods may also be used in combination with each other.

In the case of FIG. 7, as with the case of FIG. 4 in Embodiment Mode 2, timing at which conditions are fulfilled and timing of the backlight being turned on are not exactly equal to each other. However, as described in Embodiment Mode 2, this problem may be solved by the length of a luminance detection period, which is an integration period, being shortened enough (that is, by one frame period being divided up into a number of luminance detection periods). Of course, this kind of problem may be solved, not by use of luminance determined by time integration, but rather, by the structure being set to be one in which determination is performed using instantaneous luminance. Furthermore, in cases in which the timing of control of the backlight is retained in memory and constant control is performed for a given period of time at the same timing, a correction is added as appropriate (in the case of FIG. 7, the timing for the backlight being turned on is switched from being during the sixteenth luminance detection period to being during the fifteenth luminance detection period), and the timing for the backlight being turned on can be optimized even more.

It is to be noted that, in the present embodiment mode, a case in which the case of the luminance being changed from a state of low luminance to a state of high luminance is set to be a test pattern is described; however, the present invention is not to be taken as being limited to this case only. The present invention can also be used in a structure in which the case of the luminance being changed from a state of high luminance to a state of low luminance is set to be a test pattern. In this case, different parameters may be changed as appropriate.

As described above, by performance of control of the switching of the backlight using a light sensor, the realization of impulse driving by optimal timing becomes possible. Herewith, video performance is improved dramatically. Furthermore, even in cases in which the response of the liquid crystal changes with changes in the environment (temperature, pressure, and the like), because optimal impulse driving can be realized, the video performance can be maintained in a high state constantly. In addition, because temperature sensors and the like used to detect changes in the environment become unnecessary and there is no need to use a reference table (a so-called lookup table) for control of the switching of the backlight, structures of sensors, memory, and the like can be simplified.

It is to be noted that impulse driving for cases in which the present invention is used is different from impulse driving in the conventional meaning. That is, while conventional impulse driving refers to luminance focused on one pixel changing in a pulse-like manner, impulse driving realized by use of the present invention refers to luminance of pixels of one screen changing simultaneously and in a pulse-like manner. To further reiterate, while conventional impulse driving is impulse driving by point-sequential driving or line-sequential driving, impulse driving realized by use of the present invention has a kind of aspect of pixels for one screen being turned on simultaneously, a "frame-sequential driving" kind of aspect. Because all pixels for one screen can be turned on simultaneously, video performance can be dramatically improved. It is to be noted that, to realize the above-described impulse driving, the length of an intended period (one frame period in the present embodiment mode) needs to be longer than the sum of the length of time needed for writing of a signal to all pixels and the length of time needed for completion of the response of the liquid crystal of all pixels. This is attributed to the fact that turning on of the backlight starts from a state in which the response of the liquid crystal of all pixels is completed. However, in view of improvements in processing capability of driver circuits, improvements in the response speed of a liquid crystal, and the like in recent years, this point does not cause any problems in particular.

In addition, even in states in which no time passes from input of electricity and in states in which a constant period of time passes from input of electricity, a liquid crystal display device exhibiting high video performance can be provided. Furthermore, high video performance can be obtained even in display panels on streets that are subject to hostile environments, cellular phones, car electronics, and the like.

Furthermore, in the liquid crystal display device of the present embodiment mode, timing of the backlight being turned on is controlled using two types of different conditions. Herewith, control of an extremely high level of accuracy with effects of noise and the like removed comes to be possible. That is, high-level video performance becomes possible to be provided stably.

It is to be noted that, in the present embodiment mode, a description is given for cases in which control of switching of a backlight is performed; however, the present invention can be used in cases other than in cases in which control of switching of a backlight is performed. For example, the present invention can also be used to determine optimal voltage in overdriving. In this case, by overdrive voltage being controlled so that display is performed at a target luminance by a desired period, video performance can be improved dramatically. Of course, control of overdrive voltage and control of switching of the backlight may be used in combination with each other.

Furthermore, in the present embodiment mode, an example is given in which processing is performed using hardware; however, the present invention is not to be taken as being limited to this configuration. Because a technical idea of the present embodiment mode is that control of switching of a backlight is performed based on information obtained from a light sensor, any type of structure can be employed as long as it is a structure in which this technical idea can be implemented. For example, processing performed using hardware in the present embodiment mode can also be performed using software.

The present embodiment mode can be used in combination with any of Embodiment Mode 1 through Embodiment Mode 2, as appropriate. It is to be noted that the output control of the output of a backlight shown in Embodiment Mode 1 and control of switching of a backlight in the present embodiment mode can be used in combination with each other. By the structures being used in combination with each other, a liquid crystal display device with excellent image quality and high video performance is realized (Embodiment Mode 4)

In the present embodiment mode, another example of a liquid crystal display device and a driving method thereof of the present invention will be described using FIG. 8.

Because the structure of a panel that can be used in a liquid crystal display device of the present invention is the same as that of Embodiment Mode 1, a detailed description thereof will be omitted here. In the present embodiment mode, a case in which a combination of an output (luminance) control method of a backlight of Embodiment Mode 1 and a switching control method of a backlight of Embodiment Mode 2 or Embodiment Mode 3 is used will be described hereinafter.

Figure 8:
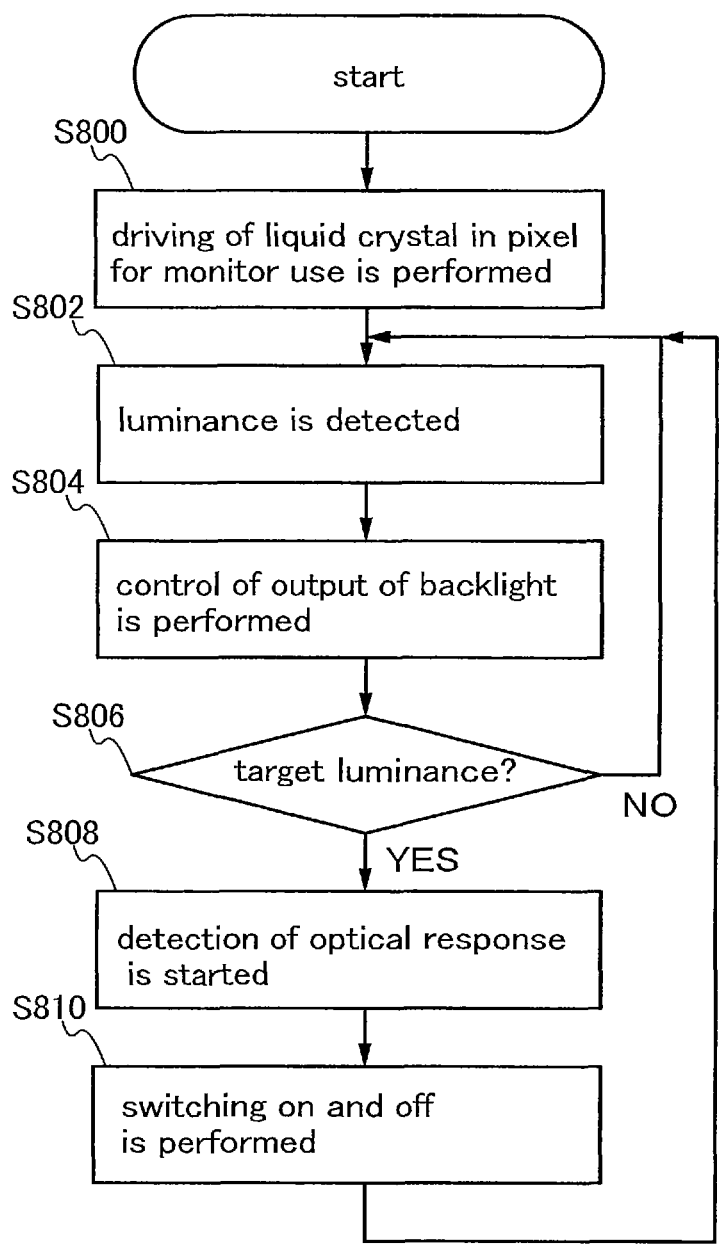
FIG. 8 is a diagram showing an example of a control method of the present invention.

FIG. 8 is an example of a case in which a combination of an output (luminance) control method of a backlight and a switching control method of a backlight is used. It is to be noted that, for a circuit structure, because the circuit structures given in any of Embodiment Mode 1 to Embodiment Mode 3 can be used together in combination, a detailed description thereof will be omitted here. It is to be noted that the circuit structure of the present embodiment mode is not to be taken as being limited to being a combination of the circuit structures of Embodiment Mode 1 to Embodiment Mode 3, and a circuit structure that has the same functions can be used as appropriate. Furthermore, a circuit that can be used in common when a combination of the circuit structures of Embodiment Mode 1 to Embodiment Mode 3 is used may be used in common. For example, the structure may be set to be one in which an integrated circuit is used in common.

In the present embodiment mode, a structure in which, at first, control of output of a backlight is performed and then control of switching of a backlight is performed will be described. Of course, the structure may be set to be one in which, at first, control of switching of a backlight is performed and then control of output of a backlight is performed, as well. It is to be noted that because reference can be made to Embodiment Mode 1 to Embodiment Mode 3 in regard to details of each of the operations of control of output of a backlight and control of switching of a backlight, such details will be omitted here.

First, lighting of a backlight and a light source for monitor use is started. At the same time, driving of a liquid crystal in a pixel for monitor use is performed using a monitor pattern (Step S800). Here, in cases in which the backlight and the light source for monitor use are provided separately from each other, lighting of the backlight and lighting of the light source for monitor use may both be started at the same time. Then, luminance is detected by a light sensor (Step S802), and control of the output of the backlight is performed using the detected luminance (Step S804).

Next, the detected luminance and a target luminance are compared (Step S806). Here, in cases in which the target luminance is not reached, the same steps are repeated during a subsequent period. It is to be noted that the length of a unit period during which output of the backlight is to be controlled may be equal to the length of one frame period or longer than the length of one frame period. Moreover, the unit period may be set to be a period that is shorter than one frame period, as well. In cases in which the target luminance is reached, for control of switching of the backlight, detection of the optical response of the liquid crystal is started (Step S808).

Next, control of the backlight being switched on and off is performed according to the detected optical response (Step S810). In cases in which the control of the backlight being switched on and off is completed, the step for the control of the output of the backlight is again performed.

It is to be noted that, in the present embodiment mode, the structure is set to be one in which control of the output of the backlight is performed again after control of the backlight being switched on and off is completed; however, the present invention is not limited to having this structure only. The structure may also be set to be one in which, after control of the backlight being switched on and off is completed, control of the output of the backlight is performed after a given amount of time has passed. By repeated performance of control of the output of the backlight and control of the backlight being switched on and off during a short period of time, the liquid crystal display device can be maintained at an optimal state constantly. On the other hand, by control of the output and control of the switching being performed again after a given amount of time has passed, the number of times of operation of a circuit used for control can be decreased while the liquid crystal display device is maintained at a favorable condition. That is, power consumption can be reduced while excellent image quality and high video performance are maintained.

Moreover, in view of characteristics of the present invention, by combination of a liquid crystal material by which a high viewing angle can be realized with a driving method (for example, a VA method, an IPS method, or the like) by which a high viewing angle can be realized, even more superior image quality can be provided. In addition, by use of a liquid crystal material that has a fast response speed with a driving method (for example, an OCB method or the like) that has a fast response speed, even high video performance can be obtained.

As described above, by performance of control of the output (luminance) of the backlight and control of the switching of the backlight using a light sensor, impulse driving by optimal timing can be realized while desired luminance is displayed accurately. Herewith, a liquid crystal display device with excellent image quality and high video performance can be provided. Furthermore, even in cases in which the response speed of the liquid crystal changes with changes in the environment (temperature, pressure, and the like), optimal impulse driving can be realized while the desired luminance is maintained. Thus, excellent image quality and high video performance can be provided under any circumstances. In addition, because temperature sensors and the like used to detect changes in the environment become unnecessary and there is no need to use a reference table (a so-called lookup table) from which to refer in regard to the relationship between temperature, and the like, and luminance, structures of sensors, memory, and the like can be simplified.

It is to be noted that impulse driving for cases in which the present invention is used is different from impulse driving in the conventional meaning. That is; while conventional impulse driving refers to luminance focused on one pixel changing in a pulse-like manner, impulse driving realized by use of the present invention refers to luminance of pixels of one screen changing simultaneously and in a pulse-like manner. To further reiterate, while conventional impulse driving is impulse driving by point-sequential driving or line-sequential driving, impulse driving realized by use of the present invention has a kind of aspect of pixels for one screen being turned on simultaneously, a "frame-sequential driving" kind of aspect. Because all pixels for one screen can be turned on simultaneously, video performance can be dramatically improved.

In addition, even in states in which no time passes from input of electricity and in states in which a constant period of time passes from input of electricity, excellent image quality and high video performance can be provided. Furthermore, excellent image quality and high video performance can be obtained even in display panels on streets that are subject to hostile environments, cellular phones, car electronics, and the like.

It is to be noted that, in the present embodiment mode, a description is given for cases in which control of switching of a backlight is performed; however, the present invention can be used in cases other than in cases in which control of switching of a backlight is performed. For example, the present invention can also be used to determine optimal voltage in overdriving. In this case, by overdrive voltage being controlled so that display is performed at a target luminance by a desired period, video performance can be improved dramatically. Of course, control of overdrive voltage and control of switching of the backlight may be used in combination with each other.

The present embodiment mode can be used in combination with any of Embodiment Mode 1 through Embodiment Mode 3, as appropriate.

(Embodiment Mode 5)

In the present embodiment mode, a liquid crystal display device with a structure differing from that of the liquid crystal display device shown in Embodiment Mode 1 will be described using FIGS. 9A and 9B and FIGS. 10A to 10D.

The structure shown in FIGS. 1A and 1B of Embodiment Mode 1 is that of a case in which luminance of a backlight or of a light source for monitor use is detected by a light sensor, and the case is assumed to be one in which the backlight and the light source for monitor use are provided on the same side (specifically, below the polarizing plate 120a) as the liquid crystal layer. On the other hand, in FIGS. 9A and 9B, a structure in which the backlight is on one side of a liquid crystal layer and the light source for monitor use is on the other side of the liquid crystal layer is shown. It is to be noted that, for cases in which the structure shown in FIGS. 9A and 9B is used, an important point that needs to be taken into account is that there is a need for the backlight and the light source for monitor use to be provided separately from each other.

Figure 9A:
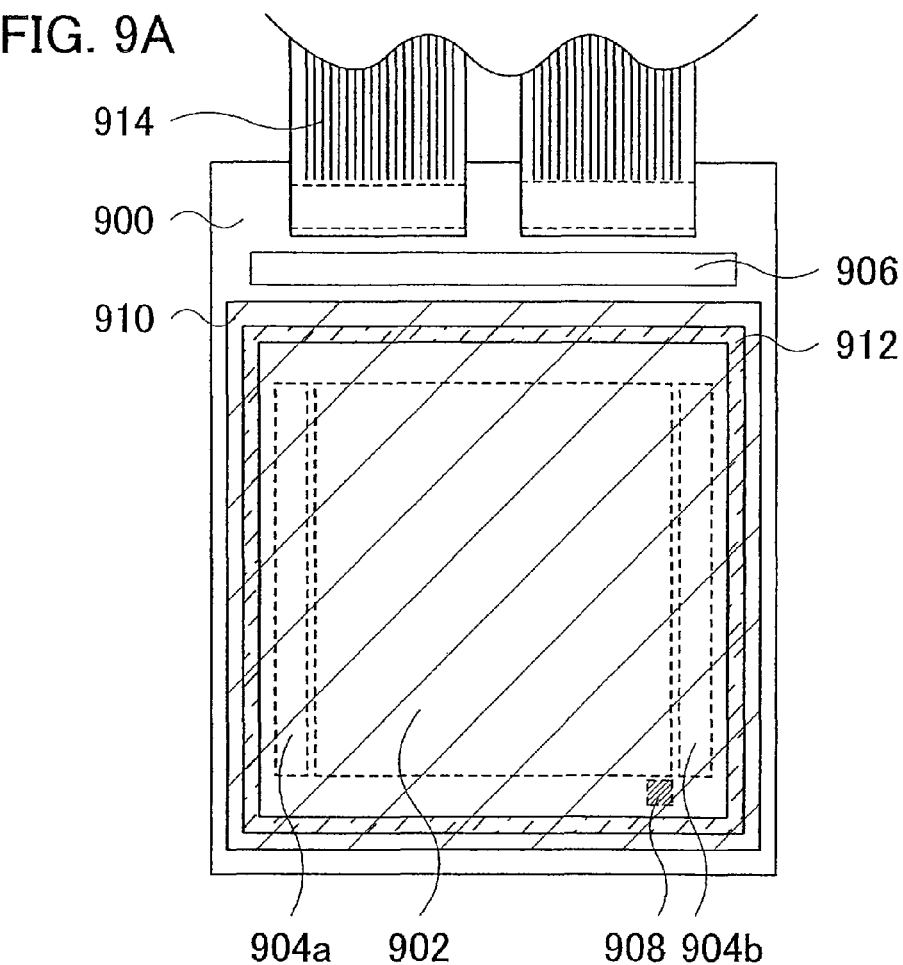
FIGS. 9A and 9B are diagrams showing examples of a structure of a panel of the present invention.

FIG. 9A shows a planar-view diagram of a panel. With regard to the planar-view diagram, the structure is about the same as the structure shown in FIGS. 1A and 1B. A substrate 900 and a counter substrate 910 are bonded together by a sealant 912. Furthermore, a pixel section 902, a scanning line driver circuit 904a, a scanning line driver circuit 904b, a signal line driver circuit 906, and a monitor section 908 are provided between the substrate 900 and the counter substrate 910. Signals from external are input via a flexible printed circuit (an FPC) 914.

Figure 9B:
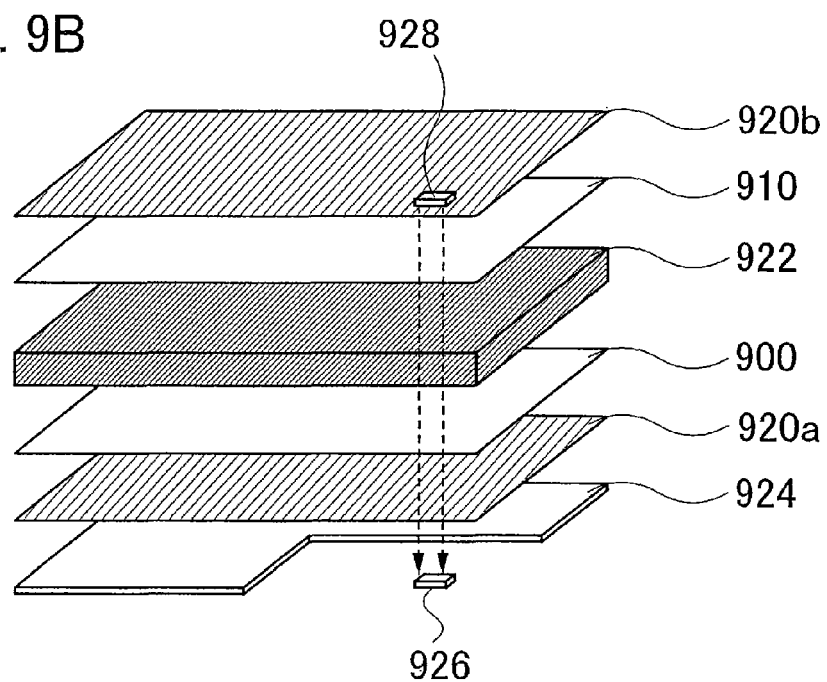

FIG. 9B is a diagram in which a simplified stacked-layer structure of the panel shown in FIG. 9A is shown. A liquid crystal layer 922 is provided between the substrate 900 and the counter substrate 910. Furthermore, a polarizing plate 920a and a polarizing plate 920b are provided on an outer side of the substrate 900 and an outer side of the counter substrate 910 (the lower side of the substrate 900 and the upper side of the counter substrate 910 in the diagram), respectively. A backlight 924 and a light sensor 926 are provided on the outer side of the polarizing plate 920a (on the lower side of the polarizing plate 920a), and a light source 928 for monitor use is provided on the outer side of the polarizing plate 920b (on the upper side of the polarizing plate 920b).

The light sensor 926 detects light that passes through the polarizing plate 920b, the counter substrate 910, the liquid crystal layer 922, the substrate 900, and the polarizing plate 920a in the order given. Herewith, changes in the luminance of the backlight occurring with changes in the environment (for example, changes in temperature, pressure, and the like) and the length of time for response of the liquid crystal are calculated, whereby control of the backlight (for example, control of the luminance, control of the timing of switching, and the like of the backlight) can be performed. In FIGS. 9A and 9B, a structure is shown in which the light sensor 926 and the backlight 924 are provided in the same layer; however, the present invention is not limited to having this structure. The light sensor 926 may be placed in such a way that light from the backlight 924 is not detected. Furthermore, in FIGS. 9A and 9B, the structure is one in which the backlight 924 has a notch in one part; however, the present invention is not to be taken as being limited to having this structure.

For the light source for monitor use, it is preferable that a light source that has the same characteristics as those of the backlight be used; however, if the luminance of the light source for monitor use and the luminance of the backlight are to have a correspondence relationship, then the present invention is not to be taken as being limited to use of a light source with the same characteristics as those of the backlight. It is to be noted that, in FIG. 9B, a structure in which light is extracted from a counter substrate side is shown; however, the present invention can be used in a liquid crystal display device with a structure in which light is extracted from a substrate (active matrix substrate) side in the same way. In this case, the light sensor is to detect light that passes through a polarizing plate, a substrate (an active matrix substrate), a liquid crystal layer, a counter substrate, and a polarizing plate in the order given.

It is to be noted that, for an example of a structure resembling the structure of FIGS. 9A and 9B, there is a structure in which light from external (external light) is used instead of the light source for monitor use. If light from external is detected by a light sensor, the luminance of the backlight can be adjusted in response to the brightness of the surroundings. It is to be noted that, in achievement of this objective, the structure may be any kind of structure as long as it is one in which the light sensor can detect light from external and is not to be taken as being limited to being a structure similar to the structure shown in FIGS. 9A and 9B. In addition, in conditions in which the light from external is stable, control of switching of the backlight can also be performed using the light from external in the calculation of the time needed for response of the liquid crystal.

Figure 10A:
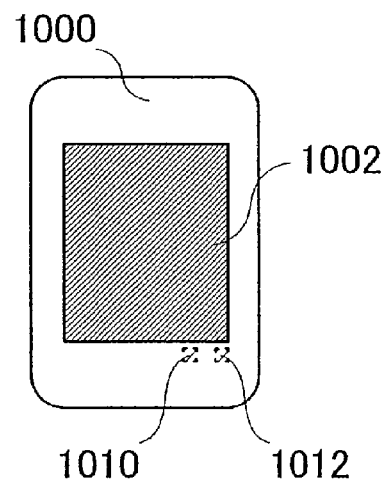
FIGS. 10A to 10D are diagrams showing examples of placement of a monitor section in a liquid crystal display device of the present invention.
Figure 10B:
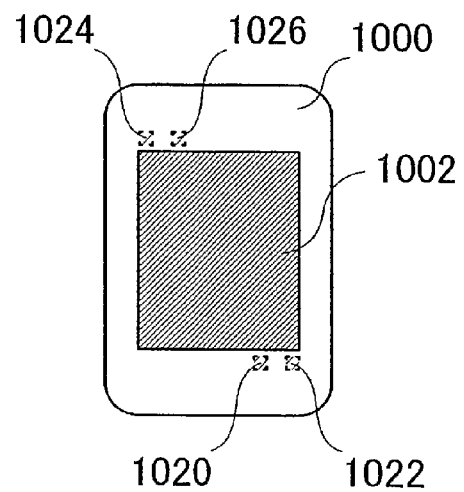
Figure 10C:
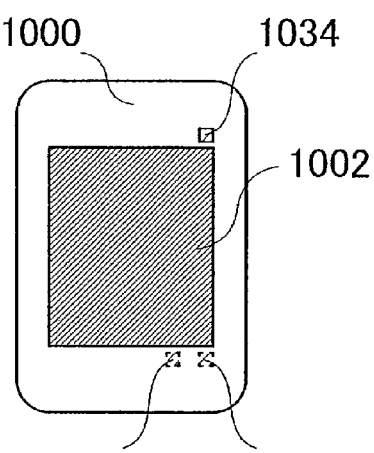
Figure 10D:
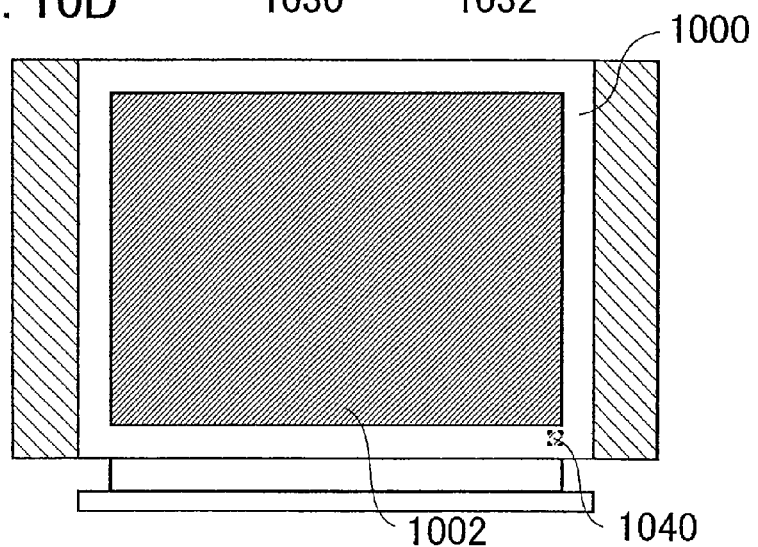

Next, examples of placement of a monitor section in a liquid crystal display device are shown in FIGS. 10A to 10D. FIGS. 10A to 10C are diagrams showing examples of placement of a monitor section in a liquid crystal display device in which a small-sized panel is used. FIG. 10D is a diagram showing an example of placement of a monitor section in a liquid crystal display device in which a large-sized panel is used. It is to be noted that a housing 1000 and a display section 1002 are indicated using the same reference numerals in each of FIGS. 10A to 10D.

FIG. 10A shows an example of a structure in which a monitor section 1010 and a monitor section 1012 are provided. A light sensor is provided in each of the monitor section 1010 and the monitor section 1012. Due to there being two monitor sections, luminance detection for output control and luminance detection for switching control can be performed using different light sensors. That is, output control and switching control can be performed separately, or output control and switching control can be performed simultaneously. In cases in which output control and switching control are performed simultaneously, because the length of a period of time needed for control can be shortened compared to that of cases in which output control and switching control are performed alternatingly, control can be performed even more finely.

FIG. 10B shows an example of a structure in which a monitor section 1020, a monitor section 1022, a monitor section 1024, and a monitor section 1026 are provided. A light sensor is provided in each of the monitor section 1020, the monitor section 1022, the monitor section 1024, and the monitor section 1026. The monitor section 1020 and the monitor section 1024 are monitor sections used for performance of luminance detection for output control, and the monitor section 1022 and the monitor section 1026 are monitor sections used for performance of luminance detection for switching control. By performance of luminance detection for output control and luminance detection for switching control using two light sensors for each, the accuracy of the luminance detection can be improved. In FIG. 10B, an example is shown in which luminance detection for output control and luminance detection for switching control are performed using two monitor sections for each; however, the structure may be set to be one in which luminance detection is performed using three or more monitor sections for each, as well.

FIG. 10C shows an example of a structure in which a monitor section 1030, a monitor section 1032, and a monitor section 1034, are provided. A light sensor is provided in each of the monitor section 1030, the monitor section 1032, and the monitor section 1034. In addition, an opening is provided in a region corresponding to that of the monitor section 1034 of the housing 1000. The monitor section 1030 is a monitor section used for performance of luminance detection for output control, and the monitor section 1032 is a monitor section used for performance of luminance detection for switching control. Light from external is detected by the monitor section 1034. By provision of the monitor section 1034, the luminance of the backlight can be adjusted in response to the brightness of the surroundings. Furthermore, in conditions in which the light from external is stable, control of switching of the backlight can also be performed using the light from external in the calculation of the time needed for response of the liquid crystal.

In a liquid crystal display device of FIG. 10D, a monitor section 1040 is provided. A light sensor is provided in the monitor section 1040. In a large-sized liquid crystal display device such as the one shown in FIG. 10D, changes in the surrounding environment are more moderate compared with the kind of liquid crystal display devices used in portable devices and the like. Consequently, the structure may also be set to be one in which the number of monitor sections is minimized. Of course, fine control may be performed by provision of a plurality of monitor sections, as well.

The present embodiment mode can be used in combination with any of Embodiment Mode 1 through Embodiment Mode 4, as appropriate.

(Embodiment Mode 6)

In the present embodiment mode, an example of a light sensor in which the present invention is used will be described using FIGS. 11A and 11B. Specifically, an example of a structure of a photo IC will be described.

Figure 11A:
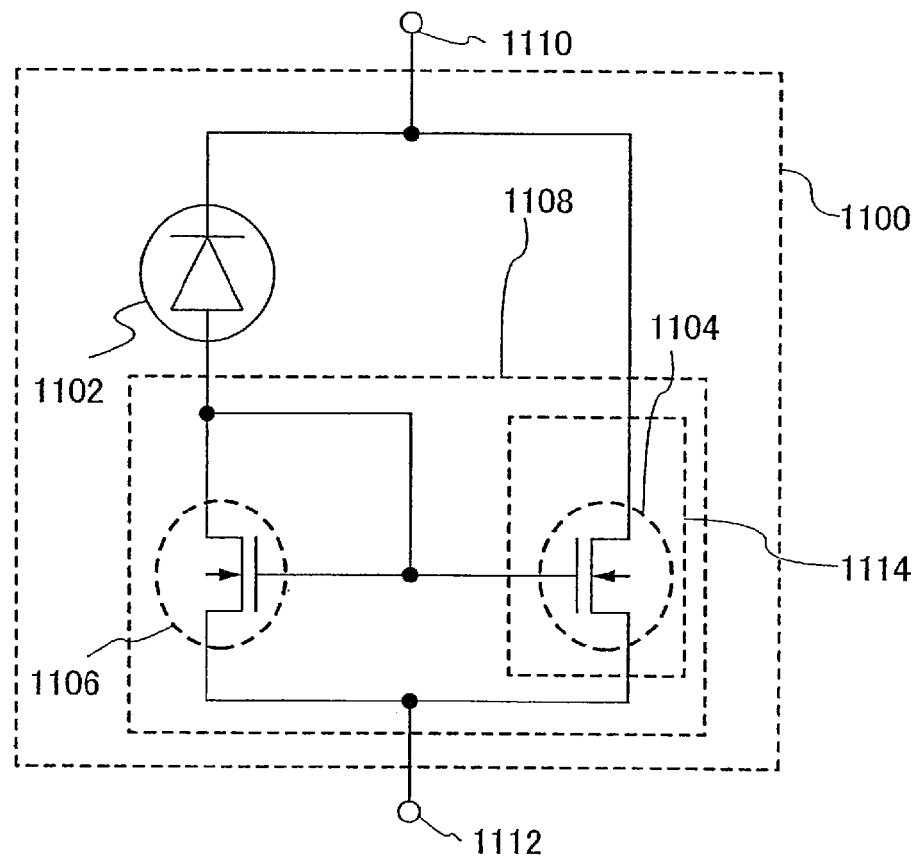
FIGS. 11A and 11B are diagrams showing examples of a structure of a light sensor of the present invention.

A photo IC 1100 shown in FIG. 11A has a photoelectric conversion element 1102 and an integrated circuit that is formed of transistors; it is preferable that the integrated circuit have a structure that has a current mirror circuit 1108 that is formed of at least a transistor 1104 and a transistor 1106 that is connected to a diode. It is to be noted that, in the present embodiment mode, the transistors of which the current mirror circuit 1108 is formed may be either n-channel transistors or p-channel transistors, but an example in which the transistors are n-channel transistors is given here. In addition, a photo IC is also referred to as a photoelectric device.

A terminal 1110 is connected to a gate electrode and a first electrode (either a source electrode or drain electrode) of the transistor 1106 via the photoelectric conversion element 1102, and a second electrode (the other one of either the source electrode or drain electrode) of the transistor 1106 is connected to a terminal 1112. Furthermore, the terminal 1110 is also connected to a first electrode (either a source electrode or drain electrode) of the transistor 1104. Meanwhile, a second electrode (the other one of either the source electrode or drain electrode) of the transistor 1104 is connected to the terminal 1112. It is to be noted that a gate electrode of the transistor 1104 is connected to the gate electrode of the transistor 1106.

In the photo IC 1100, electrons and holes are generated when the photoelectric conversion element 1102 is irradiated with light, whereby an electric current is produced. It is to be noted that the current mirror circuit 1108 operates to amplify the amount of electric current obtained from the photoelectric conversion element 1102. In the photo IC 1100 shown in the present embodiment mode, a case is given in which there is one transistor 1104, that is, a case in which the amount of electric current obtained from the photoelectric conversion element 1102 is amplified by twice as much; however, for cases in which an even greater amount of electric current is desired to be obtained, a plurality of units 1114, which are each formed of the transistor 1104 the gate electrode of which is connected to the gate electrode of the transistor 1106, may be provided connected together in parallel between the terminal 1110 and the terminal 1112. For example, by the number of the units 1114 being set to be n, the photo IC 1100 can be made to output approximately twice (n+1) as much electric current as an electric current I obtained from the photoelectric conversion element 1102. It is to be noted that because the amount of electric current obtained from the photoelectric conversion element 1102 depends on the amount of illuminance, the amount of illuminance, that is, the amount of irradiated light, becomes able to be detected.

Next, a structure of the photoelectric conversion element 1102 will be described with reference to FIG. 11B.

Figure 11B:
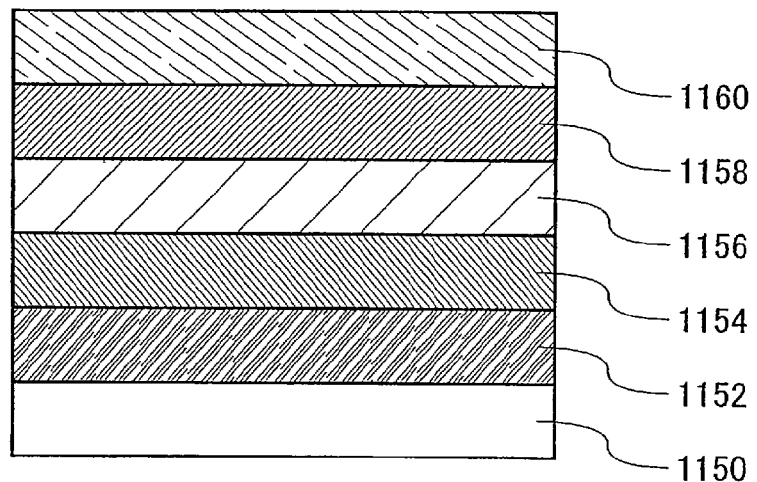

FIG. 11B is a diagram showing a simplified of a stacked-layer structure of the photoelectric conversion element 1102. The photoelectric conversion element 1102 is formed by a conductive film that transmits light, a first conductive semiconductor layer, an intrinsic layer (an intrinsic semiconductor layer), and a second conductive semiconductor layer being stacked together in the order given over a substrate that transmits light. Specifically, a conductive film 1152 that transmits light, a p-type semiconductor layer 1154, an intrinsic layer 1156, an n-type semiconductor layer 1158, and a back electrode 1160 are stacked together in the order given over a substrate 1150 that transmits light.

For the substrate 1150 that transmits light, substrates in which insulating materials are used can be given. For example, a glass substrate of barium borosilicate glass, aluminum borosilicate glass, or the like; a quartz substrate; a stainless steel substrate; or the like can be used. Furthermore, a flexible substrate formed of a synthetic resin such as a plastic typified by PET, PES, or PEN; acrylic; or the like can be used, as well. It is to be noted that, in view of properties of the photoelectric conversion element, it is desired that the substrate that transmits light have a property by which desired light is transmitted.

The conductive film 1152 that transmits light can be formed by a sputtering method or the like using a material that transmits light such as indium tin oxide (ITO), indium tin oxide that contains silicon oxide, zinc oxide (ZnO), tin oxide ($SnO_2$), or the like. For thickness, it is preferable that the thickness of the conductive film 1152 that transmits light be 1 μm or less. It is to be noted that, needless to say, it is desired that the conductive film 1152 that transmits light also have a property by which desired light is transmitted.

The p-type semiconductor layer 1154, the intrinsic layer 1156, and the n-type semiconductor layer 1158 can each be formed using a plasma CVD method or the like. For conductive materials, using materials in which silicon (Si) is set to be the main component is preferable; however, materials that can be used are not limited to being silicon. Materials can be selected as appropriate based on desired characteristics. In the p-type semiconductor layer 1154, boron or the like is used as a dopant, and in the n-type semiconductor layer 1158, phosphorus or the like is used as a dopant.

The back electrode 1160 can be formed by a CVD method, a sputtering method, an evaporation method, or the like using a metal element such as tantalum (Ta), tungsten (W), titanium (Ti), molybdenum (Mo), chromium (Cr), aluminum (Al), gold (Au), silver (Ag), copper (Cu), platinum (Pt), niobium (Nb), or the like or an alloy material or a compound material containing one or more of these metal elements. For thickness, it is preferable that the thickness of the back electrode 1160 be 100 μm or less.

It is to be noted that the structure of the photoelectric conversion element 1102 shown in FIG. 11B is merely one example, and the present invention is not to be taken as being limited to this structure only. A photoelectric conversion element in which changes, additions, or the like are made to the stacked-layer structure can be used, as well.

Furthermore, for the structure of the photo IC, as well, the structure is not to be taken as being limited to that shown in FIG. 11A. A photo IC with a structure that does not have a current mirror circuit may be used, or a photo IC with a structure other than this kind of structure may be used. Moreover, the structure of the photoelectric conversion element used in the photo IC is not limited to being the structure given in the present embodiment mode.

In addition, because a photo IC is only one example of a light sensor, another type of light sensor can also be used to realize the present invention. For example, a photomultiplier tube or the like can also be used for the light sensor.

The present embodiment mode can be used in combination with any of Embodiment Mode 1 through Embodiment Mode 5, as appropriate.

(Embodiment Mode 7)

Examples of a fabrication method of a semiconductor substrate that can be used in a liquid crystal display device of the present invention will be described using FIGS. 12A to 12D, FIGS. 13A to 13C, and FIGS. 14A to 14C. It is to be noted that cases in which a crystalline semiconductor film is used will be described in the present embodiment mode; however, an amorphous semiconductor film or a single-crystal semiconductor film may be used, as well.

First, as shown in FIG. 12A, a base film 1202 is formed over a substrate 1200. For the substrate 1200, for example, a glass substrate of barium borosilicate glass, aluminum borosilicate glass, or the like; a quartz substrate; a stainless steel substrate; or the like can be used. Furthermore, a flexible substrate formed of a synthetic resin such as a plastic typified by PET, PES, or PEN; acrylic; or the like can also be used.

The base film 1202 is provided to prevent an alkali metal, such as Na or the like, or an alkaline earth metal contained within the substrate 1200 from diffusing into a semiconductor film and imparting adverse effects on the characteristics of a semiconductor element. Consequently, the base film 1202 is formed using an insulating material of silicon nitride or silicon oxide that contains nitrogen by which the diffusion of an alkali metal or alkaline earth metal into a semiconductor film can be suppressed. In the present embodiment mode, a silicon oxide film that contains nitrogen is formed for the base film 1202 so as to have a film thickness greater than or equal to 10 nm and less than or equal to 400 nm (preferably, greater than or equal to 50 nm and less than or equal to 300 nm) using a plasma CVD method.

Next, a semiconductor film 1204 is formed over the base film 1202. The film thickness of the semiconductor film 1204 is set to be greater than or equal to 25 nm and less than or equal to 100 nm (preferably, greater than or equal to 30 nm and less than or equal to 60 nm). It is to be noted that the semiconductor film 1204 may be formed of an amorphous semiconductor or a polycrystalline semiconductor. In addition, for the semiconductor, not only silicon (Si) but also silicon germanium (SiGe) or the like can be used. When silicon germanium is used, it is preferable that the concentration of germanium be greater than or equal to 0.01 at. % approximately and less than or equal to 4.5 at. % approximately.

Next, as shown in FIG. 12B, crystallization is performed by irradiation of the semiconductor film 1204 with a linear laser beam 1208. If laser crystallization is performed as in the present embodiment mode, in order to increase the tolerance of the semiconductor film 1204 to a laser beam, a heat treatment step performed at a temperature of 500° C. for one hour may be added before the laser crystallization step.

In the laser crystallization step, for example, a continuous wave laser (a CW laser), a quasi-continuous wave laser (a pulsed laser with a repetition rate of 10 MHz or more, preferably, 80 MHz or more), or the like can be used.

Specifically, for a continuous wave laser, an Ar laser, a Kr laser, a $CO_2$ laser, a YAG laser, a $YVO_4$ laser, a YLF laser, a $YAlO_3$ laser, a $GdVO_4$ laser, a $Y_2O_3$ laser, a ruby laser, an alexandrite laser, a Ti:sapphire laser, a helium-cadmium laser, and the like can be given.

Furthermore, for a quasi-CW laser, a pulsed laser such as an Ar laser, a Kr laser, an excimer laser, a $CO_2$ laser, a YAG laser, a $YVO_4$ laser, a YLF laser, a $YAlO_3$ laser, a $GdVO_4$ laser, a $Y_2O_3$ laser, a ruby laser, an alexandrite laser, a Ti:sapphire laser, a copper vapor laser, or a gold vapor laser can be given.

This kind of pulsed laser comes to exhibit the same effects as a continuous wave laser if the repetition rate is increased.

For example, when a solid-state laser capable of continuous oscillation is used, by irradiation at the second through fourth harmonics of a fundamental frequency, crystals with a large grain size can be obtained. Typically, the second harmonic (532 nm) or third harmonic (355 nm) of a YAG laser (a fundamental of 1064 nm) can be used. The power density may be set to be greater than or equal to 0.01 $MW/cm^2$ and less than or equal to 100 $MW/cm^2$ (preferably, greater than or equal to 0.1 $MW/cm^2$ and less than or equal to 10 $MW/cm^2$).

As described above, by irradiation of the semiconductor film 1204 with a laser beam, a crystalline semiconductor film 1210 with even higher crystallinity is formed.

Next, by etching of the crystalline semiconductor film 1210 as selected, as shown in FIG. 12C, island-shaped semiconductor films 1212, 1214, and 1216 are formed.

Next, an impurity element is introduced into each of the island-shaped semiconductor films 1212, 1214, and 1216 in order to control threshold voltage. In the present embodiment mode, boron (B) is introduced by doping with diborane ($B_2H_6$).

Next, an insulating film 1218 is formed so as to cover the island-shaped semiconductor films 1212, 1214, and 1216. For the insulating film 1218, for example, silicon oxide, silicon nitride, silicon oxide that contains nitrogen ($SiO_xN_y$, where x>y>0), or the like can be used. Furthermore, for a film formation method, a plasma CVD method, a sputtering method, or the like can be used.

Next, after a first conductive film 1220 and a second conductive film 1222 are formed over the insulating film 1218, gate electrodes 1236, 1238, and 1240 are formed by selective etching of the first conductive film 1220 and the second conductive film 1222 (FIG. 12D and FIGS. 13A to 13C).

For the first conductive film 1220 and second conductive film 1222, one or a plurality of elements selected from aluminum (Al), tantalum (Ta), titanium (Ti), molybdenum (Mo), tungsten (W), neodymium (Nd), chromium (Cr), nickel (Ni), platinum (Pt), gold (Au), silver (Ag), copper (Cu), magnesium (Mg), scandium (Sc), cobalt (Co), zinc (Zn), niobium (Nb), silicon (Si), phosphorus (P), boron (B), arsenic (As), gallium (Ga), indium (In), and tin (Sn); a compound or alloy material that contains one of the given elements as its main component (for example, indium tin oxide (ITO), indium zinc oxide (IZO), indium tin oxide that contains silicon oxide (ITSO), zinc oxide (ZnO), aluminum-neodymium (Al—Nd), magnesium-silver (MgAg), or the like); a material that is a combination of any of these compounds; or the like can be used. In addition to what is given above, a silicide (for example, aluminum-silicon, molybdenum-silicon, or nickel silicide), a compound that contains nitrogen (for example, titanium nitride, tantalum nitride, or molybdenum nitride), silicon (Si) that has been doped with an impurity element such as phosphorus (P) or the like, or the like may be used. It is to be noted that in the present embodiment mode, the structure of conductive films is set to be a two-layer structure of the first conductive film 1220 and the second conductive film 1222, but the structure may be a single layer or a stacked-layer structure of three or more layers, as well.

In the present embodiment mode, the gate electrodes 1236, 1238, and 1240 are formed as described hereinafter. First, for the first conductive film 1220, for example, a tantalum nitride film is formed at a film thickness greater than or equal to 10 nm and less than or equal to 50 nm, typically, at a film thickness of 30 nm. In addition, for the second conductive film 1222 formed over the first conductive film 1220, for example, a tungsten film is formed at a film thickness of greater than or equal to 200 nm and less than or equal to 400 nm, typically, at a film thickness of 370 nm, and a stacked-layer film of the first conductive film 1220 and the second conductive film 1222 is formed (FIG. 12D).

Next, the second conductive film 1222 is patterned by anisotropic etching, whereby upper layer gate electrodes 1224, 1226, and 1228 are formed (FIG. 13A). Subsequently, the first conductive film 1220 is patterned by isotropic etching, whereby bottom layer gate electrodes 1230, 1232, and 1234 are formed (FIG. 13B). The gate electrodes 1236, 1238, and 1240 are formed by the aforementioned steps.

The gate electrodes 1236, 1238, and 1240 may each be formed as a part of a gate wiring, or the structure may be one in which the gate electrodes 1236, 1238, and 1240 are connected to a gate wiring that is formed separately.

Next, an impurity imparting a conductivity (either n-type or p-type conductivity) is added to each of the island-shaped semiconductor films 1212, 1214, and 1216 using the gate electrodes 1236, 1238, and 1240; a resist formed as selected; and the like as masks, whereby source regions, drain regions, low-concentration impurity regions, and the like are formed.

First, phosphorus (P) is added to the island-shaped semiconductor films 1212 and 1216 using phosphine (PH$_3$). For introduction conditions, it is preferable that the accelerating voltage be set to be greater than or equal to 60 kV and less than or equal to 120 kV and that the dose amount be set to be greater than or equal to $1\times10^{13}$ atoms·cm$^{-2}$ and less than or equal to $1\times10^{15}$ atoms·cm$^{-2}$. By introduction of this impurity, channel formation regions 1242 and 1248 of n-channel TFTs 1278 and 1282 that are to be formed in a later step are formed (FIG. 13C).

Moreover, boron (B) is added to the island-shaped semiconductor film 1214 using diborane (B$_2$H$_6$). For introduction conditions, it is preferable that the applied voltage be set to be greater than or equal to 60 kV and less than or equal to 100 kV and that the dose amount be set to be greater than or equal to $1\times10^{13}$ atoms·cm$^{-2}$ and less than or equal to $5\times10^{15}$ atoms·cm$^{-2}$. Hereby, each of a source region or drain region 1244 and a channel formation region 1246 of a p-channel TFT 1280 that is to be formed in a later step are formed (FIG. 13C).

Next, gate insulating films 1250, 1252, and 1254 are formed by selective etching of the insulating film 1218.

After the gate insulating films 1250, 1252, and 1254 are formed, phosphorus (P) is introduced into the island-shaped semiconductor films that form the n-channel TFTs 1278 and 1282 using phosphine (PH$_3$) at an applied voltage of greater than or equal to 40 kV and less than or equal to 80 kV and a dose amount of greater than or equal to $1.0\times10^{15}$ atoms·cm$^{-2}$ and less than or equal to $2.5\times10^{16}$ atoms·cm$^{-2}$. Hereby, low-concentration impurity regions 1258 and 1262 and regions 1256 and 1260, each of which is a source region or a drain region, of n-channel TFTs 1278 and 1282 are formed (FIG. 14A).

In the present embodiment mode, the regions 1256 and 1260, each of which is a source region or a drain region, each contain phosphorus (P) at a concentration of greater than or equal to $1\times10^{19}$ atoms·cm$^{-3}$ and less than or equal to $5\times10^{21}$ atoms·cm$^{-3}$. Furthermore, the low-concentration impurity regions 1258 and 1262 each contain phosphorus (P) at a concentration of greater than or equal to $1\times10^{18}$ atoms·cm$^{-3}$ and less than or equal to $5\times10^{19}$ atoms·cm$^{-3}$. In addition, the region 1244, which is a source region or drain region contains boron (B) at a concentration of greater than or equal to $1\times10^{19}$ atoms·cm$^{-3}$ and less than or equal to $5\times10^{21}$ atoms·cm$^{-3}$.

Next, a first interlayer insulating film 1264 is formed so as to cover the island-shaped semiconductor films 1212, 1214, and 1216 and the gate electrodes 1236, 1238, and 1240 (FIG. 14B).

It is preferable that the first interlayer insulating film 1264 be formed of a single layer or stacked layer of an insulating film that contains silicon, for example, a silicon oxide film, a silicon nitride film, a silicon oxide film that contains nitrogen (a film of SiO$_x$N$_y$, where x>y>0), or the like using a plasma CVD method or a sputtering method. Of course, the fabrication method and materials of the first interlayer insulating film 1264 are not limited to being those given above. For example, a single layer or stacked layer structure of other insulating films may be used, as well.

Next, a second interlayer insulating film 1266 that functions as a planarizing film is formed to cover the first interlayer insulating film 1264 (FIG. 14C).

For the second interlayer insulating film 1266, a photosensitive or non-photosensitive organic material (polyimide, acrylic, polyamide, polyimide amide, a resist, or benzocyclobutene), siloxane formed with a skeleton structure of bonds of silicon (Si) and oxygen (O) (Si—O—Si bonds), or the like can be used. The second interlayer insulating film 1266 may have a single-layer structure or a stacked-layer structure. For a photosensitive organic material, a positive photosensitive organic resin or negative photosensitive organic resin can be used.

In the present embodiment mode, siloxane is formed for the second interlayer insulating film 1266 by a spin-coating method.

Next, the first interlayer insulating film 1264 and the second interlayer insulating film 1266 are etched, whereby a contact hole that reaches the island-shaped semiconductor films 1212, 1214, and 1216 is formed.

It is to be noted that a third interlayer insulating film may be formed over the second interlayer insulating film 1266 and the contact hole may be formed in the first interlayer insulating film through the third interlayer insulating film, as well. For the third interlayer insulating film, it is preferable that a film through which moisture, oxygen, and the like do not readily pass be used. Typically, a silicon nitride film, a silicon oxide film, a silicon nitride film that contains oxygen (a film of SiN$_x$O$_y$, where x>y>0 or SiO$_x$N$_y$, where x>y>0), a thin film that contains carbon as its main component (for example, a DLC film or a CN film), or the like formed by a sputtering method or a CVD method can be used.

Through the contact hole formed in the second interlayer insulating film 1266, a third conductive film is formed, and the third conductive film is etched as selected, whereby electrodes and/or wirings 1268, 1270, 1272, 1274, and 1276 are formed.

For the third conductive film, one or a plurality of elements selected from aluminum (Al), tantalum (Ta), titanium (Ti), molybdenum (Mo), tungsten (W), neodymium (Nd), chromium (Cr), nickel (Ni), platinum (Pt), gold (Au), silver (Ag), copper (Cu), magnesium (Mg), scandium (Sc), cobalt (Co), zinc (Zn), niobium (Nb), silicon (Si), phosphorus (P), boron (B), arsenic (As), gallium (Ga), indium (In), and tin (Sn); a compound or alloy material that contains one of the given elements as its main component (for example, indium tin oxide (ITO), indium zinc oxide (IZO), indium tin oxide that contains silicon oxide (ITSO), zinc oxide (ZnO), aluminum-neodymium (Al—Nd), magnesium-silver (MgAg), or the like); a material that is a combination of any of these compounds; or the like can be used. In addition to what is given above, a silicide (for example, aluminum-silicon, molybdenum-silicon, or nickel silicide), a compound that contains nitrogen (for example, titanium nitride, tantalum nitride, or molybdenum nitride), silicon (Si) that has been doped with an impurity element such as phosphorus (P) or the like, or the like may be used.

In the present embodiment mode, after a titanium (Ti) film, a titanium nitride film, a silicon-aluminum (Si—Al) alloy film, and a titanium (Ti) film of thicknesses of 60 nm, 40 nm, 300 nm, and 100 nm, respectively, are stacked together, the films are etched as selected so as to be formed into desired shapes, whereby the electrodes and/or wirings 1268, 1270, 1272, 1274, and 1276 are formed.

It is to be noted that the electrodes and/or wirings 1268, 1270, 1272, 1274, and 1276 may be formed of an aluminum alloy film that contains at least one type of element of nickel (Ni), cobalt (Co), or iron (Fe) and carbon (C), as well. With use of this kind of aluminum alloy film, there is an advantage in that mutual diffusion of silicon and the materials of which the electrodes or the like are formed can be prevented even if the electrodes or the like make contact with silicon (Si). In addition, this kind of aluminum alloy film has a characteristic such that oxidation-reduction reactions do not occur even if this aluminum alloy film makes contact with a transparent conductive film, for example, a transparent conductive film formed using indium tin oxide (ITO), and the two films can be made to be in direct contact with each other. Furthermore, because this kind of aluminum alloy film has low resistivity and excellent heat resistance, it is suitable for use as a wiring material.

Moreover, for each of the electrodes and/or wirings 1268, 1270, 1272, 1274, and 1276, a structure in which an electrode and a wiring are formed at the same time may be used, or a structure in which an electrode and a wiring are formed separately and then connected together may be used, as well.

By the sequence of steps described above, a semiconductor substrate that includes a CMOS circuit 1284, which includes the n-channel TFT 1278 and the p-channel TFT 1280, and the n-channel TFT 1282 can be formed (FIG. 14C). It is to be noted that a fabrication method of a semiconductor substrate that can be used in the present invention is not limited to being the fabrication process described above. For example, a process by which a TFT is formed using an amorphous semiconductor film or a process by which a TFT is formed using a single-crystal semiconductor film may be employed, as well. Furthermore, the TFTs are not limited to being top-gate TFTs, and bottom-gate TFTs may be used, as well.

Moreover, a semiconductor substrate that can be used in a liquid crystal display device of the present invention is not limited to having a structure in which the driving circuit is formed over a single substrate. For example, the driving circuit (or a part thereof) may be formed over a single-crystal substrate and that IC chip connected by chip-on-glass (COG) and placed over a glass substrate. In addition, the IC chip may be connected to a glass substrate using tape automated bonding (TAB) or a printed circuit board.

The present embodiment mode can be used in combination with any of Embodiment Mode 1 through Embodiment Mode 6, as appropriate.

(Embodiment Mode 8)

In the present embodiment mode, a fabrication process of a liquid crystal display device will be described using FIG. 15, FIG. 16, and FIG. 17.

It is to be noted that the fabrication method of a liquid crystal display device described in the present embodiment mode is a method in which a pixel section and a driver circuit section provided in the periphery of the pixel section are fabricated together integrally. For sake of simplicity, for the driver circuit, only a CMOS circuit, which is a basic unit, is to be shown.

First, a semiconductor substrate is fabricated using methods and the like given in Embodiment Mode 7. Here, in the present embodiment mode, an explanation will be given using the semiconductor substrate fabricated using the method outlined in Embodiment Mode 7; however, the fabrication method of a liquid crystal display device of the present invention is not to be limited to this method.

First, the process up through formation of the electrodes and/or wirings 1268, 1270, 1272, 1274, and 1276 is performed in accordance with Embodiment Mode 7 (FIG. 14C). It is to be noted that in drawings used hereinafter, the same reference numerals are used to denote components that are the same as those of Embodiment Mode 7.

Figure 15:
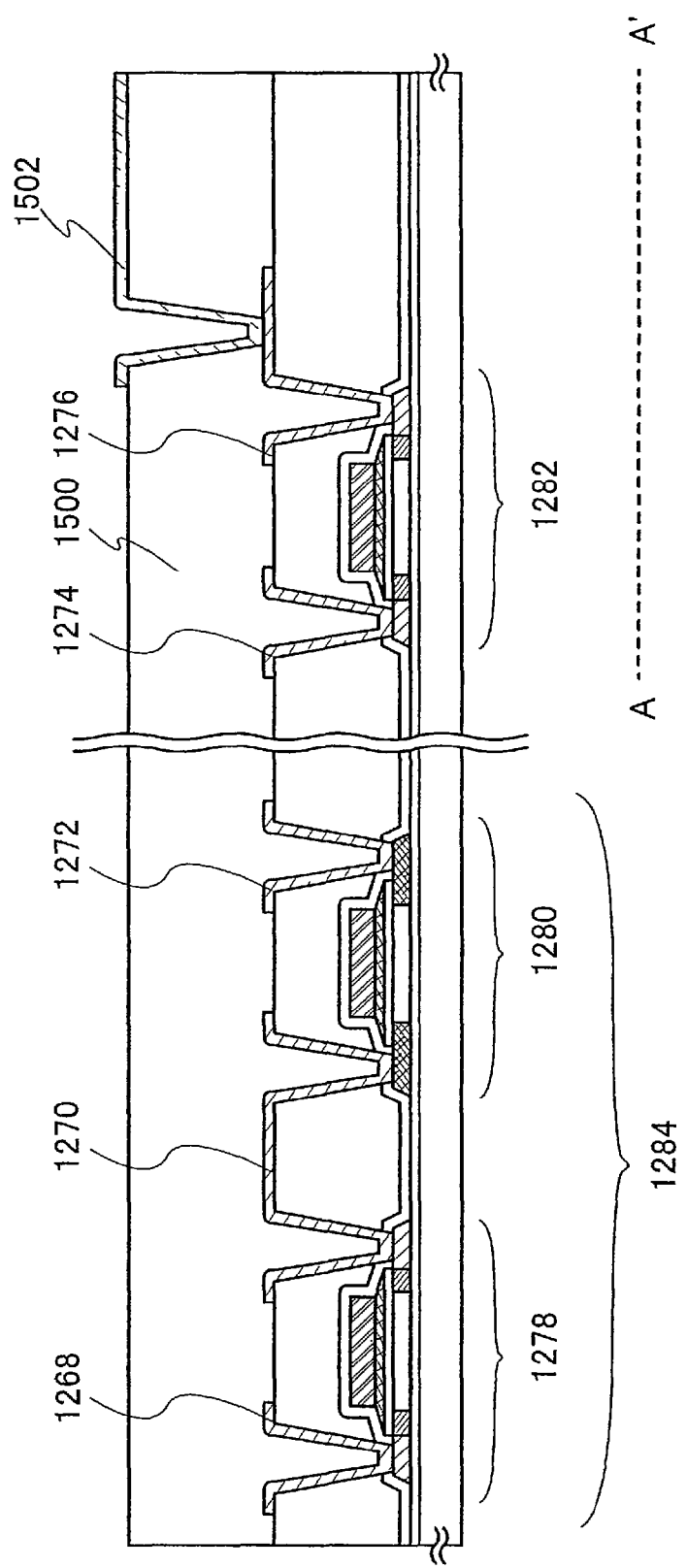
FIG. 15 is a diagram illustrating a fabrication process of a liquid crystal display device of the present invention.

Next, a third interlayer insulating film 1500 is formed over the second interlayer insulating film 1266 and the electrodes and/or wirings 1268, 1270, 1272, 1274, and 1276 (FIG. 15). It is to be noted that the third interlayer insulating film 1500 can be formed using the same materials as those used to form the second interlayer insulating film 1266.

Next, a resist mask is formed using a photo mask, and a part of the third interlayer insulating film 1500 is removed by dry etching to form a contact hole. In formation of the contact hole, carbon tetrafluoride ($CF_4$), oxygen ($O_2$), and helium (He) at flow rates of 50 sccm, 50 sccm, and 30 sccm, respectively, are used as etching gases. It is to be noted that the bottom of the contact hole reaches the electrode and/or wiring 1276.

After the resist mask is removed, a fourth conductive film is formed over the entire surface. Next, the fourth conductive film is etched as selected, whereby a pixel electrode 1502 that is electrically connected to the electrode and/or wiring 1276 is formed (FIG. 15). In cases in which a reflective liquid crystal display device is fabricated, the pixel electrode 1502 may be formed of a metal material of silver (Ag), gold (Au), copper (Cu), tungsten (W), aluminum (Al), or the like that reflects light by a sputtering method. In cases in which a transmissive liquid crystal display device is fabricated, the pixel electrode 1502 can be formed using a transparent conductive film of indium tin oxide (ITO), indium tin oxide that contains silicon oxide, zinc oxide (ZnO), tin oxide ($SnO_2$), or the like.

It is to be noted that a dramatic effect may be obtained by use of the present invention in a transmissive liquid crystal display device; however, the present invention may be applied to a reflective liquid crystal display device, as well. Furthermore, application of the present invention to a so-called transflective liquid crystal display device in which some of the pixels are of the reflective type and some of the pixels are of the transmissive type is effective, as well. A transflective liquid crystal display device has advantages in that luminance is easily secured and power consumption is easily reduced by use thereof because the transflective liquid crystal display device can be used as a reflective type when the amount of light from external is high and as a transmissive type when such is not the case.

Figure 16:
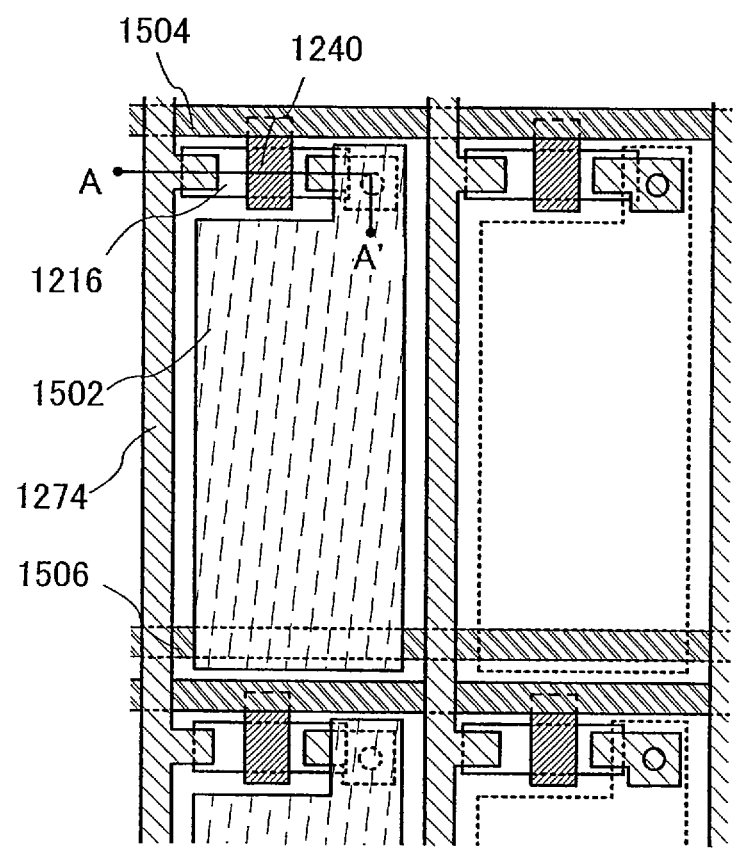
FIG. 16 is a diagram illustrating a top-view of a liquid crystal display device of the present invention.
Figure 17:
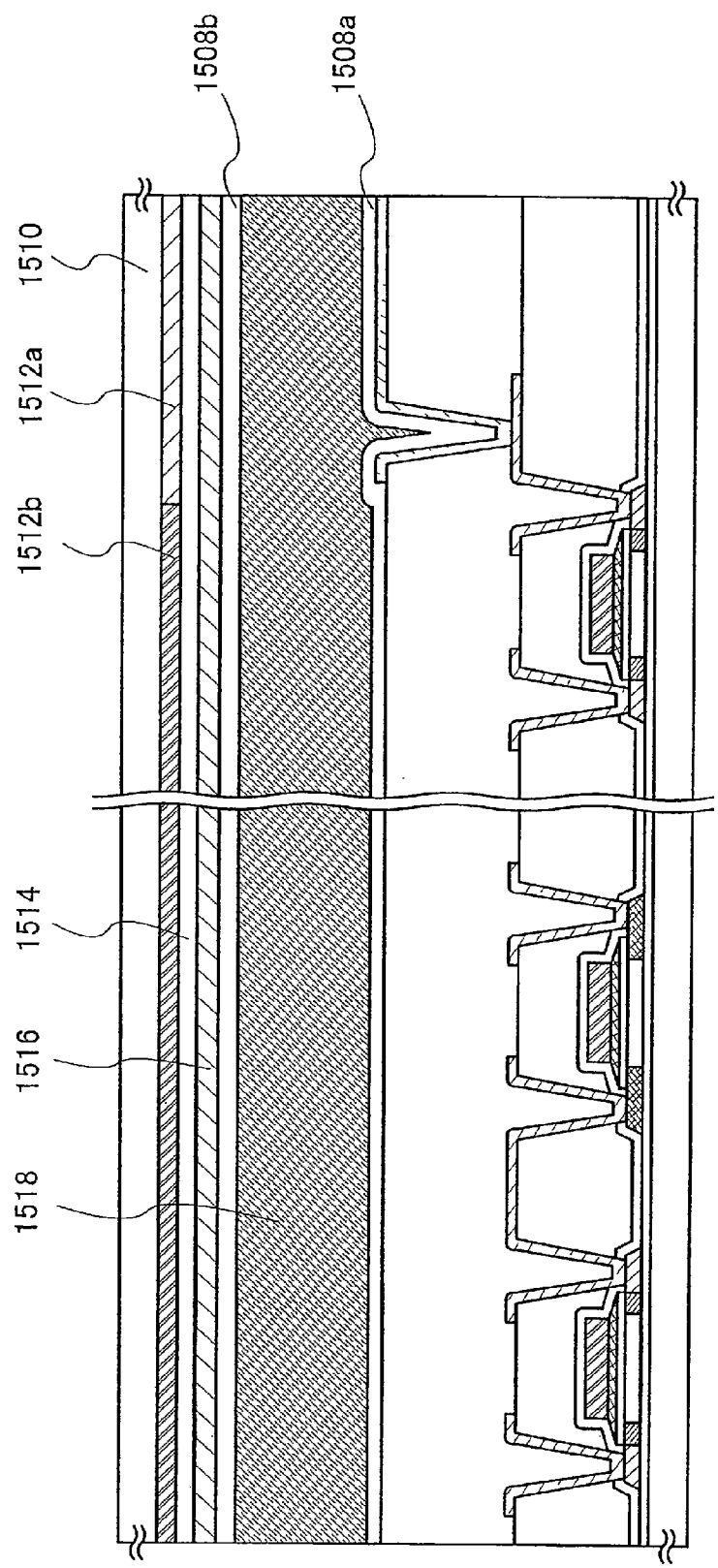
FIG. 17 is a diagram illustrating a cross-sectional-view of a liquid crystal display device of the present invention.

An enlarged planar-view diagram of a part of the pixel section that includes the pixel TFT is shown in FIG. 16. In FIG. 16, to facilitate understanding of a condition of a lower section of the pixel electrode, the structure is given as one in which a pixel electrode of a pixel on the right side of the diagram is omitted. It is to be noted that a cross section of a line A-A' in FIG. 16 corresponds to that of the line A-A' of the pixel section in FIG. 15, and the same reference numerals are used for parts in FIG. 16 that correspond to parts in FIG. 15.

As shown in FIG. 16, the gate electrode 1240 is connected to a gate wiring 1504. Moreover, the electrode and/or wiring 1274 is formed integrated together with a source wiring. Furthermore, a capacitive wiring 1506 is formed, and a holding capacitor is formed from the first interlayer insulating film 1264, the pixel electrode 1502, and the capacitive wiring 1506.

By the process given above, a pixel TFT that is formed of the top-gate, n-channel TFT 1282; the CMOS circuit 1284 that is formed of the top-gate, n-channel TFT 1278 and the top-gate, p-channel TFT 1280; and the pixel electrode 1502 are formed over the substrate 1200. In the present embodiment mode, an example in which top-gate TFTs are formed is given; however, bottom-gate TFTs may be formed, as well.

Next, an alignment film 1508a is formed so as to cover the pixel electrode 1502. It is to be noted that the alignment film 1508a may be formed using a liquid droplet discharge method, a screen printing method, an offset printing method, or the like. After the alignment film 1508a is formed, rubbing treatment is performed on the surface of the alignment film 1508a.

Next, a counter substrate 1510 that is to be attached to the substrate 1200 is prepared. Here, on the counter substrate 1510, a color filter formed of a colored layer 1512a, a light-blocking layer (black matrix) 1512b, and an overcoat layer 1514 is provided, and a counter electrode 1516, further formed of a light-transmissive electrode or a light-reflective electrode, and an alignment film 1508b are formed (FIG. 17). For the counter substrate 1510, a substrate that has about the same size or the same shape as the substrate 1200 can be used. Here, there is no need for the about the same size and the same shape to be exactly the same, and the "about the same size" and "same shape" refer to a size and shape that are more or less adequate in formation of a panel.

Next, the substrate 1200 and the counter substrate 1510 obtained by the aforementioned process are bonded together through a sealant. Here, a spacer may be provided between the alignment film 1508a and the alignment film 1508b in order that the gap between the two substrates be maintained at an equal distance. Next, a liquid crystal 1518 is injected into the space between the two substrates, and the two substrates are sealed using a sealing material. Thus, by provision of polarizing plates, a backlight, a light sensor, and the like, the liquid crystal display device of the present invention is completed. It is to be noted that the light sensor is provided in a location that corresponds to the monitor section. A pixel of the monitor section can be fabricated in the same way as a pixel for display use. The monitor section can be formed of one pixel or may be formed using two or more pixels. The area of the pixel of the monitor section may be the same as the area of the pixel of the display section or larger than the area of the pixel of the display section. By the monitor section being formed of a plurality of pixels, accuracy in detection of luminance can be improved. Furthermore, by the area of the pixel of the monitor section being increased, accuracy in detection of luminance can be improved similarly. In other words, fine control of the backlight can be performed.

In addition, in a liquid crystal display device of the present invention, any one of methods such as a twisted nematic (TN) method, an in-plane switching (IPS) method, a fringe field switching (FFS) method, a multi-domain vertical alignment (MVA) method, a patterned vertical alignment (PVA) method, an axially symmetric aligned micro-cell (ASM) method, an optical compensated birefringence (OCB) method, a ferroelectric liquid crystal (FLC) method, an anti-ferroelectric liquid crystal (AFLC) method, or the like can be used.

The present embodiment mode can be used in combination with any of Embodiment Mode 1 through Embodiment Mode 7, as appropriate.

(Embodiment Mode 9)

In the present embodiment mode, examples of fabrication methods of a semiconductor substrate that can be used in a display device of the present invention will be described using FIGS. 18A and 18B, FIGS. 19A and 19B, FIGS. 20A and 20B, FIGS. 21A to 21C, FIGS. 22A to 22C, FIGS. 23A to 23C, and FIGS. 24A and 24B. It is to be noted that the semiconductor substrate of the present embodiment mode is a substrate that has a single-crystal semiconductor layer and an amorphous semiconductor layer.

Figure 18A:
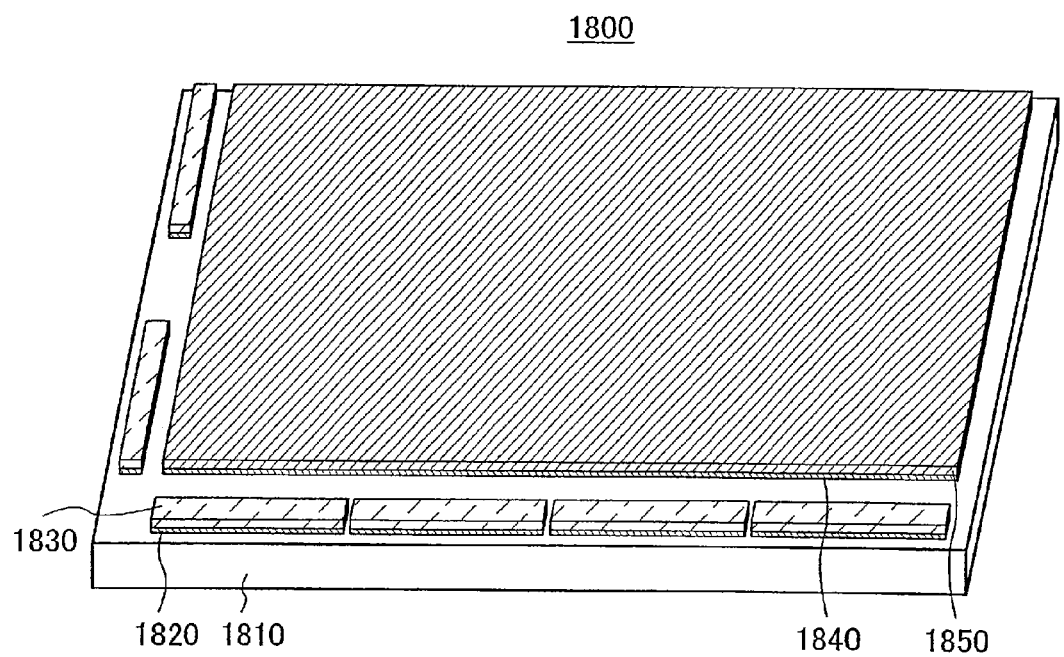
FIGS. 18A and 18B are diagrams each illustrating a semiconductor substrate of the present invention.
Figure 18B:
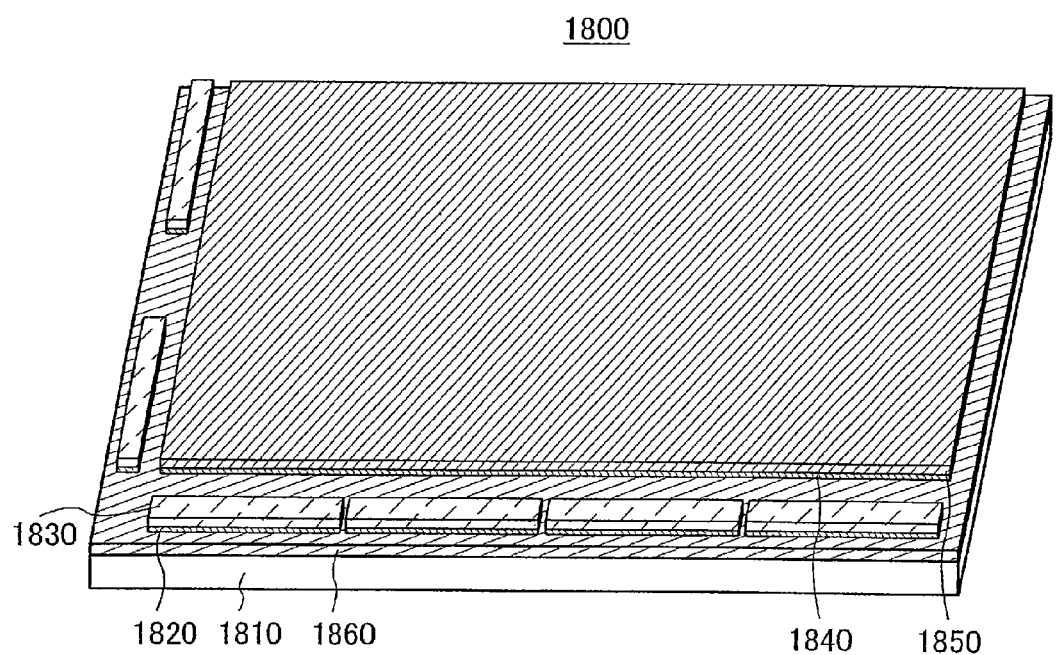

In FIGS. 18A and 18B, perspective-view diagrams of semiconductor substrates in which the present invention is used are shown. Furthermore, in FIGS. 19A and 19B and FIGS. 20A and 20B, cross-sectional-view diagrams of semiconductor substrates in which the present invention is used are shown.

Figure 19A:
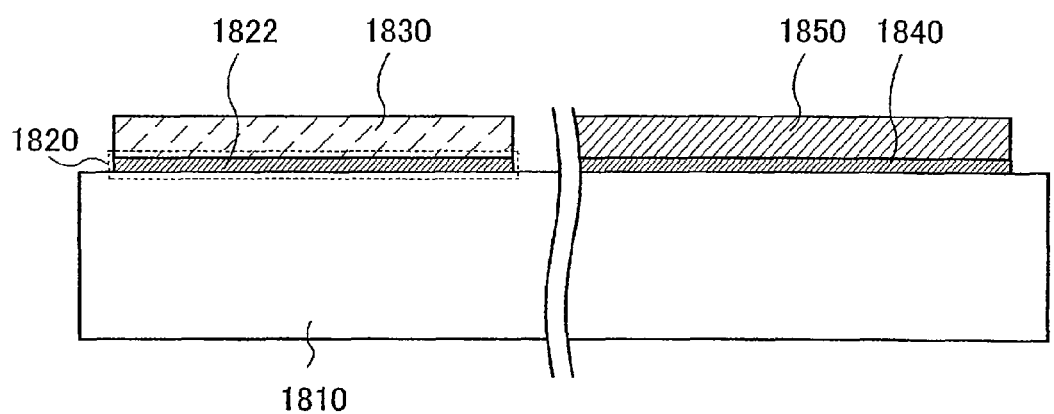
FIGS. 19A and 19B are diagrams each illustrating cross-sectional views of a semiconductor substrate of the present invention.
Figure 19B:
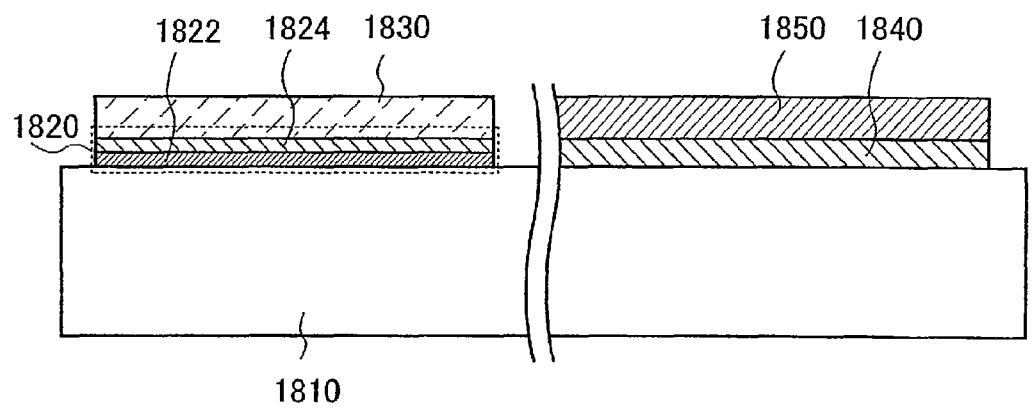

In each of FIG. 18A and FIGS. 19A and 19B, a semiconductor substrate 1800 has a structure in which a plurality of stacked-layer bodies, in each of which an insulating layer 1820 and a single-crystal semiconductor layer 1830 are stacked together in the order given, as well as an insulating layer 1840 and an amorphous semiconductor layer 1850 stacked together in the order given are provided over one surface of a base substrate 1810. Each of the single-crystal semiconductor layers 1830 and the amorphous semiconductor layer 1850 are provided over the base substrate 1810 with one of the insulating layers 1820 interposed between each of the single-crystal semiconductor layers 1830 and the base substrate 1810 and the insulating layer 1840 interposed between the amorphous semiconductor layer 1850 and the base substrate 1810. That is, a plurality of the single-crystal semiconductor layers 1830 is provided over a single base substrate 1810 and, furthermore, the amorphous semiconductor layer 1850 is provided, whereby a single semiconductor substrate 1800 is formed. It is to be noted that, in FIGS. 18A and 18B, FIGS. 19A and 19B, and FIGS. 20A and 20B, for sake of convenience, only a structure of a case in which one panel is fabricated from a single semiconductor substrate 1800; however, the present invention is not limited to having only this structure.

For the single-crystal semiconductor layer 1830, typically, single-crystal silicon is employed. In addition to single-crystal silicon, a single-crystal semiconductor layer that is a compound semiconductor of silicon, germanium, gallium arsenide, indium phosphide, or the like that can be separated from a single-crystal semiconductor substrate using a hydrogen ion implantation separation method can be applied, as well.

There are no particular limitations on the shape of the single-crystal semiconductor layer 1830; however, setting the shape of the single-crystal semiconductor layer 1830 to be rectangular (including a square shape) is preferable because processing is made easier and the single-crystal semiconductor layer 1830 can be attached to the base substrate 1810 with a favorable degree of integration if the single-crystal semiconductor layer 1830 is rectangular.

For the base substrate 1810, a substrate that has an insulating surface or an insulating substrate is used. Specifically, a glass substrate of any of different types of glass used in the electronics industry, such as aluminosilicate glass, aluminoborosilicate glass, barium borosilicate glass, or the like; a quartz substrate; a ceramic substrate; a sapphire substrate; or the like can used. Preferably, a glass substrate is used, and for example, a mother glass substrate with a large area referred to as sixth-generation (1500 mm×1850 mm), seventh-generation (1870 mm×2200 mm), or eighth-generation (2200 mm×2400 mm) can be used. By use of a mother glass substrate with a large area for the base substrate 1810, an increase in the area of a semiconductor substrate can be realized. In the present embodiment mode, a case in which one panel is fabricated from a single base substrate; in cases in which a plurality of panels are fabricated from a single base substrate (cases with multiple panels), the panels may be fabricated with adjustment of sizes of the single-crystal semiconductor layers 1830 and the amorphous semiconductor layer 1850 as appropriate.

The insulating layers 1820 are each provided between the base substrate 1810 and each of the single-crystal semiconductor layers 1830. The insulating layer 1820 may be set to have a single-layer structure or a stacked-layer structure, and the surface (hereinafter referred to as a bonding surface) of the insulating layer 1820 that comes into contact with the base substrate 1810 is set to be a hydrophilic surface that is smooth.

In FIG. 19A, an example is shown in which a bonding layer 1822 is formed for the insulating layer 1820. A silicon oxide layer is suitable for use as the bonding layer 1822 that can be formed of a hydrophilic surface that is smooth. In particular, use of a silicon oxide layer that is fabricated by a chemical vapor deposition method using an organic silane is preferable. For the organic silane, an organic compound that contains silicon such as tetraethoxysilane (abbreviated designation: TEOS, chemical formula: $Si(OC_2H_5)_4$), tetramethylsilane (TMS, chemical formula: $Si(CH_3)_4$), trimethylsilane $((CH_3)_3SiH)$, tetramethylcyclotetrasiloxane (TMCTS), octamethylcyclotetrasiloxane (OMCTS), hexamethyldisilazane (HMDS), triethoxysilane $(SiH(OC_2H_5)_3)$, tris dimethyl aminosilane $(SiH(N(CH_3)_2)_3)$, or the like can be used.

It is preferable that the bonding layer 1822 that is formed of a hydrophilic surface that is smooth be formed at a film thickness of greater than or equal to 5 nm and less than or equal to 500 nm. By the film thickness of the bonding layer 1822 being set to be within the range given, along with surface roughness of a surface that is to be formed being planarized, smoothness of the surface of the film that is growing can be secured. In addition, the amount of distortion within a substrate (in FIG. 19A, the base substrate 1810) to which the film is to be bonded can be reduced. It is to be noted that a silicon oxide layer such as that of the bonding layer 1822 may be provided for the base substrate 1810, as well. In bonding of the single-crystal semiconductor layer 1830 to the base substrate 1810, which is a substrate that has an insulating surface or is an insulating substrate, by provision of a bonding layer that is preferably made up of a silicon oxide layer formed using an organic silane as a source material over one or both of the surfaces that are to be bonded together, a strong bond can be formed.

In FIG. 19B, an example in which the insulating layer 1820 is set to have a stacked-layer structure is shown. Specifically, an example is shown in which the insulating layer 1820 is formed of a stacked-layer structure of the bonding layer 1822 and an insulating layer 1824 that contains nitrogen. It is to be noted that, because the bonding layer 1822 is set so as to be formed over the surface to which the base substrate 1810 is to be bonded, the structure is set to be one in which the insulating layer 1824 that contains nitrogen is provided between the single-crystal semiconductor layer 1830 and the bonding layer 1822. The insulating layer 1824 that contains nitrogen is formed of a single-layer structure or stacked-layer structure using any of a silicon nitride layer, a silicon nitride oxide layer ($SiN_xO_y$, where x>y), and a silicon oxynitride layer ($SiO_xN_y$, where x>y). For example, a silicon oxynitride layer and a silicon nitride oxide layer can be stacked together from the single-crystal semiconductor layer 1830 side and set to be the insulating layer 1824 that contains nitrogen.

It is to be noted that the insulating layer 1840 that is provided on the lower part of the amorphous semiconductor layer 1850 is not to be taken as being limited to having the same structure as the insulating layer 1820 that is provided on the lower part of the single-crystal semiconductor layer 1830; however, as shown in FIGS. 19A and 19B, it is preferable that the material that makes contact with the amorphous semiconductor layer 1850 and the material that makes contact with the single-crystal semiconductor layer 1830 at least be set to be the same material. By the materials that make contact with each of the amorphous semiconductor layer 1850 and the single-crystal semiconductor layer 1830 being set to be the same, etching characteristics in patterning that is to be formed during a subsequent step can be matched up.

It is to be noted that "silicon oxynitride layer" refers to a layer in which, in the composition, the amount of oxygen contained therein is greater than the amount of nitrogen and, for example, oxygen is contained at greater than or equal to 50 at. % and less than or equal to 70 at. %; nitrogen, at greater than or equal to 0.5 at. % and less than or equal to 15 at. %; silicon, at greater than or equal to 25 at. % and less than or equal to 35 at. %; and hydrogen, at greater than or equal to 0.1 at. % and less than or equal to 10 at. %. Furthermore, "silicon nitride oxide layer" refers to a layer in which, in the composition, the amount of nitrogen contained therein is greater than the amount of oxygen and, for example, oxygen is contained at greater than or equal to 5 at. % and less than or equal to 30 at. %; nitrogen, at greater than or equal to 20 at. % and less than or equal to 55 at. %; silicon, at greater than or equal to 25 at. % and less than or equal to 35 at. %; and hydrogen, at greater than or equal to 10 at. % and less than or equal to 25 at. %. The aforementioned ranges are ranges for cases measured using Rutherford backscattering spectrometry (RBS) and hydrogen forward scattering (HFS). Moreover, the total for the content ratio of the constituent elements is taken to be a value that does not exceed 100 at. %.

Figure 20A:
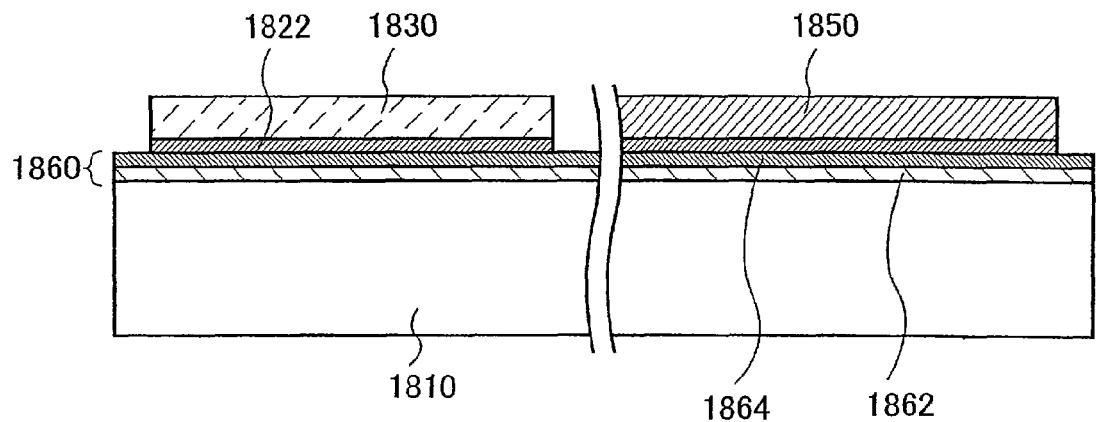
FIGS. 20A and 20B are diagrams each illustrating cross-sectional views of a semiconductor substrate of the present invention.
Figure 20B:
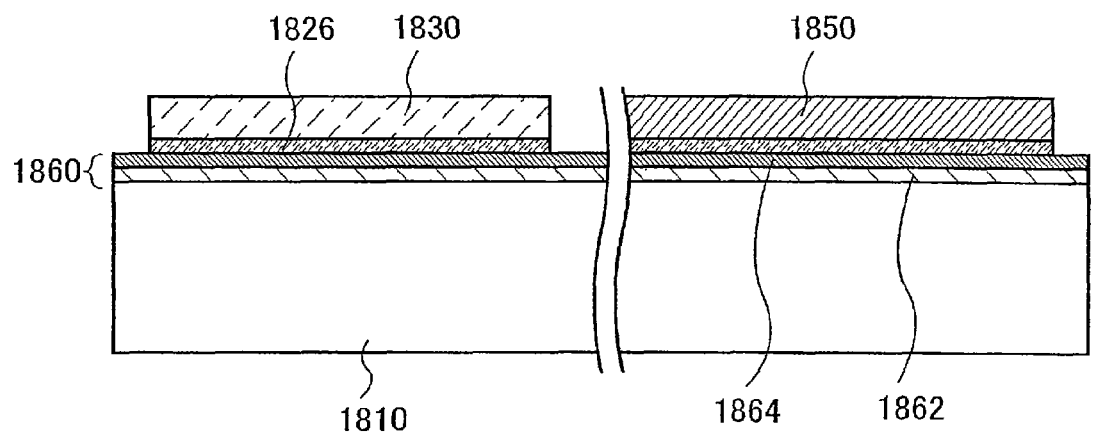

FIG. 18B and FIGS. 20A and 20B show examples in which an insulating layer 1860 that includes a bonding layer is formed over the base substrate 1810. The insulating layer 1860 may be formed as a single-layer structure or a stacked-layer structure, and the surface of the insulating layer 1860 that comes into contact with the single-crystal semiconductor layer 1830 is formed so as to be a hydrophilic surface that is smooth. It is to be noted that it is preferable that a barrier layer used to prevent the diffusion of mobile ions of an alkali metal, alkaline earth metal, or the like from a glass substrate that is used as the base substrate 1810 be provided between the base substrate 1810 and the bonding layer.

In FIG. 20A, an example is shown in which a stacked-layer structure of the barrier layer 1862 and a bonding layer 1864 is formed for the insulating layer 1860. For the bonding layer

1864, the same kind of silicon oxide layer as for the bonding layer 1822 may be provided. Alternatively, a bonding layer appropriate to the single-crystal semiconductor layer 1830 may be provided, as well. In FIG. 20A, an example is shown in which the bonding layer 1822 is provided over the single-crystal semiconductor layer 1830 as well. By the structure being set to be this kind of structure, because a bond is formed by bonding layer to bonding layer in bonding of the base substrate 1810 and the single-crystal semiconductor layer 1830, an even stronger bond can be formed. The barrier layer 1862 is formed as a single-layer structure or stacked-layer structure using any of a silicon oxide layer, a silicon nitride layer, a silicon oxynitride layer, and a silicon nitride oxide layer. Preferably, the barrier layer 1862 is formed using an insulating layer that contains nitrogen.

In FIG. 20B, an example is shown in which a bonding layer is provided over the base substrate 1810. Specifically, a stacked-layer structure of the barrier layer 1862 and the bonding layer 1864 are provided over the base substrate 1810 as the insulating layer 1860. Furthermore, a silicon oxide layer 1826 is provided over the single-crystal semiconductor layer 1830. In bonding of the single-crystal semiconductor layer 1830 to the base substrate 1810, the silicon oxide layer 1826 forms a bond with the bonding layer 1864. It is preferable that the silicon oxide layer 1826 be formed by a thermal oxidation method. Furthermore, a chemical oxide can also be applied for the silicon oxide layer 1826. A chemical oxide can be formed, for example, by treatment of a surface of a single-crystal substrate with water that contains ozone. Use of a chemical oxide is favorable because chemical oxides are formed reflecting the planarity of the surface of the single-crystal substrate.

It is to be noted that the insulating layer 1840 that is provided on the lower part of the amorphous semiconductor layer 1850 is not to be taken as being limited to having the same structure as the bonding layer 1822 and the silicon oxide layer 1826 that are provided on the lower part of the single-crystal semiconductor layer 1830; however, as shown in FIGS. 19A and 19B, it is preferable that the material that makes contact with the amorphous semiconductor layer 1850 and the material that makes contact with the single-crystal semiconductor layer 1830 at least be set to be the same material. By the materials that make contact with each of the amorphous semiconductor layer 1850 and the single-crystal semiconductor layer 1830 being set to be the same, etching characteristics in patterning that is to be formed during a subsequent step can be matched up.

Next, a fabrication method of a semiconductor substrate will be described. Here, an example of the fabrication method of a semiconductor substrate that is shown in FIG. 19B will be described using FIGS. 21A to 21C, FIGS. 22A to 22C, FIGS. 23A to 23C, and FIGS. 24A and 24B. It is to be noted that, needless to say, structures shown in FIG. 19A, FIGS. 20A and 20B, and the like can be fabricated in the same way.

Figure 21A:
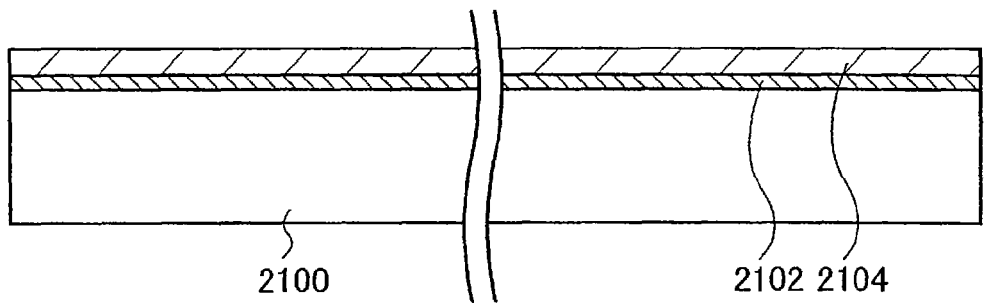
FIGS. 21A to 21C are diagrams illustrating a fabrication process of a semiconductor substrate of the present invention.

First, as shown in FIG. 21A, an insulating layer 2102 is formed over a base substrate 2100. For the base substrate 2100, for example, any of the substrates described above can be used. Furthermore, a flexible substrate formed of a synthetic resin such as a plastic typified by PET, PES, or PEN; acrylic; or the like can also be used.

The insulating layer 2102 is provided to prevent an alkali metal, such as Na or the like, or an alkaline earth metal contained within the base substrate 2100 from diffusing into a semiconductor film and imparting adverse effects on the characteristics of a semiconductor element. Consequently, the insulating layer 2102 is formed using an insulating material of silicon nitride or silicon oxide that contains nitrogen by which the diffusion of an alkali metal or alkaline earth metal into a semiconductor film can be suppressed. In the present embodiment mode, a silicon oxide film that contains nitrogen is formed for the insulating layer 2102 so as to have a film thickness greater than or equal to 10 nm and less than or equal to 400 nm (preferably, greater than or equal to 50 nm and less than or equal to 300 nm) using a plasma CVD method.

Next, a semiconductor layer 2104 is formed over the insulating layer 2102. The film thickness of the semiconductor layer 2104 is set to be greater than or equal to 25 nm and less than or equal to 100 nm (preferably, greater than or equal to 30 nm and less than or equal to 60 nm). It is to be noted that the semiconductor layer 2104 may be formed of an amorphous semiconductor or a polycrystalline semiconductor. In addition, for the semiconductor, not only silicon (Si) but also silicon germanium (SiGe) or the like can be used. When silicon germanium is used, it is preferable that the concentration of germanium be greater than or equal to 0.01 at. % approximately and less than or equal to 4.5 at. % approximately.

Figure 21B:
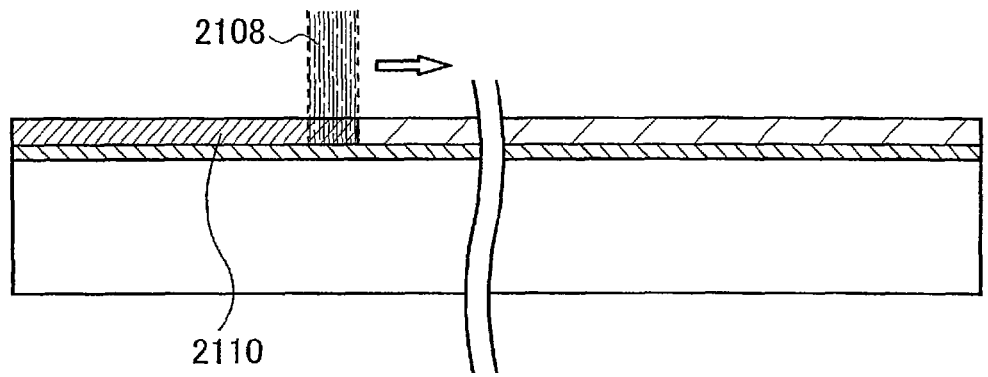

Next, as shown in FIG. 21B, crystallization is performed by irradiation of the semiconductor layer 2104 with a linear laser beam 2108. If laser crystallization is performed as in the present embodiment mode, in order to increase the tolerance of the semiconductor layer 2104 to a laser beam, a heat treatment step performed at a temperature of 500° C. for one hour may be added before the laser crystallization step.

In the laser crystallization step, for example, a continuous wave laser (a CW laser), a quasi-continuous wave laser (a pulsed laser with a repetition rate of 10 MHz or more, preferably, 80 MHz or more), or the like can be used.

Specifically, for a continuous wave laser, an Ar laser, a Kr laser, a $CO_2$ laser, a YAG laser, a $YVO_4$ laser, a YLF laser, a $YAlO_3$ laser, a $GdVO_4$ laser, a $Y_2O_3$ laser, a ruby laser, an alexandrite laser, a Ti:sapphire laser, a helium-cadmium laser, and the like can be given.

Furthermore, for a quasi-CW laser, a pulsed laser such as an Ar laser, a Kr laser, an excimer laser, a $CO_2$ laser, a YAG laser, a $YVO_4$ laser, a YLF laser, a $YAlO_3$ laser, a $GdVO_4$ laser, a $Y_2O_3$ laser, a ruby laser, an alexandrite laser, a Ti:sapphire laser, a copper vapor laser, or a gold vapor laser can be given.

This kind of pulsed laser comes to exhibit the same effects as a continuous wave laser if the repetition rate is increased.

For example, when a solid-state laser capable of continuous oscillation is used, by irradiation at the second through fourth harmonics of a fundamental frequency, crystals with a large grain size can be obtained. Typically, the second harmonic (532 nm) or third harmonic (355 nm) of a YAG laser (a fundamental of 1064 nm) can be used. The power density may be set to be greater than or equal to 0.01 $MW/cm^2$ and less than or equal to 100 $MW/cm^2$ (preferably, greater than or equal to 0.1 $MW/cm^2$ and less than or equal to 10 $MW/cm^2$).

As described above, by irradiation of the semiconductor layer 2104 with a laser beam, a crystalline semiconductor layer 2110 with even higher crystallinity is formed.

It is to be noted that, in the present embodiment mode, an example is given in which the crystalline semiconductor layer 2110 is formed using irradiation with laser light; however, the present invention is not limited to having this configuration only. In order to simplify a process, the semiconductor layer 2104 may be used without performance of a crystallization process, as well.

Figure 21C:
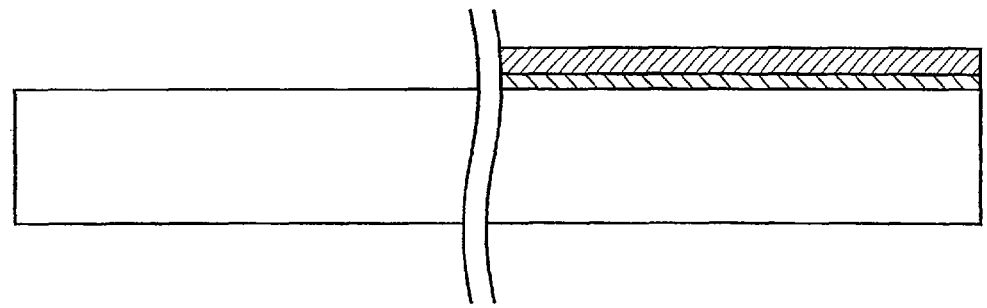

Next, as shown in FIG. 21C, the crystalline semiconductor layer 2110 is etched as selected, and the insulating layer 2102 is further etched so that a part of the surface of the base substrate is exposed. During etching of the crystalline semiconductor layer 2110, island-shaped semiconductor layers that are to form a pixel TFT during a subsequent step may be formed, as well. By the steps described above, the crystalline semiconductor layer (amorphous semiconductor layer) 2110 is formed over the base substrate 2100.

Next, a single-crystal semiconductor layer is formed. First, a single-crystal substrate 2200 is prepared (with reference to FIG. 22A and FIG. 23A). For the single-crystal substrate 2200, a commercially available semiconductor substrate may be used, and for example, a silicon substrate; a germanium substrate; a compound semiconductor substrate of gallium arsenide, indium phosphide, or the like; and the can be given. For a commercially available silicon substrate, a substrate with a size of a diameter of 5 inches (125 millimeters), a diameter of 6 inches (150 millimeters), a diameter of 8 inches (200 millimeters), or a diameter of 12 inches (300 millimeters) is typical, and the shape of the substrate is often round. In addition, a film thickness of up to approximately 1.5 mm can be selected as appropriate.

Figure 22A:
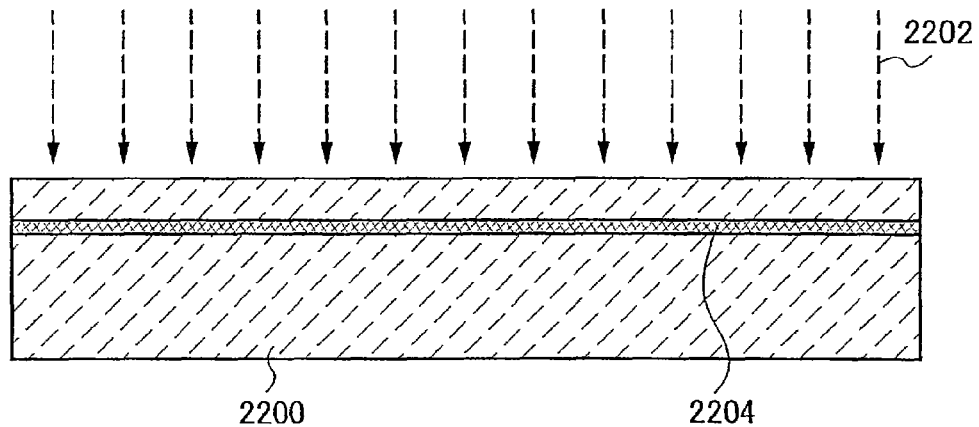
FIGS. 22A to 22C are diagrams illustrating a fabrication process of a semiconductor substrate of the present invention.
Figure 23A:
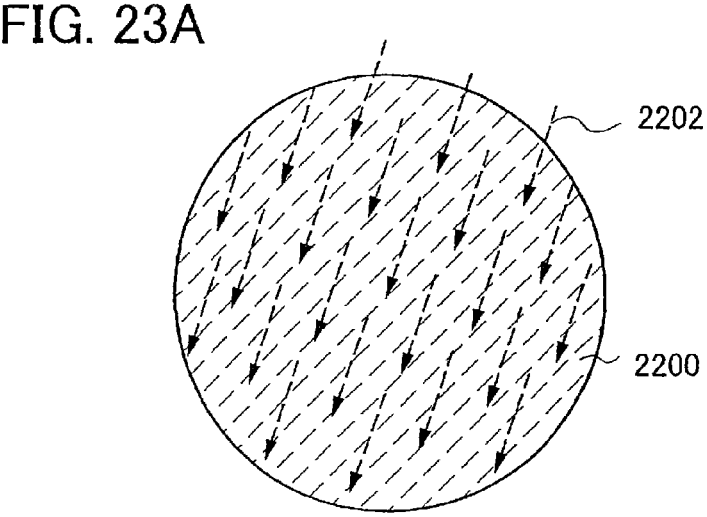
FIGS. 23A to 23C are diagrams illustrating a fabrication process of a semiconductor substrate of the present invention.

Next, ions 2202 accelerated by an electric field are introduced into the single-crystal substrate 2200 at a given depth from the surface of the single-crystal substrate 2200, whereby an ion doping layer 2204 (can also be referred to as a damaged region) is formed (with reference to FIG. 22A and FIG. 23A). Implantation of the ions 2202 is performed in consideration of the film thickness of a single-crystal semiconductor layer that is to be transferred to a base substrate during a subsequent step. Preferably, the film thickness of the single-crystal semiconductor layer is set so as to be a thickness of from 5 nm to 500 nm, more preferably, a thickness of from 10 nm to 200 nm.

For the ions 2202, ions of hydrogen, helium, or a halogen such as fluorine or the like can be used. It is to be noted that, for the ions 2202, use of ion species of a single type of atom or made from a plurality of the same type of atom generated by plasma excitation of a source gas selected from hydrogen, helium, or a halogen element is preferable. Cases of implantation of hydrogen ions are preferable because, along with $H^+$, $H_2^+$, and $H_3^+$ ions being included, if the proportion of the number of $H_3^+$ ions is increased, implantation efficiency of ions can be increased and the length of time for implantation can be shortened. Furthermore, by the structure being set to be this kind of structure, separation of substrates can be performed easily.

It is to be noted that, in order to form the ion doping layer 2204 at the given depth, there are cases in which implantation of the ions 2202 under conditions of high dosing becomes necessary. In these cases, the surface of the single-crystal substrate 2200 may be roughened depending on the conditions. For this reason, a silicon nitride layer, a silicon nitride oxide layer, or the like may be provided at a film thickness within the range of from 50 nm to 200 nm over the surface of the single-crystal semiconductor substrate into which the ions are to be implanted as a protective layer.

Figure 22B:
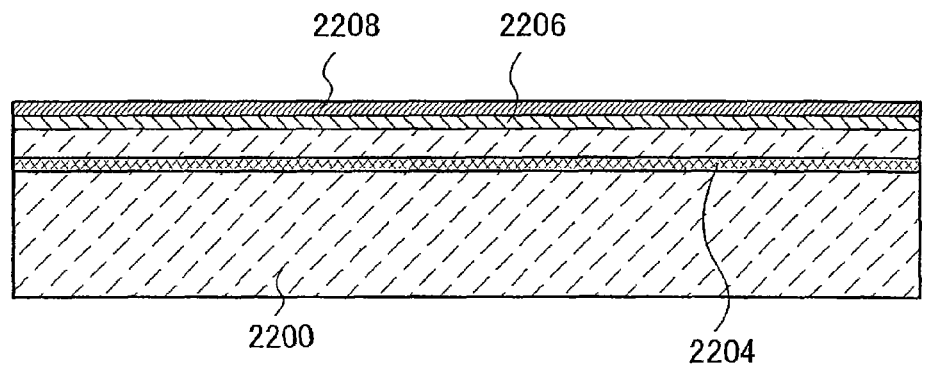
Figure 23B:
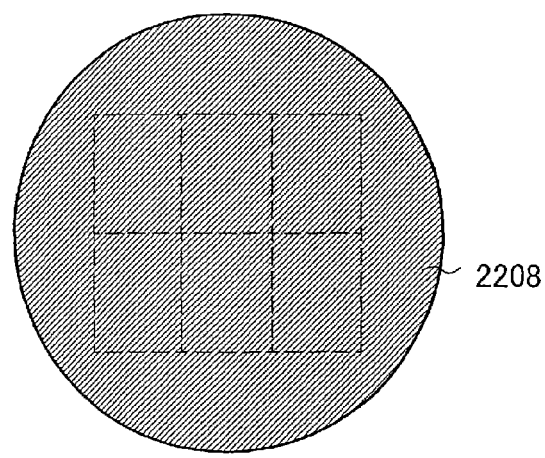

Next, after the insulating layer 2206 is formed over the single-crystal substrate 2200, the bonding layer 2208 is formed (with reference to FIG. 22B and FIG. 23B). Next, after the insulating layer 2206 is formed over the single-crystal substrate 2200, the bonding layer 2208 is formed (with reference to FIG. 22B and FIG. 23B). It is preferable that the insulating layer 2206 be formed of the same materials as the insulating layer 2102 although the present invention not limited thereto.

For the insulating layer 2206 of the present embodiment mode, a silicon oxide film that contains nitrogen is formed using a plasma CVD method. The bonding layer 2208 is formed over a surface at which the single-crystal substrate 2200 forms a bond with the base substrate. For the bonding layer 2208 formed here, use of a silicon oxide layer formed by film formation by a chemical vapor deposition method using an organic silane as a source gas as described above is preferable. In addition, a silicon oxide layer formed by film formation by a chemical vapor deposition method in which a silane is used as a source gas can be applied, as well. In the film formation by a chemical vapor deposition method, temperatures of a degree at which degassing from the ion doping layer 2204 formed over the single-crystal substrate 2200 does not occur are applied. For example, a film formation temperature of 350° C. or less is applied. It is to be noted that, for thermal treatment in separation of the single-crystal semiconductor layer from the single-crystal substrate, a thermal treatment temperature that is higher than the film formation temperature in a chemical vapor deposition method is applied.

Figure 22C:
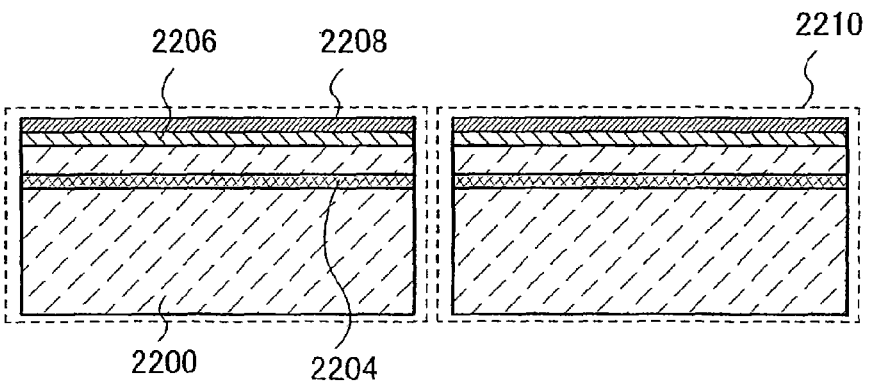
Figure 23C:
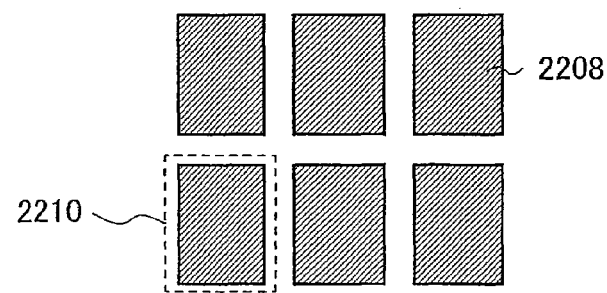

Next, the single-crystal substrate 2200 is processed into a desired size and shape (with reference to FIG. 22C and FIG. 23C). In FIG. 23C, an example is shown in which a round single-crystal substrate 2200 is divided up and rectangular single-crystal substrates 2210 are formed. In this case, the insulating layer 2206, the bonding layer 2208, and the ion doping layer 2204 are also divided up. That is, the single-crystal substrates 2210 that each have a desired size and shape, in each of which is formed the ion doping layer 2204 at a given depth and over a surface (the surface that is to be bonded to the base substrate) of each of which is formed the bonding layer 2208, are obtained.

Although the size of the single-crystal substrate 2210 can be set to be equal to a desired size, here, the size of the single-crystal substrate 2210 is set to be equal to the size of the driver circuit. The size of the driver circuit may be selected as appropriate based on the area needed for the driver circuit. Having the shape of the single-crystal substrate 2210 be set to be rectangular is preferable because processing during a subsequent fabrication step comes to be performed more easily and, furthermore, the single-crystal substrate 2210 can be cut out from the single-crystal substrate 2200 more efficiently, as well. Division of the single-crystal substrate 2200 can be performed using a cutting apparatus such as a dicer, a wire saw, or the like or by laser cutting, plasma cutting, or electron beam cutting or any other given cutting means.

It is to be noted that the order of steps up through the step for formation of a bonding layer over a surface of a single-crystal substrate can be switched around as appropriate. In FIGS. 22A to 22C and FIGS. 23A to 23C, an example is shown in which, after an ion doping layer is formed in a single-crystal substrate and an insulating layer and a bonding layer are formed over a surface of the single-crystal substrate, the single-crystal substrate is processed into a desired panel size. However, another process can be used, for example, a process in which, after a single-crystal substrate is processed into a desired panel size, an ion doping layer is formed in the single-crystal substrate that has been processed into a desired panel size and an insulating layer and a bonding layer are formed over the surface of the single-crystal substrate of the desired panel size.

Figure 24A:
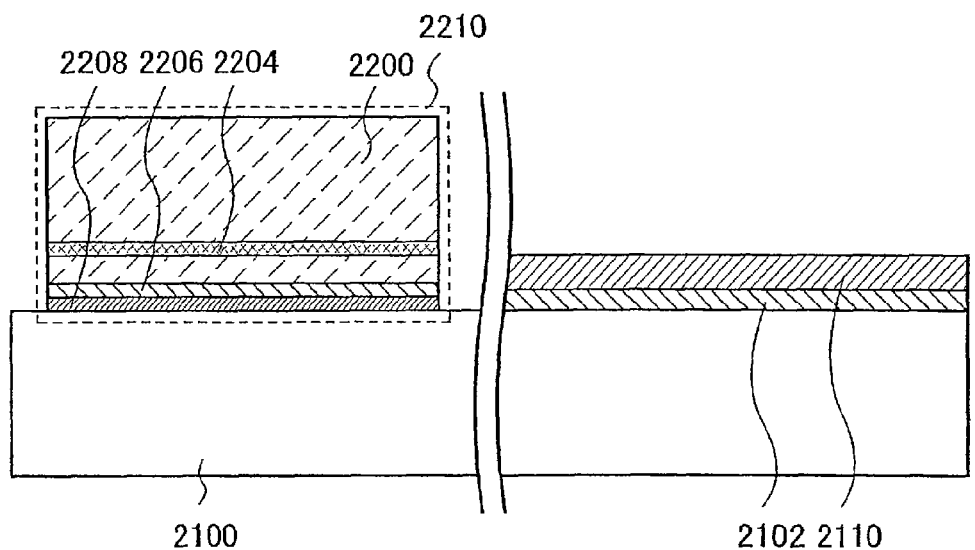
FIGS. 24A and 24B are diagrams each illustrating a fabrication process of a semiconductor substrate of the present invention.

Next, the base substrate 2100 and the single-crystal substrate 2210 are bonded together. In FIG. 24A, an example is shown in which the base substrate 2100 and a surface formed by the bonding layer 2208 of the single-crystal substrate 2210 are placed in contact with each other, and the base substrate 2100 and the bonding layer 2208 are bonded together, whereby the single-crystal substrate 2210 is attached to the base substrate 2100. It is to be noted that it is preferable that the surfaces (bonding surfaces) over which the bond is to be formed be sufficiently cleaned. By the base substrate 2100 and the bonding layer 2208 being placed in contact with each other, a bond is formed. Van der Waals forces are acting in this bond, and by pressure being applied to the base substrate 2100 and the single-crystal substrate 2210, a strong bond can be formed by hydrogen bonds.

In addition, in order to form a favorable bond between the base substrate 2100 and the bonding layer 2208, the bonding surfaces may be activated. For example, one or both of the surfaces by which the bond is formed are irradiated with an atom beam or an ion beam. When an atom beam or an ion beam is used, a neutral atom beam of an inert gas of argon or the like or an ion beam of an inert gas can be used. In addition, the bonding surfaces may be activated by performance of plasma irradiation or radical treatment. By this kind of surface treatment, formation of bonds between different kinds of materials even at temperatures of 400° C. or less becomes easy to perform.

Moreover, it is preferable that heat treatment or pressure treatment be performed after the base substrate 2100 and the single-crystal substrate 2210 are bonded together with the bonding layer 2208 interposed therebetween. By performance of heat treatment or pressure treatment, bonding strength can be increased. It is preferable that the temperature for heat treatment be a temperature lower than or equal to the upper temperature limit of the base substrate 2100. Pressure treatment is performed such that pressure is applied in a direction perpendicular to the bonding surfaces, in consideration of the resistance to pressure of the base substrate 2100 and the single-crystal substrate 2210.

Figure 24B:
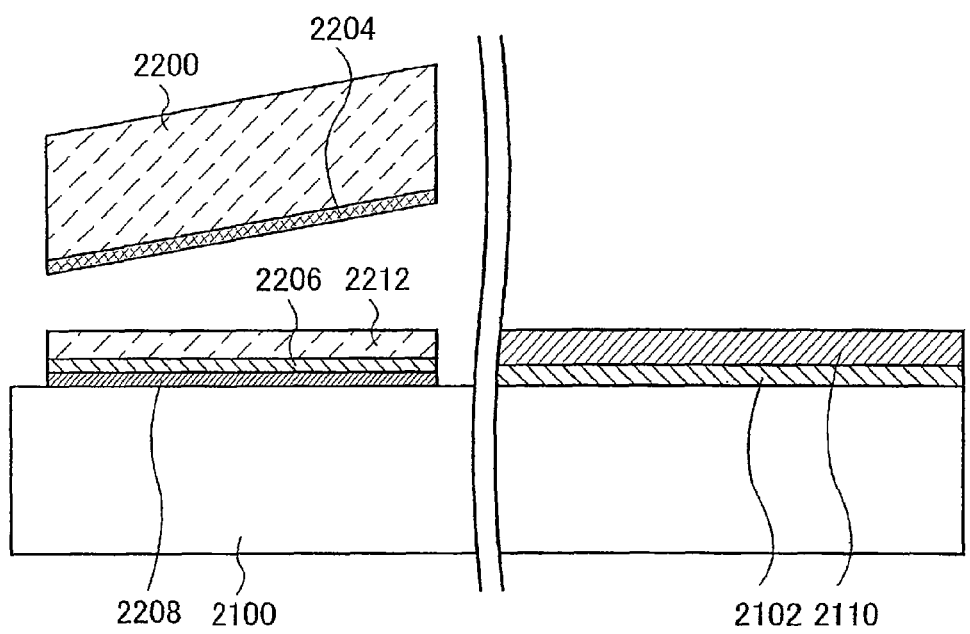

Next, heat treatment is performed, and a part of the single-crystal substrate 2210 is separated from the base substrate 2100 using the ion doping layer 2204 as a cleavage plane (with reference to FIG. 24B). It is preferable that heat treatment be performed at a temperature higher than or equal to the temperature for film formation of the bonding layer 2208 and lower than or equal to the upper temperature limit of the base substrate 2100. For example, by performance of heat treatment at a temperature of from 400° C. to 600° C., changes in the volume of minute cavities formed in the ion doping layer 2204 occur, and cleavage along the ion doping layer 2204 becomes possible. Because the bonding layer 2208 is bonded to the base substrate 2100, the single-crystal semiconductor layer 2212 that has the same crystallinity as the single-crystal substrate 2210 comes to be left remaining over the base substrate 2100.

By the above process, a single-crystal semiconductor substrate is formed in which the single-crystal semiconductor layer 2212 is provided over the base substrate 2100 with the bonding layer 2208 interposed therebetween and the crystalline semiconductor layer (an amorphous semiconductor layer) 2110 is provided. It is to be noted that the single-crystal semiconductor substrate described in the present embodiment mode is a structure in which a plurality of single-crystal semiconductor substrates are provided over a single base substrate with bonding layers interposed between each of the single-crystal semiconductor substrates and the base substrate; however, the single-crystal semiconductor substrate of the present invention is not limited to having this structure.

It is to be noted that it is preferable that the surface of the single-crystal semiconductor layer obtained by separation be polished by chemical mechanical polishing (CMP) so as to be planarized. Moreover, the surface of the single-crystal semiconductor layer may be planarized by irradiation of the surface with laser light without any use of a physical polishing means such as CMP or the like. It is to be noted that it is preferable that irradiation by laser light be performed under a nitrogen atmosphere that contains oxygen at a concentration of 10 ppm or less. This is because the surface of the single-crystal semiconductor layer may be made rough if irradiation by laser light is performed under an oxygen atmosphere. In addition, CMP or the like may be performed in order to thin the obtained single-crystal semiconductor layer, as well.

The present embodiment mode can be used in combination with any of Embodiment Mode 1 through Embodiment Mode 8, as appropriate.

(Embodiment Mode 10)

In the present embodiment mode, a fabrication method of a liquid crystal display device of the present invention will be described using FIGS. 25A to 25C, FIGS. 26A to 26D, FIGS. 27A to 27C, and FIGS. 28A to 28C. It is to be noted that, in the present embodiment mode, an example of fabrication of a liquid crystal display device in which the semiconductor substrate fabricated in Embodiment Mode 9 is used is given.

Figure 25A:
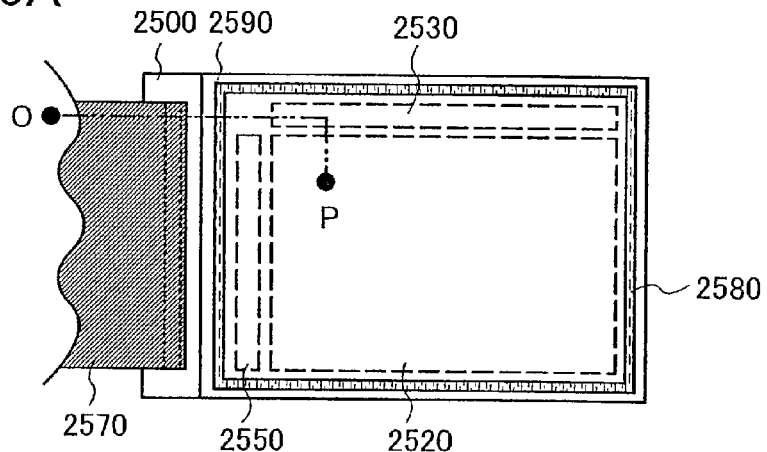
FIGS. 25A to 25C are diagrams illustrating a liquid crystal display device of the present invention.
Figure 25B:
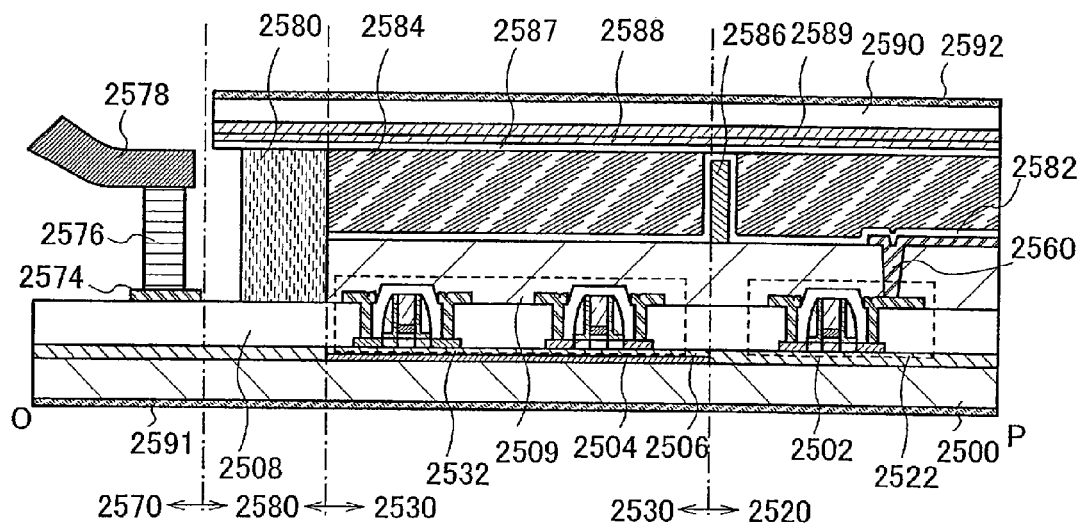
Figure 25C:
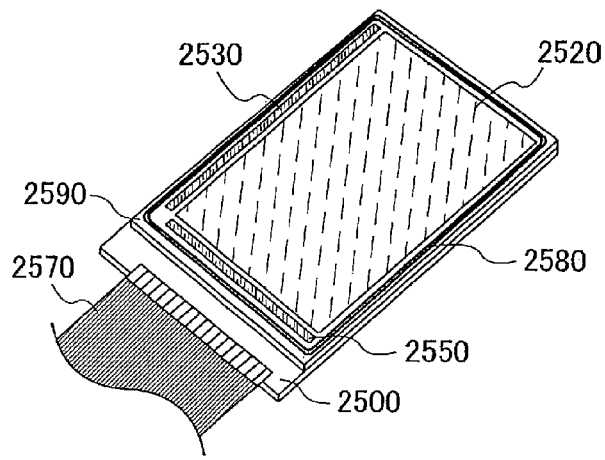

FIG. 25A is a top-view schematic diagram of a liquid crystal display device, FIG. 25B is a cross-sectional-view diagram taken along a line OP of FIG. 25A, and FIG. 25C is a perspective-view diagram of the liquid crystal display device.

A liquid crystal display device of the present embodiment mode has a display section 2520, a first driver circuit section 2530, and a second driver circuit section 2550 provided over a first substrate 2500. The display section 2520, the first driver circuit section 2530, and the second driver circuit section 2550 are sealed in between the first substrate 2500 and a second substrate 2590 by a sealant 2580. Furthermore, a terminal region 2570 that is connected to an external input terminal that transmits a signal from external to the first driver circuit section 2530 and the second driver circuit section 2550 is provided over the first substrate 2500.

As shown in FIG. 25B, a pixel circuit section 2522 that has a transistor is provided in the display section 2520. Furthermore, a peripheral circuit section 2532 that has a transistor is provided in the first driver circuit section 2530. An insulating layer 2502 is provided between the first substrate 2500 and the pixel circuit section 2522. A bonding layer 2504 and an insulating layer 2506 are stacked together between the first substrate 2500 and the peripheral circuit section 2532. It is to be noted that the structure may be set to be one in which an insulating layer that functions as a base insulating layer is provided over the substrate 2500. In the pixel circuit section 2522 and peripheral circuit section 2532 or as upper layers thereover, an insulating layer 2508 and an insulating layer 2509 that each function as an interlayer insulating layer are provided. A source electrode or drain electrode of the transistor formed in the pixel circuit section 2522 is electrically connected to a pixel electrode 2560 through an opening formed in the insulating layer 2509. It is to be noted that a circuit in which transistors are used is integrated into the pixel circuit section 2522; however, here, for sake of simplicity, a cross-sectional-view diagram of only one transistor is shown. In the same way, a circuit in which transistors are used is integrated into the peripheral circuit section 2532; however, for sake of simplicity, a cross-sectional-view diagram of only two transistors is shown.

Over the pixel circuit section 2522 and peripheral circuit section 2532, a liquid crystal layer 2584 that is interposed between an alignment film 2582, which is formed so as to cover the pixel electrode 2560, and an alignment film 2587 is provided. For the liquid crystal layer 2584, the distance (cell gap) is controlled by a spacer 2586. Over the alignment film 2587, a second substrate 2590 is provided with a counter electrode 2588 and a color filter 2589 interposed between the alignment film 2587 and the second substrate 2590. The first substrate 2500 and the second substrate 2590 are fixed in place by the sealant 2580.

Moreover, a polarizing plate 2591 is placed over the outer side of the first substrate 2500, and a polarizing plate 2592 is placed over the outer side of the second substrate 2590. It is to be noted that the present invention can be applied to any of a transmissive type, a reflective type, or transflective type, which is a combination of a transmissive type and a reflective type, of liquid crystal display device; however, out of these types, the effect is particularly prominent for cases in which the present invention is used in a transmissive type or transflective type of liquid crystal display device.

Furthermore, a terminal electrode 2574 is provided in the terminal region 2570. The terminal electrode 2574 is electrically connected to an external input terminal 2578 through an anisotropic conductive layer 2576.

Next, an example of a fabrication method of the liquid crystal display device shown in FIGS. 25A to 25C will be described.

Figure 26A:
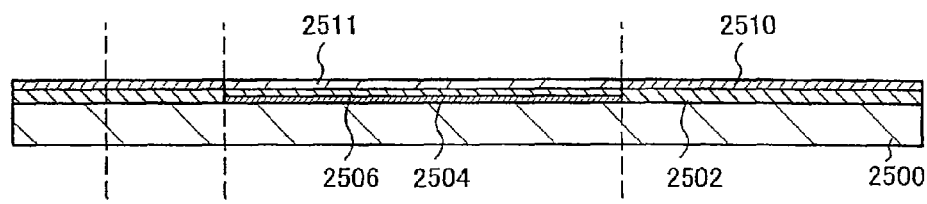
FIGS. 26A to 26D are diagrams illustrating a fabrication process of a liquid crystal display device of the present invention.

First, a semiconductor substrate is prepared (with reference to FIG. 26A). Here, an example is shown in which a semiconductor substrate similar to the one shown in FIG. 19B is applied; however, the present invention is not limited thereto.

Over the substrate 2500, which is a base substrate, an amorphous semiconductor layer 2510 is provided with the insulating layer 2502 interposed between the substrate 2500 and the semiconductor layer 2510, and a plurality of single-crystal semiconductor layers 2511 are provided with the bonding layer 2504 and the insulating layer 2506 provided between the substrate 2500 and each of the plurality of single-crystal semiconductor layers 2511. For the substrate 2500, a substrate that has an insulating surface or an insulating substrate is used. For example, a glass substrate of any of different types of glass used in the electronics industry, such as aluminosilicate glass, aluminoborosilicate glass, barium borosilicate glass, and the like, a quartz substrate; a ceramic substrate; a sapphire substrate, or the like can be used. Here, a glass substrate is set to be used.

It is to be noted that in order to prevent the diffusion of mobile ions of an alkali metal, an alkaline earth metal, and the like from a glass substrate, an insulating layer that functions as a base insulating layer may be provided separately. Specifically, it is preferable that an insulating layer that contains nitrogen, such as a silicon nitride layer, a silicon nitride oxide layer, or the like, be provided.

Next, the amorphous semiconductor layer 2510 is etched so that an amorphous semiconductor layer 2521 is formed in the display section 2520, and the single-crystal semiconductor layers 2511 are etched so that a first single-crystal semiconductor layer 2531 and a second single-crystal semiconductor layer 2541 are formed in the first driver circuit section 2530. Then, gate electrodes 2514 are formed over the amorphous semiconductor layer 2521, the first single-crystal semiconductor layer 2531, and the second single-crystal semiconductor layer 2541 with a gate insulating layer 2512 interposed between the gate electrodes 2514 and each of the amorphous semiconductor layer 2521, the first single-crystal semiconductor layer 2531, and the second single-crystal semiconductor layer 2541 (with reference to FIG. 26B).

It is to be noted that, in order to control threshold voltage of a completed transistor, an impurity element imparting one type of conductivity at low concentration may be added to the amorphous semiconductor layer 2521, the first single-crystal semiconductor layer 2531, and the second single-crystal semiconductor layer 2541. In this case, the impurity element is also added to the channel formation region of the transistor, as well. It is to be noted that the impurity element that is added here is added at a lower concentration than the concentration of a high-concentration impurity region that functions as a source region or a drain region and a low-concentration impurity region that functions as a LDD region.

For the gate electrodes 2514, after a conductive layer is formed over the entire surface of the substrate, the conductive layer is etched as selected and processed into desired shapes. Here, after a stacked-layer structure of the conductive layer is formed for the gate electrodes 2514, the conductive layer is etched as selected, and the separated conductive layers are processed so as to cross over each of the amorphous semiconductor layer 2521, the first single-crystal semiconductor layer 2531, and the second single-crystal semiconductor layer 2541.

The conductive layers forming the gate electrodes 2514 can be formed such that, after a conductive layer is formed over the entire surface of the substrate using a metal element such as tantalum (Ta), tungsten (W), titanium (Ti), molybdenum (Mo), chromium (Cr), aluminum (Al), copper (Cu), niobium (Nb), or the like or an alloy material or a compound material containing one or more of these metal elements by a CVD method or a sputtering method, the conductive layer is etched as selected to form the conductive layers forming the gate electrodes 2514. In addition, the conductive layers forming the gate electrodes 2514 can be formed using a semiconductor material typified by polycrystalline silicon to which is added an impurity element such as phosphorus or the like that imparts one type of conductivity.

It is to be noted that, here, an example is shown in which the gate electrodes 2514 are each formed of a stacked-layer structure of conductive layers of two layers; however, the gate electrodes may each have a single-layer structure or a stacked-layer structure of three or more layers. In addition, side surfaces of the conductive layers may be set to each have a tapered shape. When the gate electrode is set to have a stacked-layer structure of conductive layers, the width of the bottom layer of the conductive layers may be increased and side surfaces of each layer may be set to have a taper shape of differing angles of taper.

The gate insulating layers 2512 are formed using a material such as silicon oxide, silicon oxynitride, hafnium oxide, aluminum oxide, tantalum oxide, or the like using a CVD method, a sputtering method, an ALD method, or the like. Furthermore, the gate insulating layers 2512 can be formed by solid-state oxidation or solid-state nitridation of the amorphous semiconductor layer 2521, the first single-crystal semiconductor layer 2531, and the second single-crystal semiconductor layer 2541 by plasma treatment. Alternatively, the gate insulating layers 2512 may be formed such that, after an insulating layer is formed by a CVD method or the like, the insulating layer is oxidized by solid-state oxidation or nitrided by solid-state nitridation to form the gate insulating layers 2512.

Figure 26B:
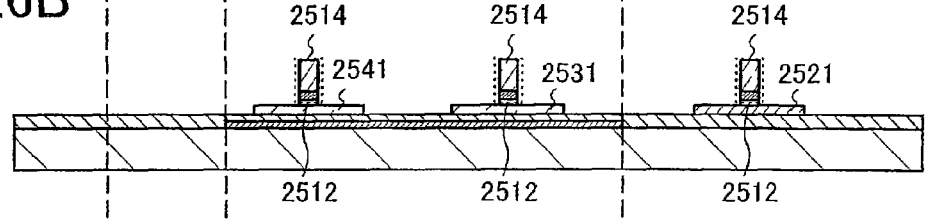
Figure 26C:
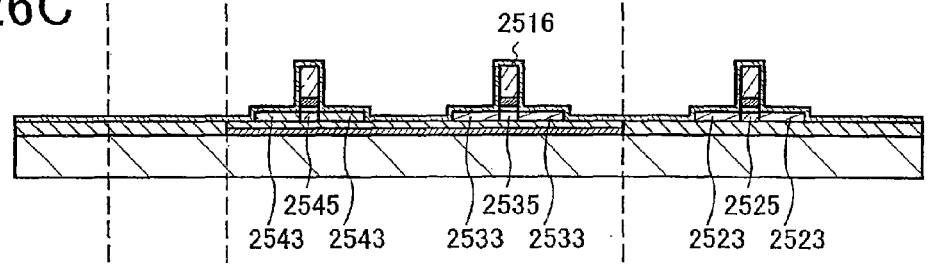
Figure 26D:
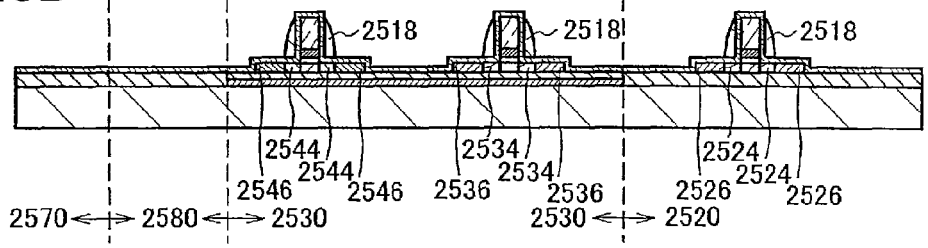

It is to be noted that, in FIG. 26B, an example is shown in which side edges of each of the gate insulating layers 2512 and each of the gate electrodes 2514 are processed so as to match up; however, there are no particular limitations on the structures of the gate insulating layers 2512 and the gate electrodes 2514, and the gate insulating layers 2512 may be processed so as to be left remaining during etching of the gate electrodes 2514.

Furthermore, when a substance with a high dielectric constant (a substance referred to as a "high-k material") is used in the gate insulating layers 2512, the gate electrodes 2514 are formed of polycrystalline silicon, a silicide, a metal, or a metal nitride. Preferably, the gate electrodes 2514 are formed of a metal or a metal nitride. For example, out of the conductive layers forming each of the gate electrodes 2514, the conductive layer that makes contact with the gate insulating layer 2512 is formed of a metal nitride material and upper conductive layers thereof are formed of a metal material. By use of this kind of combination, the widening of a depletion layer formed in the gate electrode can be prevented even when the gate insulating layer is made to be thin, and reduction of driving performance of the transistor can be prevented even when the transistor is miniaturized.

Next, an insulating layer 2516 is formed over the gate electrodes 2514. Then, an impurity element imparting one type of conductivity is added using the gate electrodes 2514 as masks (with reference to FIG. 26C). Here, an example is shown in which impurity elements imparting conductivity of different types are added to the first single-crystal semiconductor layer 2531 and the second single-crystal semiconductor layer 2541 that are formed in the first driver circuit section 2530. Furthermore, an example is shown in which an impurity element imparting the same type of conductivity as the impurity element added to the first single-crystal semiconductor layer 2531 is added to the amorphous semiconductor layer 2521 that is formed in the display section 2520.

In the amorphous semiconductor layer 2521 that is formed in the display section 2520, a pair of impurity regions 2523 and a channel formation region 2525 placed between the pair of impurity regions 2523 are formed in a self-aligning manner using the gate electrode 2514 as a mask.

In the first single-crystal semiconductor layer 2531 that is formed in the first driver circuit section 2530, a pair of impurity regions 2533 and a channel formation region 2535 placed between the pair of impurity regions 2533 are formed in a self-aligning manner using the gate electrode 2514 as a mask. In the second single-crystal semiconductor layer 2541, a pair of impurity regions 2543 and a channel formation region 2545 placed between the pair of impurity regions 2543 are formed in a self-aligning manner using the gate electrode 2514 as a mask. Impurity elements imparting conductivity of different types are added to the impurity regions 2533 and the impurity regions 2543.

For an impurity element imparting one type of conductivity, an element imparting p-type conductivity such as boron (B), aluminum (Al), gallium (Ga), or the like or an element imparting n-type conductivity such as phosphorus (P), arsenic (As), or the like can be used. In the present embodiment mode, an element, for example, phosphorus, imparting n-type conductivity is added to the amorphous semiconductor layer 2521 formed in the display section 2520 and to the first single-crystal semiconductor layer 2531 formed in the first driver circuit section 2530. Moreover, an element, for example, boron, imparting p-type conductivity is added to the second single-crystal semiconductor layer 2541. It is to be noted that, in addition of the impurity element to the amorphous semiconductor layer 2521 and the first single-crystal semiconductor layer 2531, the second single-crystal semiconductor layer 2541 may be covered as selected using a resist mask or the like. Similarly, in addition of the impurity element to the second single-crystal semiconductor layer 2541, the amorphous semiconductor layer 2521 and the first single-crystal semiconductor layer 2531 may be covered as selected using a resist mask or the like.

The insulating layer 2516 can be formed using a material such as silicon oxide, silicon oxynitride, silicon nitride, silicon nitride oxide, or the like using a CVD method, a sputtering method, an ALD method, or the like. In the addition of the impurity element that imparts one type of conductivity, by the configuration being set to be one in which the impurity element that imparts one type of conductivity is added by being passed through the insulating layer 2516, the amount of damage for the amorphous semiconductor layer and the single-crystal semiconductor layer can be reduced.

Next, sidewall insulating layers 2518 are formed on side surfaces of the gate electrodes 2514. Then, the impurity element imparting one type of conductivity is added using the gate electrodes 2514 and the sidewall insulating layers 2518 as masks (with reference to FIG. 26D). It is to be noted that impurity elements of the same conductivities as those of the impurity elements added to the amorphous semiconductor layer 2521, the first single-crystal semiconductor layer 2531, and the second single-crystal semiconductor layer 2541 during respective preceding steps (steps in which the impurity region 2523, the impurity region 2533, and the impurity region 2543 are formed). Furthermore, the impurity elements are added at concentrations higher than those of the impurity elements added during the preceding steps.

In the amorphous semiconductor layer 2521, a pair of high-concentration impurity regions 2526 and a pair of low-concentration impurity regions 2524 are formed in a self-aligning manner using the gate electrode 2514 and the sidewall insulating layer 2518 as masks. Here, each of the high-concentration impurity regions 2526 that are formed functions as a source region or a drain region and the low-concentration impurity regions 2524 that are formed function as lightly doped drain (LDD) regions.

In the first single-crystal semiconductor layer 2531, a pair of high-concentration impurity regions 2536 and a pair of low-concentration impurity regions 2534 are formed in a self-aligning manner using the gate electrode 2514 and the sidewall insulating layer 2518 as masks. Here, each of the high-concentration impurity regions 2536 that are formed functions as a source region or a drain region and the low-concentration impurity regions 2534 that are formed function as lightly doped drain (LDD) regions. In the second single-crystal semiconductor layer 2541, a pair of high-concentration impurity regions 2546 and a pair of low-concentration impurity regions 2544 are formed in a self-aligning manner using the gate electrode 2514 and the sidewall insulating layer 2518 as masks.

It is to be noted that, in addition of the impurity element to the amorphous semiconductor layer 2521 and the first single-crystal semiconductor layer 2531, the second single-crystal semiconductor layer 2541 may be covered as selected using a resist mask or the like. Similarly, in addition of the impurity element to the second single-crystal semiconductor layer 2541, the amorphous semiconductor layer 2521 and the first single-crystal semiconductor layer 2531 may be covered as selected using a resist mask or the like.

The sidewall insulating layers 2518 are provided on side surfaces of the gate electrodes 2514 with the insulating layer 2516 interposed between the sidewall insulating layers 2518 and the gate electrodes 2514. For example, by performance of anisotropic etching in a perpendicular direction of an insulating layer that is formed so that each of the gate electrodes 2514 is buried, the sidewall insulating layers 2518 can be formed on side surfaces of the gate electrodes 2514 in a self-aligning manner. The sidewall insulating layers 2518 can be formed using a material such as silicon nitride, silicon nitride oxide, silicon oxide, silicon oxynitride, or the like. It is to be noted that when the insulating layer 2516 is formed using silicon oxide or silicon oxynitride, the insulating layer 2516 can be made to function as an etching stopper if the sidewall insulating layers 2518 are formed using silicon nitride or silicon nitride oxide. In addition, when the insulating layer 2516 is formed using silicon nitride or silicon nitride oxide, the sidewall insulating layers 2518 may be formed using silicon oxide or silicon oxynitride. In this way, by provision of an insulating layer that can function as an etching stopper, etching of the amorphous semiconductor layer and the single-crystal semiconductor layer due to overetching in formation of the sidewall insulating layers can be prevented.

Figure 27A:
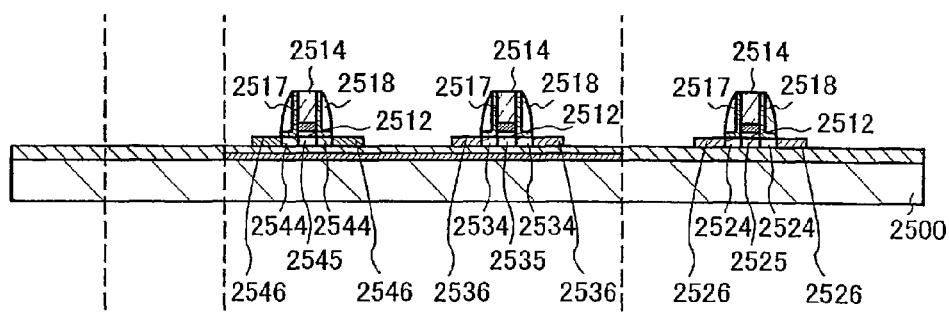
FIGS. 27A to 27C are diagrams illustrating a fabrication process of a liquid crystal display device of the present invention.
Figure 27B:
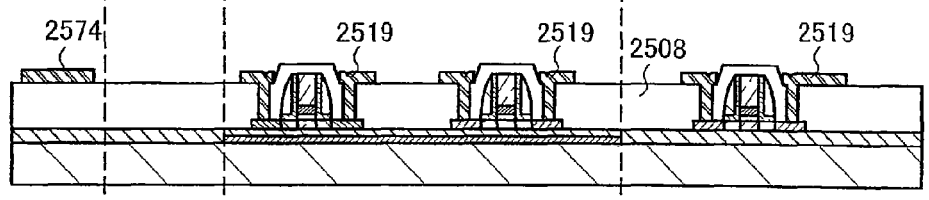
Figure 27C:
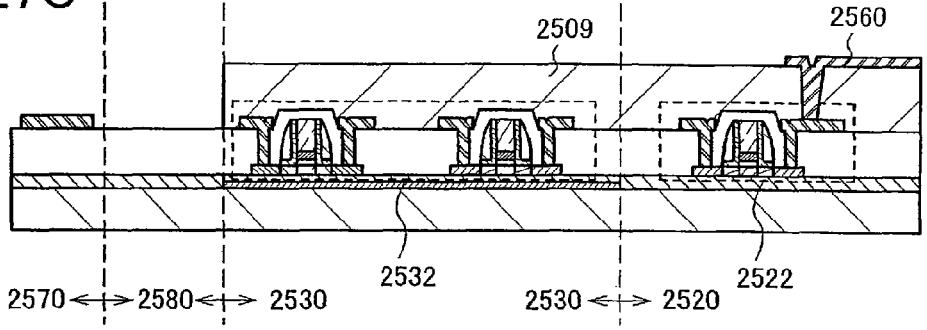

Next, exposed portions of the insulating layer 2516 are etched to form an insulating layer 2517 (with reference to FIG. 27A). The insulating layer 2517 is left remaining between the sidewall insulating layers 2518 and the gate electrodes 2514, between the sidewall insulating layers 2518 and the amorphous semiconductor layer 2521, between the sidewall insulating layers 2518 and the first single-crystal semiconductor layer 2531, and between the sidewall insulating layers 2518 and the second single-crystal semiconductor layer 2541.

It is to be noted that a silicide layer may be formed in order to lower the resistance of each of the high-concentration impurity regions that each function as a source region or drain region. For the silicide layer, a cobalt silicide or a nickel silicide may be applied. When the film thickness of the amorphous semiconductor layer and the single-crystal semiconductor layer is thin, a silicide reaction may be made to proceed to the bottom portion of the amorphous semiconductor layer and the single-crystal semiconductor layer in which the high-concentration impurity regions are formed so that the amorphous semiconductor layer and the single-crystal semiconductor layer in which the high-concentration impurity regions are formed are fully silicided.

Next, after the insulating layer 2508 is formed over the entire surface of the substrate 2500, the insulating layer 2508 is etched as selected, and openings that each reach one of the high-concentration impurity regions 2526 that are formed in the amorphous semiconductor layer 2521 of the display section 2520 are formed. Furthermore, openings that each reach one of the high-concentration impurity regions 2536 or one of the high-concentration impurity regions 2546 that are formed in the first single-crystal semiconductor layer 2531 and the second single-crystal semiconductor layer 2541, respectively, of the first driver circuit section 2530 are formed. Then, conductive layers 2519 are formed so that each of the openings is buried. Moreover, a terminal electrode 2574 is formed in the terminal region 2570 (with reference to FIG. 27B).

The insulating layer 2508 is formed by a CVD method, a sputtering method, an ALD method, a coating method, or the like using an inorganic insulating material that contains oxygen or nitrogen such as silicon oxide, silicon nitride, silicon oxynitride, silicon nitride oxide, or the like; an insulating material that contains carbon such as diamond-like carbon (DLC) or the like; an organic insulating material such as epoxy, polyimide, polyamide, polyvinyl phenol, benzocyclobutene, acrylic, or the like; or a siloxane material such as a siloxane resin or the like. It is to be noted that a siloxane material corresponds to a material that contains Si—O—Si bonds. The skeleton structure of siloxane is formed of bonds of silicon (Si) and oxygen (O). As a substituent, an organic group that contains at least hydrogen (for example, an alkyl group or an aromatic hydrocarbon group) is used. As a substituent, a fluoro group may be used, as well. In addition, an organic group that contains hydrogen at least and a fluoro group may be used. Furthermore, for the insulating layer 2508, after an insulating layer is formed using a CVD method, a sputtering method, or an ALD method, plasma treatment may be performed on the insulating layer in an oxygen atmosphere or a nitrogen atmosphere. Here, an example is shown in which the insulating layer 2508 has a single-layer structure; however, the insulating layer 2508 may be set to have a stacked-layer structure of two or more layers, as well. In addition, the insulating layer 2508 may be formed of any combination of organic insulating layers and organic insulating layers. For example, the insulating layer 2508 can be formed using materials of a silicon nitride film or silicon nitride oxide film that can be made to function as a passivation layer formed over the entire surface of the substrate 2500 and phosphosilicate glass (PSG) or borophosphosilicate glass (BPSG) that can be made to function as a planarization layer formed over the upper layer of the silicon nitride film or silicon nitride oxide film.

The conductive layers 2519 each function as an electrode that functions as a source electrode or a drain electrode. The conductive layers 2519 are electrically connected to the amorphous semiconductor layer 2521, the first single-crystal semiconductor layer 2531, and the second single-crystal semiconductor layer 2541 through the openings formed in the insulating layer 2508.

For the conductive layers 2519, after a conductive layer is formed as a single-layer structure or stacked-layer structure over the entire surface of the substrate using a CVD method or a sputtering method using a metal element such as aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), silicon (Si), or the like or an alloy material or compound material that contains any of the metal elements, the conductive layers 2519 can be formed by etching of the conductive layer as selected. For an alloy material that contains aluminum, for example, a material that contains aluminum as its main component and nickel and a material that contains aluminum as its main component, nickel, and either one or both of carbon and silicon can be given. Furthermore, for a compound material that contains tungsten, for example, a tungsten silicide can be given. For the conductive layers 2519, for example, a stacked-layer structure of a barrier layer, an aluminum-silicon (Al—Si) layer, and a barrier layer or a stacked-layer structure of a barrier layer, an aluminum-silicon (Al—Si) layer, a titanium nitride layer, and a barrier layer can be employed. It is to be noted that a barrier layer corresponds to a thin film formed of titanium, a nitride of titanium, molybdenum, or a nitride of molybdenum. Because aluminum and aluminum silicon have low resistance and are inexpensive, they are the most suitable for materials used to form the conductive layers that each function as a source electrode or drain electrode. Moreover, setting the conductive layers that each function as a source electrode or drain electrode to have a stacked-layer structure in which barrier layers are provided as a top layer and a bottom layer is preferable because the formation of hillocks of aluminum or aluminum silicon can be prevented with such a structure.

The terminal electrode 2574 formed in the terminal region 2570 functions as an electrode used to electrically connect an external input terminal of an FPC or the like to be formed during a subsequent step and the first driver circuit section 2530 and second driver circuit section 2550. Here, an example is shown in which the terminal electrode 2574 is formed using the same materials of which the conductive layers 2519 are formed.

As described above, the pixel circuit section 2522 in which a transistor that has the amorphous semiconductor layer 2521 is formed in the display section 2520. Furthermore, the peripheral circuit section 2532 in which a transistor that has the first single-crystal semiconductor layer 2531 is formed in the first driver circuit section 2530 and a transistor that has the second single-crystal semiconductor layer 2541 is formed in the first driver circuit section 2530 is formed.

It is to be noted that, in the present embodiment mode, a process in which doping and the like are applied to an amorphous semiconductor layer and a single-crystal semiconductor layer at the same time is described; however, the present invention is not to be taken as being limited to use of this kind of structure only. A liquid crystal display device may be fabricated using optimal processes for an amorphous semiconductor layer and optimal processes for a single-crystal semiconductor layer. It is to be noted that, in cases in which etching, doping, and the like are applied to an amorphous semiconductor layer and a single-crystal semiconductor layer at the same time, because the fabrication process can be simplified to quite a great extent, significant effects, such as a decrease in costs, an improvement in yield, and the like, can be obtained.

Next, the insulating layer 2509 is formed over the display section 2520 and the first driver circuit section 2530. Then, the insulating layer 2509 that is formed over the display section 2520 is etched as selected, and an opening that reaches the conductive layer 2519 of the transistor that is formed in the pixel circuit section 2522 is formed. After the opening is formed in the conductive layer 2519, the pixel electrode 2560 is formed so that the opening is buried (with reference to FIG. 27C).

For the insulating layer 2509, formation of a planarization layer by which unevenness in the display section 2520 and the first driver circuit section 2530 can be planarized so that a planar surface is formed is preferable. For example, the planarization layer can be formed using an organic insulating material such as epoxy, polyimide, polyamide, polyvinyl phenol, benzocyclobutene, acrylic, or the like or a siloxane material such as a siloxane resin or the like. Here, an example is shown in which the insulating layer 2509 has a single-layer structure; however, the insulating layer 2509 may also have a stacked-layer structure of two or more layers. When the insulating layer 2509 is formed as a stacked-layer structure, for example, the insulating layer 2509 can be made to have a stacked-layer structure in which an organic resin or the like is used in an upper layer and an inorganic insulating layer of silicon oxide, silicon nitride, silicon oxynitride, or the like is used as a lower layer or a structure in which an organic insulating layer is interposed between inorganic insulating layers. The insulating layer 2509 can be formed as selected using any of a variety of different printing methods (screen printing, planographic printing, relief printing, gravure printing, or the like), a liquid droplet discharge method, a dispenser method, or the like. Alternatively, the insulating layer 2509 can be formed by an insulating layer first being formed over the entire surface of the substrate and then etched as selected in regions other than desired regions (here, regions of the display section 2520 and the first driver circuit section 2530).

It is preferable that the pixel electrode 2560 in the present embodiment mode be formed of a material that transmits visible light. For a conductive material that transmits light, indium tin oxide (ITO), indium tin oxide that contains silicon oxide (ITSO), zinc oxide (ZnO), indium zinc oxide (IZO), zinc oxide to which gallium has been added (GZO), and the like can be given. Meanwhile, cases in which the film thickness of the pixel electrode 2560 can be made to be thin enough are not limited to use of the aforementioned materials. This is because, even with materials through which light is not transmitted in pixel electrodes of regular film thickness, light is transmitted in cases in which the thickness of pixel electrodes of such materials is made to be thin enough. In these kinds of cases, a metal element such as tantalum (Ta), tungsten (W), titanium (Ti), molybdenum (Mo), aluminum (Al), chromium (Cr), silver (Ag), or the like or an alloy material or compound material that contains any of the metal elements can be used.

It is to be noted that, in cases in which a reflective liquid crystal display device or a transflective liquid crystal display device is fabricated, any of the aforementioned metal elements or the like may be used.

Next, after the spacer 2586 is formed, the alignment film 2582 is formed so as to cover the pixel electrode 2560 and the spacer. Next, the sealant 2580 is formed so as to enclose the display section 2520, the first driver circuit section 2530, and the second driver circuit section 2550 (with reference to FIG. 28A).

The spacer 2586 can be formed using an organic insulating material such as epoxy, polyimide, polyamide, polyimide amide, acrylic, or the like or an inorganic insulating material such as silicon oxide, silicon nitride, silicon oxynitride, silicon nitride oxide, or the like as a single-layer structure or a stacked-layer structure. In the present embodiment mode, in order that a columnar spacer be formed for the spacer 2586, an insulating layer is formed over the entire surface of the substrate and then etched and processed so that a spacer with the desired shape is obtained. It is to be noted that there are no particular limitations on the shape of the spacer 2586, and spherical spacers may be applied, as well. The width of a cell gap can be retained by use of the spacer 2586.

The alignment film 2582 is a layer by which the liquid crystal can be aligned in a uniform direction. A material may be selected based on the operation mode of the liquid crystal. For example, the alignment film 2582 can be fabricated by formation of a layer using a material of polyimide, polyamide, or the like and then performance of alignment treatment so that the layer can be made to function as an alignment film. For the alignment treatment, rubbing, irradiation with ultraviolet light rays, or the like may be performed. There are no particular limitations on the method of formation of the alignment film 2582, and the alignment film 2582 can be formed over the insulating layer 2509 as selected by use of any of a variety of printing methods or a liquid droplet discharge method.

The sealant 2580 is formed so as to enclose at least a display region. In the present embodiment mode, a seal pattern is formed so as to enclose the periphery of the display section 2520, the first driver circuit section 2530, and the second driver circuit section 2550. For the sealant 2580, a thermally curable resin or light curable resin can be used. It is to be noted that the width of the cell gap can be retained by the sealant being made to contain a filler. The sealant 2580 is hardened by performance of irradiation with light, thermal treatment, or the like in the sealing of the substrate and another substrate over which a counter electrode, a color filter, and the like are provided that is to be performed in a subsequent step.

The liquid crystal layer 2584 is formed in a region enclosed by the sealant 2580. In addition, the second substrate 2590 over which the color filter 2589, the counter electrode 2588, and the alignment film 2587 are stacked in the order given is bonded to the first substrate 2500 (with reference to FIG. 28B).

The liquid crystal layer 2584 is formed using desired liquid crystal materials. Furthermore, the liquid crystal layer 2584 by dripping of a liquid crystal material into a seal pattern that is formed of the sealant 2580. Dripping of the liquid crystal material may be performed using a dispenser method or a liquid droplet discharge method. It is to be noted that it is preferable that the liquid crystal material be degassed under reduced pressure either in advance or after dripping is completed. Furthermore, it is preferable that dripping of the liquid crystal material be performed under an inert gas atmosphere so that impurities and the like are not introduced into the liquid crystal material. In addition, it is preferable that steps from after dripping of the liquid crystal material to form the liquid crystal layer 2584 up through bonding of the first substrate 2500 and the second substrate 2590 be performed at reduced pressure so that air bubbles and the like are not formed in the liquid crystal layer 2584.

Alternatively, the liquid crystal layer 2584 can be formed by injection of the liquid crystal material into the frame-shaped pattern that is formed of the sealant 2580 by use of a capillary phenomenon after the first substrate 2500 and the second substrate 2590 are bonded together. In this case, a portion that is to be an opening through which the liquid crystal material is injected is formed in advance. It is to be noted that it is preferable that injection of the liquid crystal material be performed at reduced pressure.

After the first substrate 2500 and the second substrate 2590 are made to face each other and brought into close contact with each other, the first substrate 2500 and the second substrate 2590 can be attached together by the sealant 2580 being made to harden. At this time, the first substrate 2500 and the second substrate 2590 are attached to each other in such a way that the structure becomes one in which the liquid crystal layer 2584 is clamped between the alignment film 2587 that is provided over the second substrate 2590 and the alignment film 2582 that is provided over the first substrate 2500. It is to be noted that, after the first substrate 2500 and the second substrate 2590 are bonded together and the liquid crystal layer 2584 is formed, correcting disarray of the alignment of the liquid crystal layer 2584 by performance of heat treatment is possible.

For the second substrate 2590, a substrate that can transmit light is used. For example, any of a variety of glass substrates of aluminosilicate glass, aluminoborosilicate glass, barium borosilicate glass, or the like; a quartz substrate; a ceramic substrate; a sapphire substrate; or the like can be used.

Over the second substrate 2590, before bonding is performed, the color filter 2589, the counter electrode 2588, and the alignment film 2587 are formed in the order given. It is to be noted that a black matrix may be provided over the second substrate 2590 in addition to the color filter 2589. Furthermore, the color filter 2589 may be provided on the outer side of the second substrate 2590. In addition, when display is set to be monochrome display, the color filter 2589 need not be provided. Moreover, a sealant may be provided on the second substrate 2590 side, as well. It is to be noted that when a sealant is provided on the second substrate 2590 side, the liquid crystal material is dripped into a pattern of the sealant that is provided on the second substrate 2590 side.

The counter electrode 2588 can be formed of a conductive material that has a property by which visible light is transmitted, such as indium tin oxide (ITO), indium tin oxide that contains silicon oxide (ITSO), zinc oxide (ZnO), indium zinc oxide (IZO), zinc oxide to which gallium has been added (GZO), or the like. The alignment film 2587 can be formed in the same way as the alignment film 2582 is formed.

As described above, a structure is obtained in which the display section 2520, the first driver circuit section 2530, and the second driver circuit section 2550 that include the liquid crystal layer 2584 are sealed between the first substrate 2500 and the second substrate 2590. It is to be noted that, in addition to transistors, resistors, capacitors, and the like may be formed in circuit sections provided in the display section 2520, the first driver circuit section 2530, and the second driver circuit section 2550 at the same time. Furthermore, there are no particular limitations on the structure of any of the transistors. For example, the structure can be set to be a multi-gate structure in which a plurality of gates is provided for the amorphous semiconductor layer or the single-crystal semiconductor layer.

Figure 28A:
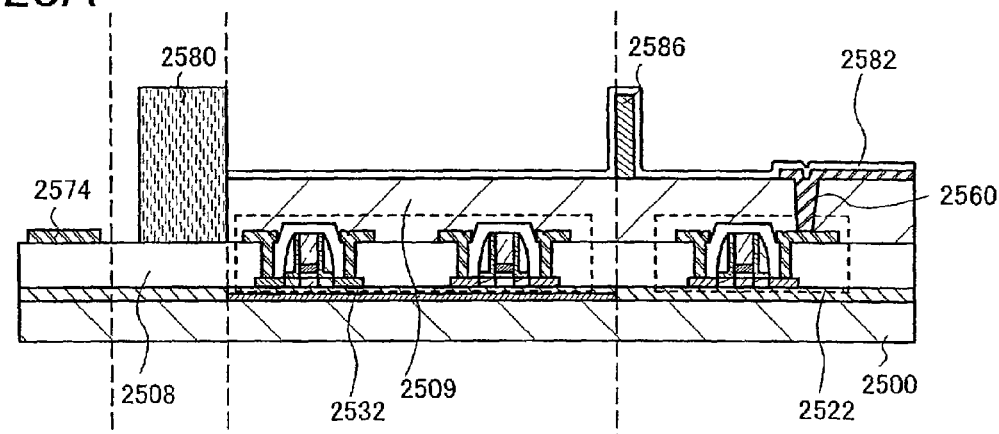
FIGS. 28A to 28C are diagrams illustrating a fabrication process of a liquid crystal display device of the present invention.
Figure 28B:
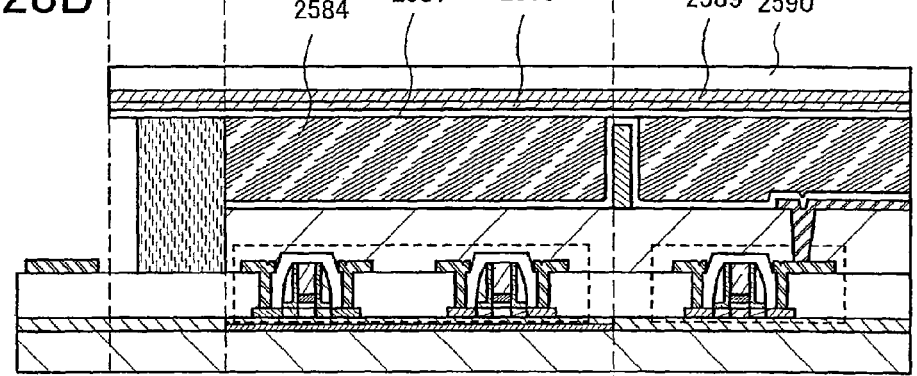
Figure 28C:
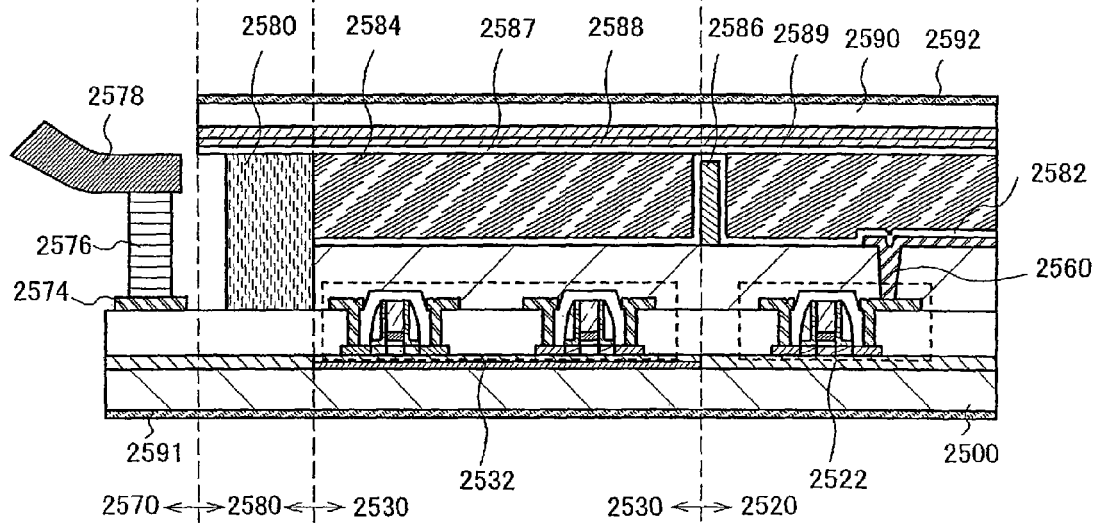

Next, the polarizing plate 2591 and the polarizing plate 2592 are provided over the first substrate 2500 and the second substrate 2590, and the external input terminal 2578 is connected to the terminal electrode 2574 via the anisotropic conductive layer 2576 (with reference to FIG. 28C). Then, a light sensor corresponding to a monitor section is positioned. It is to be noted that pixels of the monitor section can be fabricated in the same way as pixels of the display section. The monitor section can be formed of one pixel; alternatively, the monitor section may be formed using two or more pixels. The area of the pixel of the monitor section may be the same as the area of the pixel of the display section or larger than the area of the pixel of the display section. By the monitor section being formed of a plurality of pixels, accuracy in the detection of luminance can be improved. Furthermore, by the area of the pixel of the monitor section being increased, accuracy in detection of luminance can be improved similarly. In other words, the backlight can be controlled finely.

The external input terminal 2578 assumes the function of transmission of signals (for example, video signals, clock signals, start signals, reset signals, and the like) and electric potential from external. Here, an FPC is connected as the external input terminal 2578. It is to be noted that the terminal electrode 2574 is set to be an electrode that is electrically connected to the first driver circuit section 2530 and the second driver circuit section 2550.

By the steps described above, a liquid crystal display device can be obtained. It is to be noted that the present embodiment mode can be used in combination with any of Embodiment Mode 1 through Embodiment Mode 9, as appropriate.

(Embodiment Mode 11)

In Embodiment Mode 10, a liquid crystal display device in which a semiconductor substrate of Embodiment Mode 9 is used is described; in the present embodiment mode, a different kind of display device will be described using FIGS. 29A and 29B.

Figure 29A:
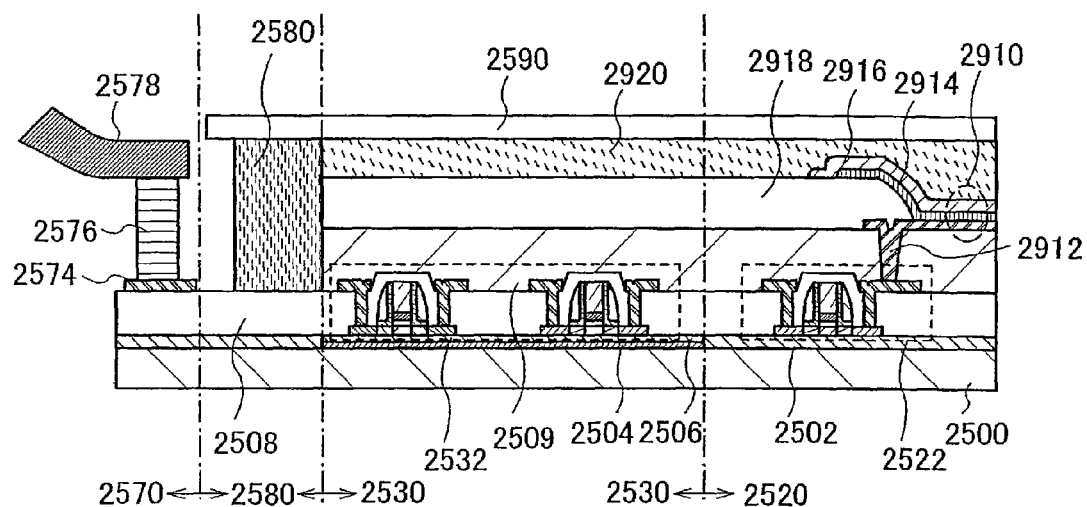
FIGS. 29A and 29B are diagrams each illustrating a different type of display device.

FIG. 29A is an example of a display device in which a light-emitting element is used (this kind of display device is also referred to as a light-emitting device or an EL display device). FIG. 29B is an example of a display device in which an electrophoretic element is used (this kind of display device is also referred to as electronic paper or an electrophoretic display device). Because structures other than those of display elements are the same as those given in Embodiment Mode 10, a detail description of those structures will be omitted here.

In FIG. 29A, a liquid crystal display device in which a light-emitting element 2910 is used instead of a liquid crystal element is shown. Here, an example is given in which an organic compound layer 2914 is provided between a pixel electrode (cathode) 2912 and a counter electrode (anode) 2916. The organic compound layer 2914 has at least a light-emitting layer and may also have an electron-injecting layer, an electron-transporting layer, a hole-transporting layer, a hole-injecting layer, and the like, as well. Furthermore, an end of the pixel electrode (cathode) 2912 is covered with a partition layer 2918. The partition layer 2918 may be formed by a film being formed over the entire surface of the substrate using an insulating material and then processed so as to expose a portion of the pixel electrode (cathode) 2912, or the partition layer 2918 may be formed as selected using a liquid droplet discharge method or the like. The organic compound layer 2914 and the counter electrode (anode) 2916 are stacked, in the order given, over the pixel electrode (cathode) 2912 and the partition layer 2918. A space 2920 between the light-emitting element 2910 and the second substrate 2590 may be filled in with an inert gas or the like, or a resin or the like may be formed in the space 2920.

It is to be noted that, in the present embodiment mode, the light-emitting element is formed using an organic material; however, the present invention is not limited to having this structure only. The light-emitting element may also be formed using an organic material, or the light-emitting element may be formed using a combination of an organic material and an inorganic material.

Figure 29B:
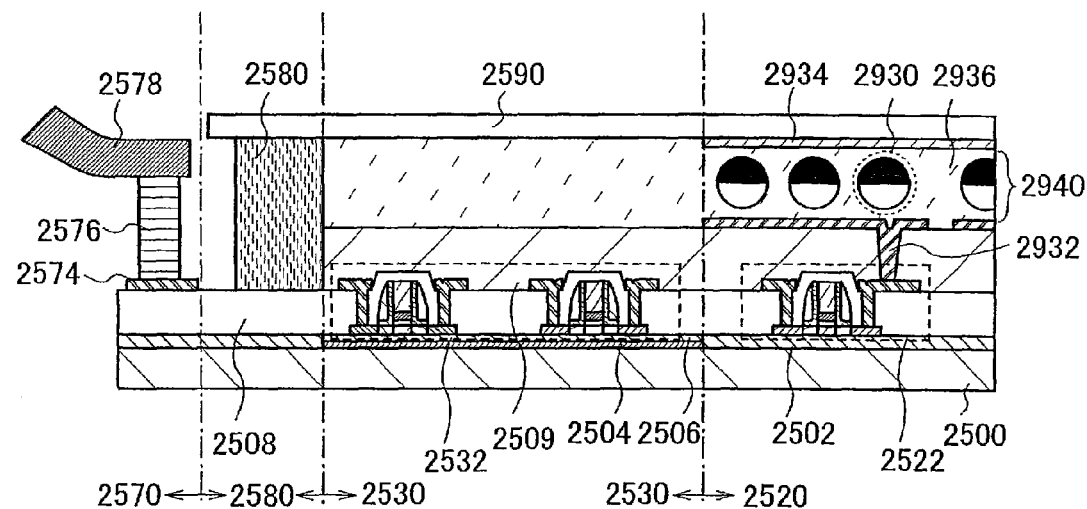

In FIG. 29B, a display device in which an electrophoretic element is used instead of a liquid crystal element is shown. Here, an example is given in which an electrophoretic layer 2940 is provided between a pixel electrode 2932 and a counter electrode (a common electrode) 2934. The electrophoretic layer 2940 has a plurality of microcapsules 2930 that are fixed in place by a binder 2936. Each of the microcapsules 2930 has a diameter of about 10 μm to 200 μm, inclusive, and a transparent liquid, a positively charged white microparticle, and a negatively charged black microparticle are encapsulated in each microcapsule 2930. If an electric field is applied between the pixel electrode 2932 and the counter electrode (the common electrode) 2934, the white microparticle and the black microparticle move in opposite directions so that white or black can be displayed. An electrophoretic element is a display element in which this principle is applied. By use of an electrophoretic element, which has a higher reflectance than a liquid crystal element, a display portion can be perceived even in a dimly lit place without any kind of an auxiliary light (for example, a front light). In addition, power consumption is low. Moreover, an image which has been displayed once can be retained even if no power is supplied to the display portion.

The present invention is essentially geared toward liquid crystal display devices but can be applied to other types of display devices, as well. For example, luminance control of a light-emitting element in an electroluminescent display device can be performed instead of control of output of a backlight in a liquid crystal display device. In this case, the structure may be set to be one in which a light sensor is provided so as to be facing a light-emitting element (a light-emitting element for monitor use) and changes in luminance of the light-emitting element are detected. Herewith, display can be performed with a constant luminance being kept even if deterioration of the light-emitting element gets worse. Furthermore, in a display device in which an electrophoretic element is used, by performance of correction by reflective light such that correct grayscale is displayed, the amount of change in image quality with change in the environment can be reduced, and excellent image quality can be displayed. It is to be noted that, in this case, for example, a structure can be employed in which an electrophoretic element for monitor use, a light source, and a light sensor are provided; the electrophoretic element for monitor use is irradiated with light from the light source; and the amount of light reflected from the electrophoretic element for monitor use is detected using the light sensor. Here, the light source and the light sensor are arranged so as to be facing the electrophoretic element. Alternatively, the structure may be one in which no light source is provided and the reflection of light from external is detected.

The present embodiment mode can be used in combination with any of Embodiment Mode 1 through Embodiment Mode 10, as appropriate.

(Embodiment Mode 12)

Electronic devices in which the liquid crystal display device of the present invention is used will be described with reference to FIGS. 30A to 30H.

For electronic devices in which the liquid crystal display device of the present invention is used, cameras such as video cameras, digital cameras, and the like; goggles-type displays (head-mounted displays); navigation systems; audio playback devices (car audio components and the like); computers; game machines; portable information terminals (mobile computers, cellular phones, portable game machines, electronic book readers, and the like); image playback devices provided with storage media (specifically, devices that can play storage media such as digital versatile discs (DVDs) or the like and that are equipped with a display device by which the images can be displayed); and the like can be given.

Figure 30A:
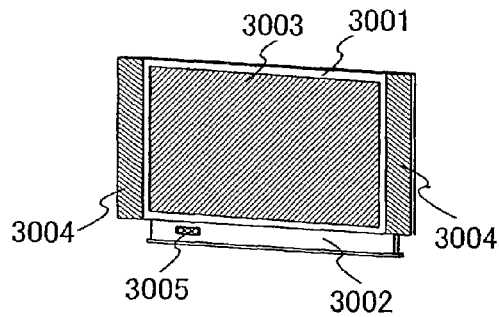
FIGS. 30A to 30H are diagrams illustrating electronic devices of the present invention.

FIG. 30A is a diagram of a television set or monitor of a personal computer. The television set or monitor of a personal computer includes a chassis 3001, a support stand 3002, a display 3003, speakers 3004, video input terminals 3005, and the like. The display device of the present invention is used in the display 3003. By the present invention, a television set or monitor of a personal computer with excellent image quality and high video performance can be provided.

Figure 30B:
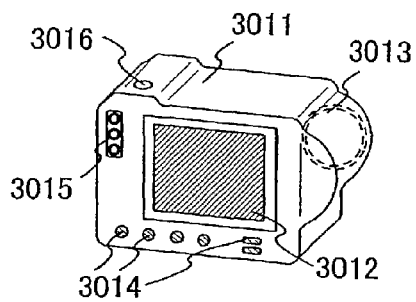

FIG. 30B is a diagram of a digital camera. On the front side part of a main body 3011, an image receiver 3013 is provided, and on the top side part of the main body 3011, a shutter button 3016 is provided. Furthermore, on the back side part of the main body 3011, a display 3012, operation keys 3014, and an external connection port 3015 are provided. The display device of the present invention is used in the display 3012. By the present invention, a digital camera with excellent image quality and high video performance can be provided.

Figure 30C:
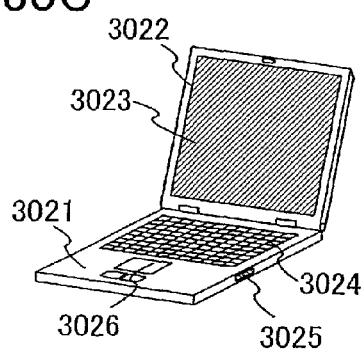

FIG. 30C is a diagram of a notebook computer. In a main body 3021, a keyboard 3024, an external connection port 3025, and a pointing device 3026 are provided. Furthermore, a chassis 3022 that has a display 3023 is attached to the main body 3021. The display device of the present invention is used in the display 3023. By the present invention, a notebook computer with excellent image quality and high video performance can be provided.

Figure 30D:
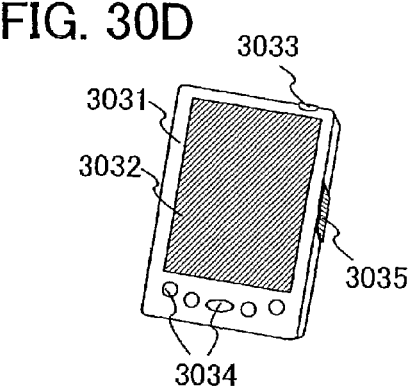

FIG. 30D is a diagram of a mobile computer that includes a main body 3031, a display 3032, a switch 3033, operation keys 3034, an infrared port 3035, and the like. Furthermore, an active matrix display device is provided in the display 3032. The display device of the present invention is used in the display 3032. By the present invention, a notebook computer with excellent image quality and high video performance can be provided.

Figure 30E:
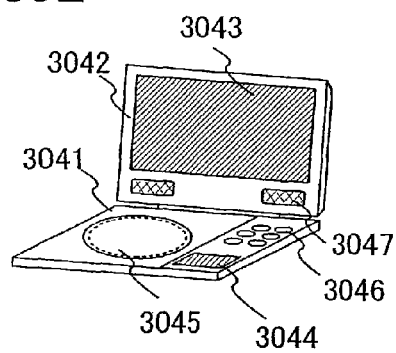

FIG. 30E is a diagram of an image playback device. In a main body 3041, a display 3044, a storage media reader 3045, and operation keys 3046 are provided. Furthermore, a chassis 3042 that has speakers 3047 and a display 3043 is attached to the main body 3041. The liquid crystal display device of the present invention is used in each of the display 3043 and the display 3044. By the present invention, an image playback device with excellent image quality and high video performance can be provided.

Figure 30F:
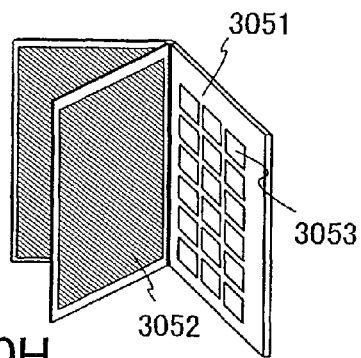

FIG. 30F is a diagram of an electronic book reader. In a main body 3051, operation keys 3053 are provided. Furthermore, a plurality of displays 3052 is attached to the main body 3051. The display device of the present invention is used in each of the displays 3052. By the present invention, an electronic book reader with excellent image quality and high video performance can be provided.

Figure 30G:
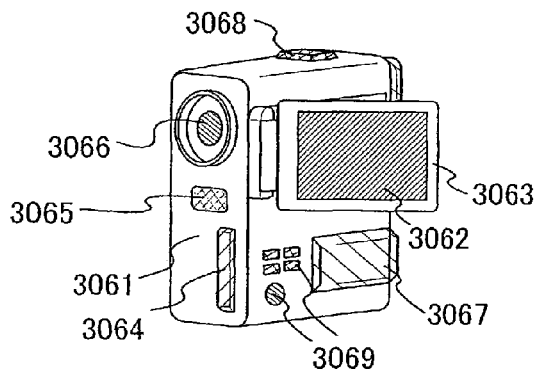

FIG. 30G is a diagram of a video camera. In a main body 3061, an external connection port 3064, a remote control receiver 3065, an image receiver 3066, a battery 3067, an audio input 3068, operation keys 3069 are provided. Furthermore, a chassis 3063 that has a display 3062 is attached to the main body 3061. The display device of the present invention is used in the display 3062. By the present invention, a video camera with excellent image quality and high video performance can be provided.

Figure 30H:
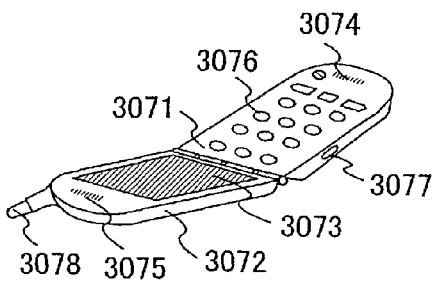

FIG. 30H is a diagram of a cellular phone that includes a main body 3071, a chassis 3072, a display 3073, an audio input 3074, an audio output 3075, operation keys 3076, an external connection port 3077, an antenna 3078, and the like. The display device of the present invention is used in the display 3073. By the present invention, a cellular phone with excellent image quality and high video performance can be provided.

As described above, the range of application of the present invention is extremely wide, and the present invention can be used in electronic devices of all fields. It is to be noted that the present embodiment mode can be used in combination with Embodiment Mode 1 through Embodiment Mode 11, as appropriate.

This application is based on Japanese Patent Application serial no. 2007-132607 filed with the Japan Patent Office on May 18, 2007, the entire contents of which are hereby incorporated by reference.

What is claimed is:

1. A liquid crystal display device comprising:
a light source for monitor use;
a liquid crystal layer;
a backlight for emitting light to the liquid crystal layer;
a light sensor used to detect an intensity of light passing through the liquid crystal layer from the light source for monitor use;
a unit configured to determine a timing of the backlight to be turned on or a timing of the backlight to be turned off based on successive comparisons in a single frame period between a luminance threshold value and the intensity of light from the light source for monitor use that is detected by the light sensor; and
a unit configured to control the backlight based on the timing of the backlight to be turned on or on the timing of the backlight to be turned off that is determined,
wherein the liquid crystal display device is configured so that the backlight is turned on once per frame period or turned off once per frame period according to the timing that is determined.

2. The liquid crystal display device according to claim 1, wherein the light source for monitor use and the backlight are provided on a same side of the liquid crystal layer.

3. The liquid crystal display device according to claim 1, wherein the light source for monitor use is provided on one side of the liquid crystal layer and the backlight is provided on a side of the liquid crystal layer opposite from the side on which the light source for monitor use is provided.

4. The liquid crystal display device according to claim 1, wherein the light source for monitor use is one part of the backlight.

5. The liquid crystal display device according to claim 1, further comprising a light sensor configured to detect an intensity of external light.

6. An electronic device in which the liquid crystal display device according to claim 1 is used.

7. The liquid crystal display device according to claim 1, wherein the unit configured to determine the timing is configured to perform the successive comparisons in corresponding k successive luminance detection periods in which the single frame period is divided, k being a natural number, and
wherein the timing is determined based on which of the successive comparisons evidences that the intensity of light from the light source for monitor use becomes greater than the luminance threshold value.

8. The liquid crystal display device according to claim 1, wherein the timing of the backlight to be turned on is determined during each frame period.

9. The liquid crystal display device according to claim 1, further comprising pixels,
wherein the liquid crystal display device is configured to input signals to each pixel during one frame period, sequentially from a first pixel to a last pixel, and
wherein the unit configured to control the backlight is configured to turn on the backlight after one of the signals is input to the last pixel and according to the timing that is determined.

10. A liquid crystal display device comprising:
a liquid crystal layer;
a first polarizing plate and a second polarizing plate, the liquid crystal layer being sandwiched between the first polarizing plate and the second polarizing plate;
a light source for monitor use provided on a side of the first polarizing plate;
a backlight for emitting light to the liquid crystal layer;
a light sensor used to detect an intensity of light passing through the liquid crystal layer, the first polarizing plate, and the second polarizing plate from the light source for monitor use;
a unit configured to determine a timing of the backlight to be turned on or a timing of the backlight to be turned off based on successive comparisons in a single frame period between a luminance threshold value and the intensity of light from the light source for monitor use that is detected by the light sensor; and
a unit configured to control the backlight based on the timing of the backlight to be turned on or on the timing of the backlight to be turned off that is determined,
wherein the liquid crystal display device is configured so that the backlight is turned on once per frame period or turned off once per frame period according to the timing that is determined.

11. The liquid crystal display device according to claim 10, wherein the light source for monitor use and the backlight are provided on a same side of the liquid crystal layer.

12. The liquid crystal display device according to claim 10, wherein the light source for monitor use is provided on one side of the liquid crystal layer and the backlight is provided on a side of the liquid crystal layer opposite from the side on which the light source for monitor use is provided.

13. The liquid crystal display device according to claim 10, wherein the light source for monitor use is one part of the backlight.

14. The liquid crystal display device according to claim 10, further comprising a light sensor configured to detect an intensity of external light.

15. An electronic device in which the liquid crystal display device according to claim 10 is used.

16. The liquid crystal display device according to claim 1, wherein the unit configured to determine the timing is configured to perform the successive comparisons in corresponding k successive luminance detection periods in which the single frame period is divided, k being a natural number, and wherein the timing is determined based on which of the successive comparisons evidences that the intensity of light from the light source for monitor use becomes greater than the luminance threshold value.

17. The liquid crystal display device according to claim 10, wherein timing of the backlight to be turned on is determined during each frame period.

18. The liquid crystal display device according to claim 10, further comprising pixels,
wherein the liquid crystal display device is configured to input signals to each pixel during one frame period, sequentially from a first pixel to a last pixel, and
wherein the unit configured to control the backlight is configured to turn on the backlight after one of the signals is input to the last pixel and according to the timing that is determined.

19. A driving method for a liquid crystal display device comprising:
detecting an intensity of light passing through a liquid crystal layer from a light source for monitor use; and
controlling a backlight to be turned on or to be turned off based on successive comparisons in a single frame period between a luminance threshold value and the intensity of light from the light source for monitor use that is detected,
wherein the backlight is turned on once per frame period or turned off once per frame period according to the intensity of light that is detected,
wherein controlling the backlight is performed based on timing of the backlight to be turned on and on timing of the backlight to be turned off, and wherein the timing of the backlight to be turned on and the timing of the backlight to be turned off are calculated based on the intensity of light from the light source for monitor use that is detected.

20. A liquid crystal display device configured to apply the driving method for a liquid crystal display device according to claim 19.

21. An electronic device in which the liquid crystal display device according to claim 20 is used.

22. The driving method for a liquid crystal display device according to claim 19,
wherein the successive comparisons are performed in corresponding k successive luminance detection periods in which the single frame period is divided, k being a natural number, and
wherein the timing is determined based on which of the successive comparisons evidences that the intensity of light from the light source for monitor use becomes greater than the luminance threshold value.

23. The driving method for a liquid crystal display device according to claim 19,
wherein timing of the backlight to be turned on is determined during each frame period.

24. The driving method for a liquid crystal display device according to claim 19, the liquid crystal display device comprising pixels, the driving method further comprising:
inputting signals to each pixel during one frame period, sequentially from a first pixel to a last pixel, and
turning on the backlight after one of the signals is input to the last pixel and according to the timing that is determined.

* * * * *